US010754299B2

(12) United States Patent
Takyoh et al.

(10) Patent No.: US 10,754,299 B2
(45) Date of Patent: Aug. 25, 2020

(54) ELECTRONIC WATCH

(71) Applicant: CITIZEN WATCH CO., LTD., Tokyo (JP)

(72) Inventors: Yu Takyoh, Nishitokyo (JP); Toshiaki Fukushima, Tokorozawa (JP); Toshinari Maeda, Tokorozawa (JP); Daisuke Iri, Nishitokyo (JP); Daisuke Matsuoh, Nishitokyo (JP); Masatoshi Nishida, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 16/076,690

(22) PCT Filed: Feb. 15, 2017

(86) PCT No.: PCT/JP2017/005596
§ 371 (c)(1),
(2) Date: Aug. 8, 2018

(87) PCT Pub. No.: WO2017/141994
PCT Pub. Date: Aug. 24, 2017

(65) Prior Publication Data
US 2019/0041804 A1 Feb. 7, 2019

(30) Foreign Application Priority Data
Feb. 15, 2016 (JP) .................................. 2016-025978

(51) Int. Cl.
*G04C 3/14* (2006.01)
*H02P 8/02* (2006.01)
*G04C 13/11* (2006.01)

(52) U.S. Cl.
CPC .............. *G04C 3/143* (2013.01); *G04C 3/14* (2013.01); *G04C 13/11* (2013.01); *H02P 8/02* (2013.01)

(58) Field of Classification Search
CPC .......... G04C 3/143; G04C 3/14; G04C 13/11; H02P 8/02
(Continued)

(56) References Cited

U.S. PATENT DOCUMENTS 5,889,734 A 3/1999 Sato
10,014,806 B2 * 7/2018 Kawaguchi ............ G04C 3/143
(Continued)

FOREIGN PATENT DOCUMENTS

CN 101515779 A 8/2009
CN 104467345 A 3/2015
(Continued)

OTHER PUBLICATIONS

Machine translation JP 2014183683 A.*
(Continued)

*Primary Examiner* — Kawing Chan
(74) *Attorney, Agent, or Firm* — HEA Law PLLC

(57) ABSTRACT

An electronic watch with a two-coil stepper motor including: a magnetized rotor; a stator including: first and second stator magnetic-pole portions, which are formed so as to oppose to each other through the rotor; and a third stator magnetic-pole portion, which is formed between the first stator magnetic-pole portion and the second stator magnetic-pole portion so as to face the rotor; a coil A to be magnetically coupled to the first stator magnetic-pole portion and the third stator magnetic-pole portion; and a coil B to be magnetically coupled to the second stator magnetic-pole portion and the third stator magnetic-pole portion; and a high-speed drive pulse generation circuit configured to out-
(Continued)

put a drive pulse for driving the rotor to the coil A or the coil B, and wherein the rotor is rotationally driven in increments of 360° due to a drive pulse train formed of the plurality of drive pulses.

12 Claims, 38 Drawing Sheets

(58) Field of Classification Search
    USPC .......................................................... 318/685
    See application file for complete search history.

(56) References Cited

U.S. PATENT DOCUMENTS

| | | | |
|---|---|---|---|
| 2009/0206789 A1 | 8/2009 | Kasuo et al. | |
| 2013/0182542 A1* | 7/2013 | Yamamoto | G04C 3/14 368/76 |
| 2015/0084573 A1 | 3/2015 | Saito et al. | |
| 2015/0085625 A1 | 3/2015 | Saito et al. | |
| 2016/0276967 A1 | 9/2016 | Kawaguchi et al. | |

FOREIGN PATENT DOCUMENTS

| | | |
|---|---|---|
| CN | 104467348 A | 3/2015 |
| JP | 3166654 B2 | 5/2001 |
| JP | 3407887 B2 | 5/2003 |
| JP | 2006-101618 A | 4/2006 |
| JP | 2010-043949 A | 2/2010 |
| JP | 2014-183683 A | 9/2014 |
| JP | 2016-178742 A | 10/2016 |

OTHER PUBLICATIONS

English Translation of International Search Report for PCT/JP2017/005596 dated May 16, 2017.
Office Action dated Jan. 19, 2020, for corresponding CN Patent Application No. 201780011495.X.

* cited by examiner

FIG.4
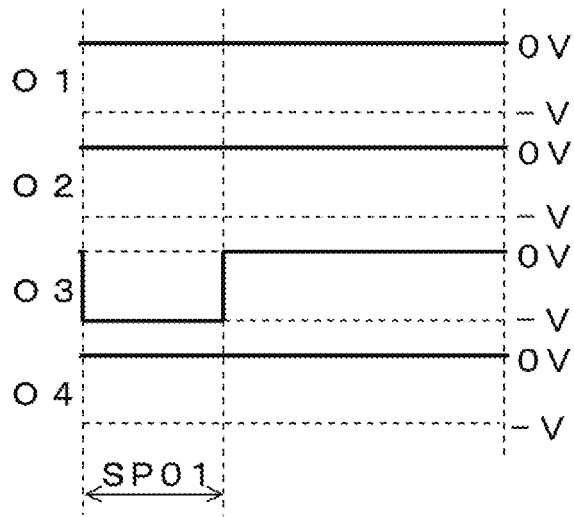
(a)
| REFERENCE SYMBOL | SP01 | SP02 |
|---|---|---|
| P1 | ON | ON |
| N1 | OFF | OFF |
| P2 | ON | ON |
| N2 | OFF | OFF |
| P3 | OFF | ON |
| N3 | ON | OFF |
| P4 | ON | OFF |
| N4 | OFF | ON |
(b)
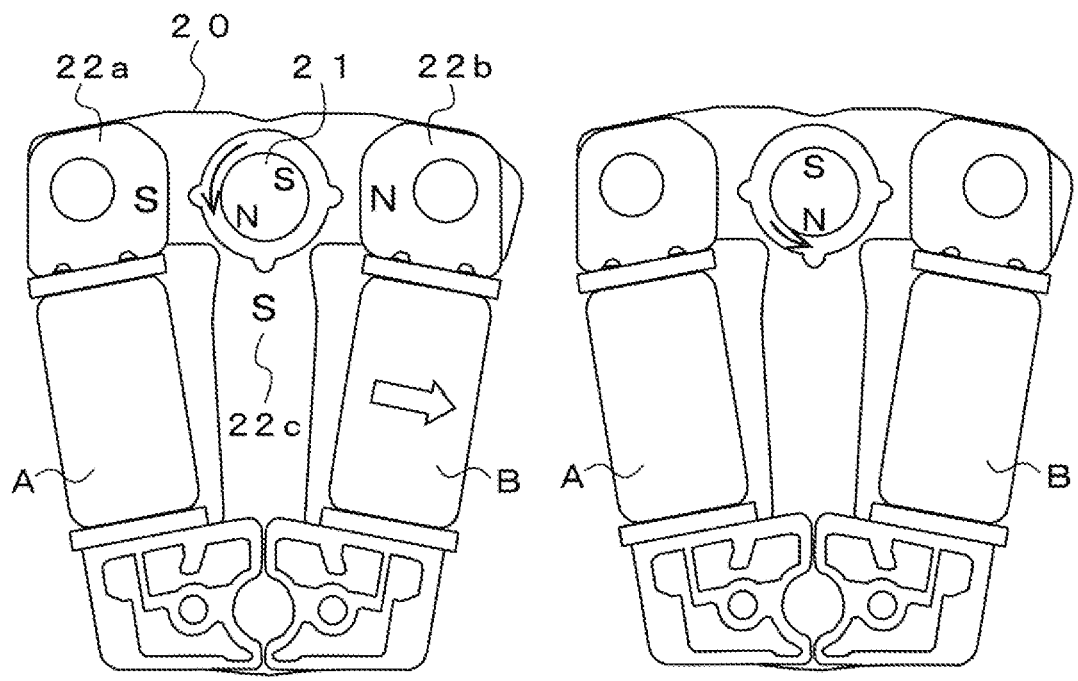
(c)    (d)
Related Art

FIG.5
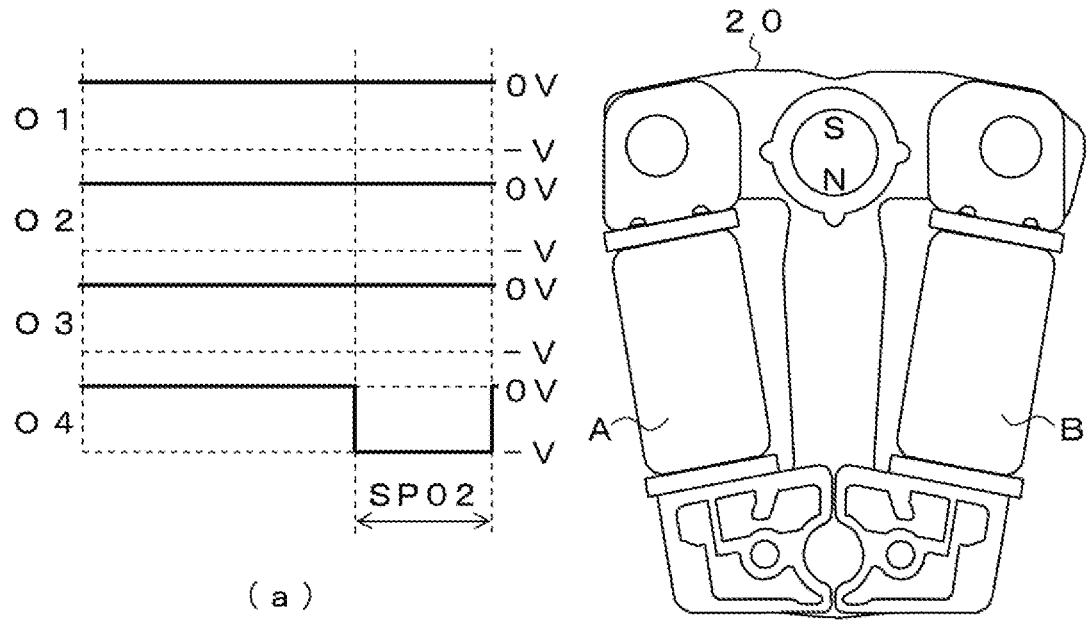
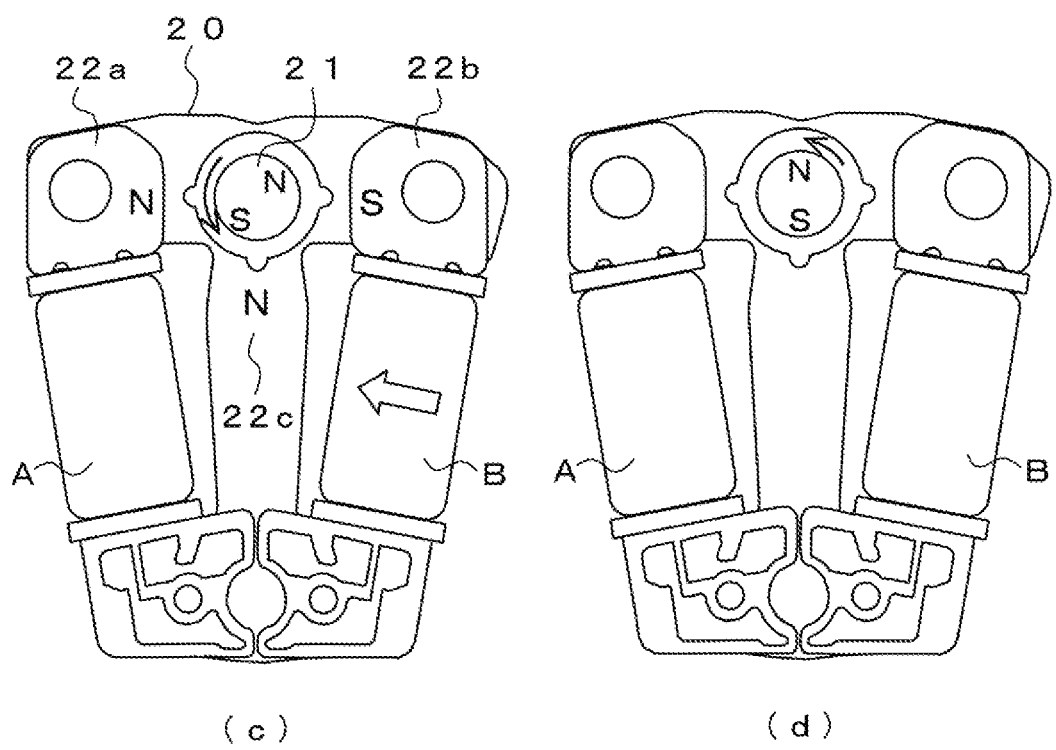
Related Art (a)

| REFERENCE SYMBOL | HIGH-SPEED DRIVE PULSE TRAIN SP10 | | |
|---|---|---|---|
| | SP11 | SP12 | SP13 |
| P1 | ON | ON | ON |
| N1 | OFF | OFF | OFF |
| P2 | ON | OFF | ON |
| N2 | OFF | ON | OFF |
| P3 | OFF | ON | ON |
| N3 | ON | OFF | OFF |
| P4 | ON | OFF | OFF |
| N4 | OFF | ON | ON |

(b)

FIG.7
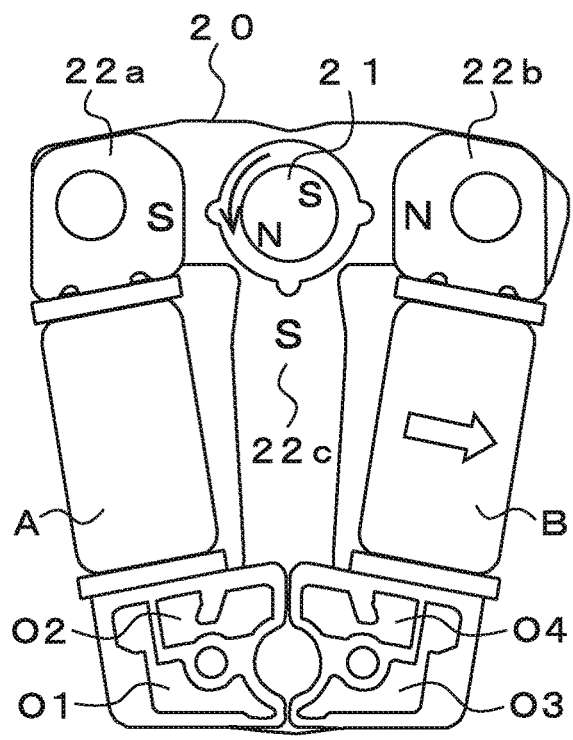
(a)
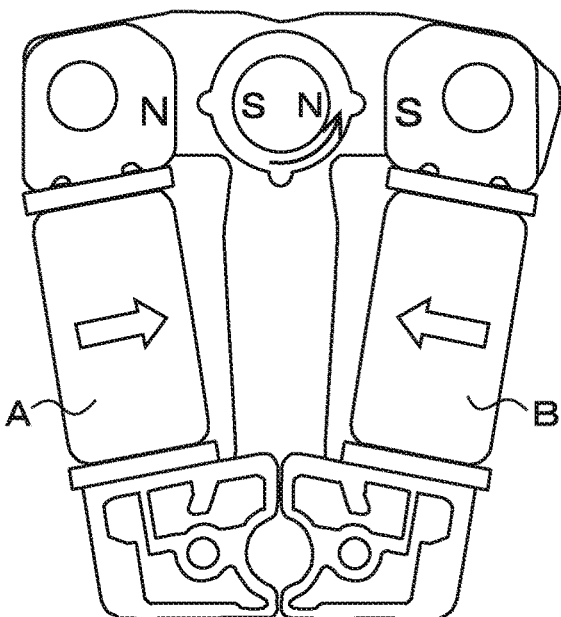
(b)
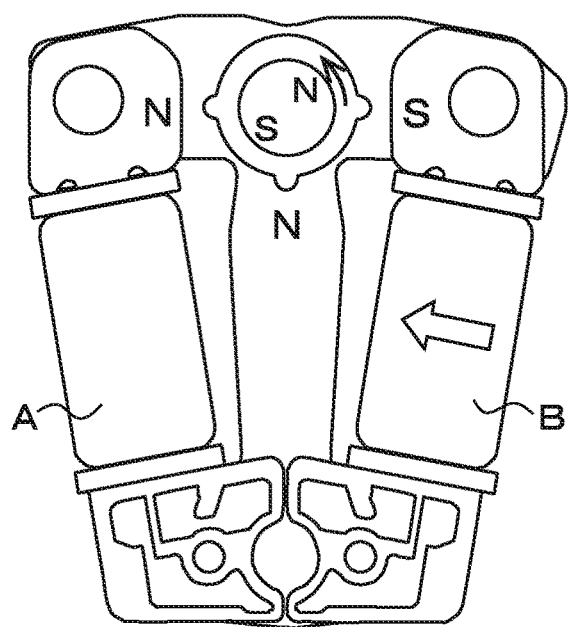
(c)
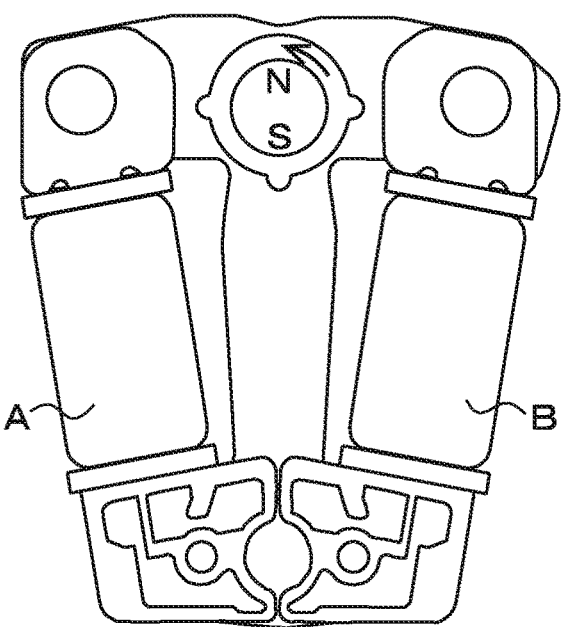
(d)

FIG.10
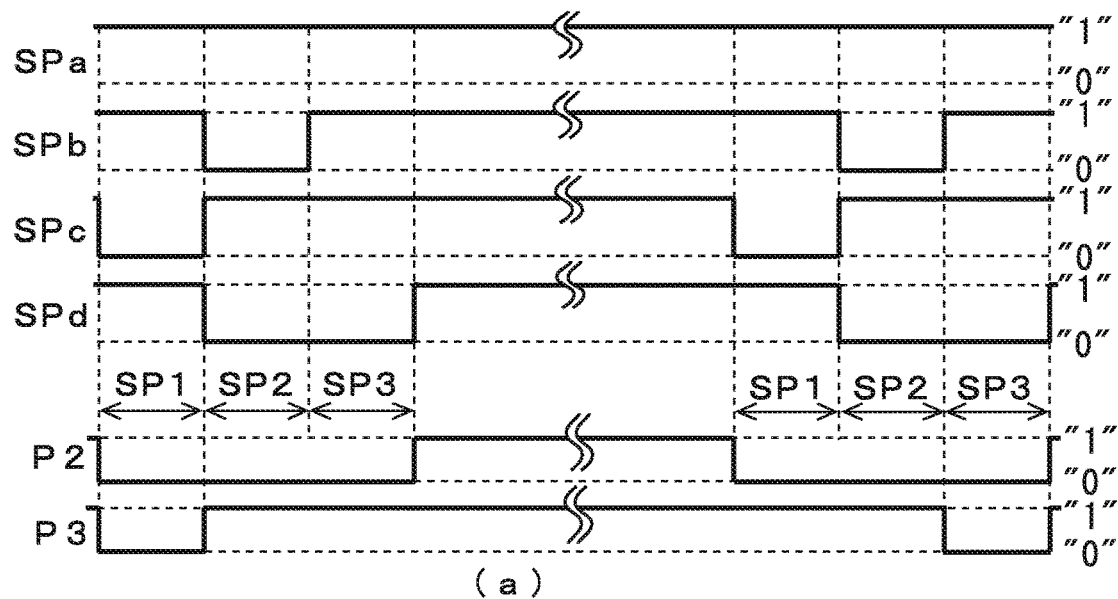
(a)
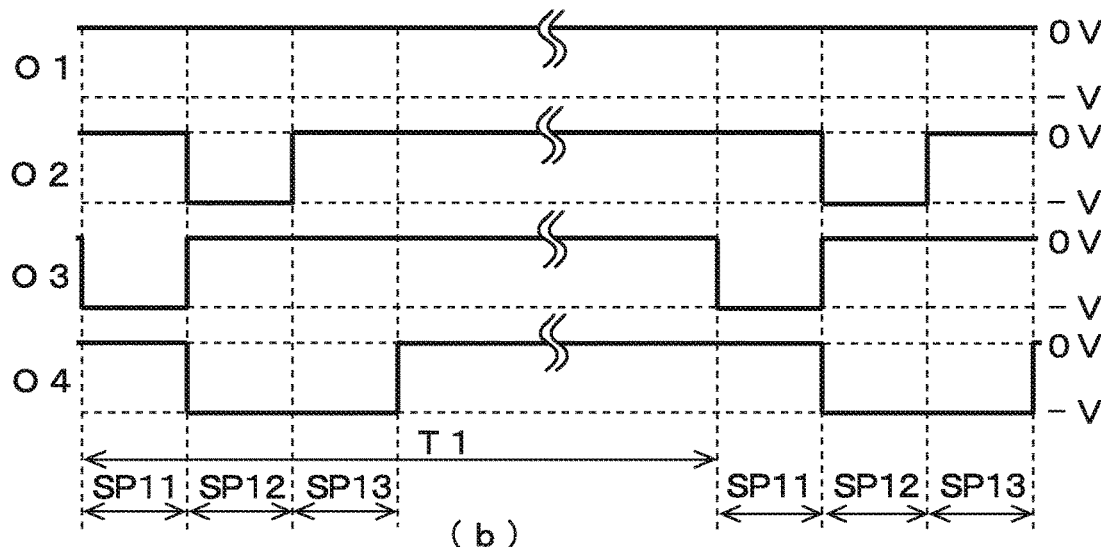
(b)
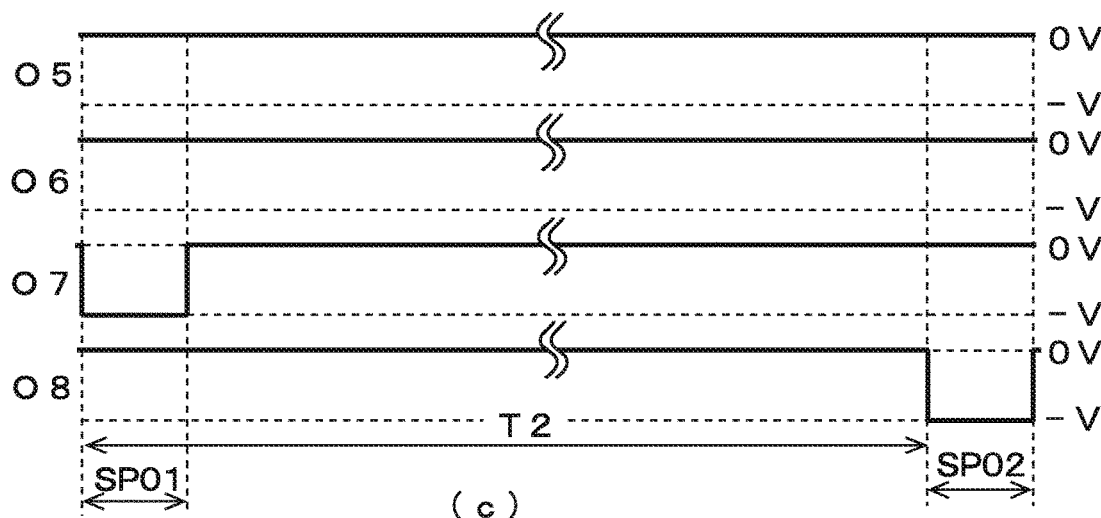
(c)

FIG.11

| REFERENCE SYMBOL | HIGH-SPEED DRIVE (FOR MINUTE-HOUR HANDS) | | | NORMAL DRIVE (FOR SECOND HAND) | |
|---|---|---|---|---|---|
| | SP11 | SP12 | SP13 | SP01 | SP02 |
| P1 | ON | ON | ON | ON | ON |
| N1 | OFF | OFF | OFF | OFF | OFF |
| P2 | ON | (OFF) | ON | ON | ON |
| N2 | OFF | (ON) | OFF | OFF | OFF |
| P3 | (OFF) | ON | ON | ON | ON |
| N3 | (ON) | OFF | OFF | OFF | OFF |
| P4 | ON | (OFF) | (OFF) | ON | ON |
| N4 | OFF | (ON) | (ON) | OFF | OFF |
| P5 | ON | ON | ON | ON | ON |
| N5 | OFF | OFF | OFF | OFF | OFF |
| P6 | ON | ON | ON | ON | ON |
| N6 | OFF | OFF | OFF | OFF | OFF |
| P7 | ON | ON | ON | (OFF) | ON |
| N7 | OFF | OFF | OFF | (ON) | OFF |
| P8 | ON | ON | ON | ON | (OFF) |
| N8 | OFF | OFF | OFF | OFF | (ON) |

Related Art

FIG.14
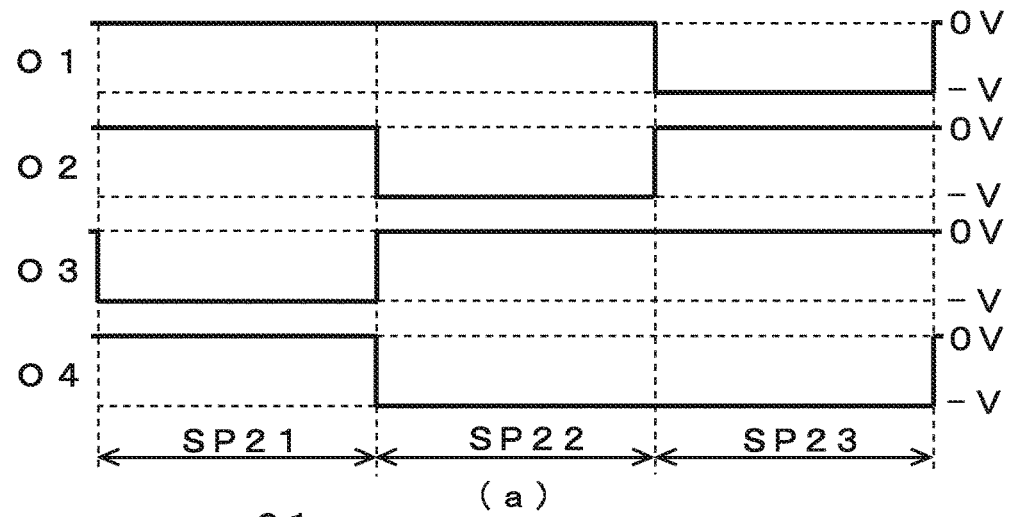
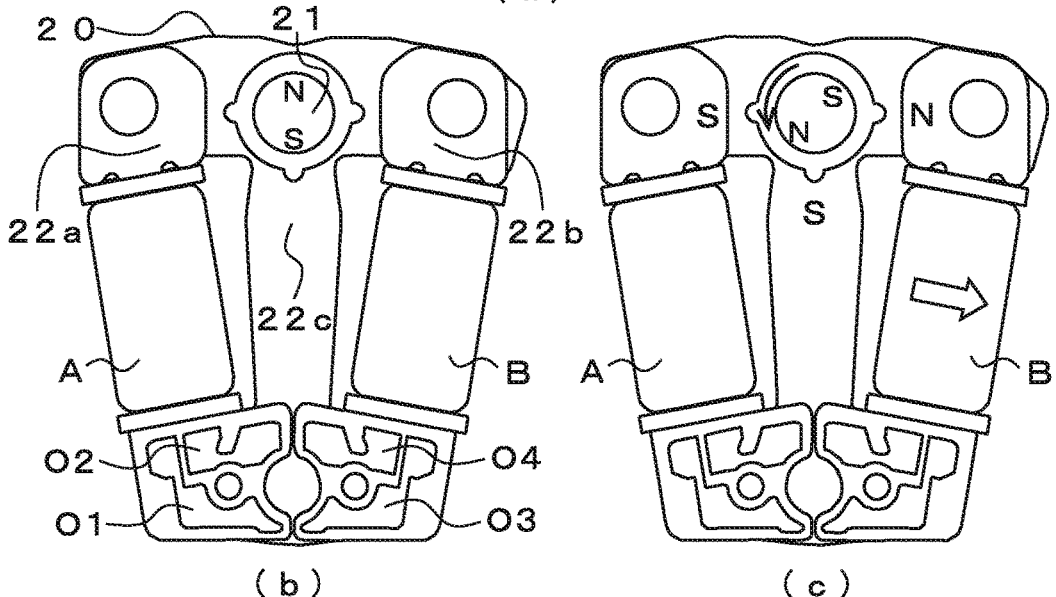
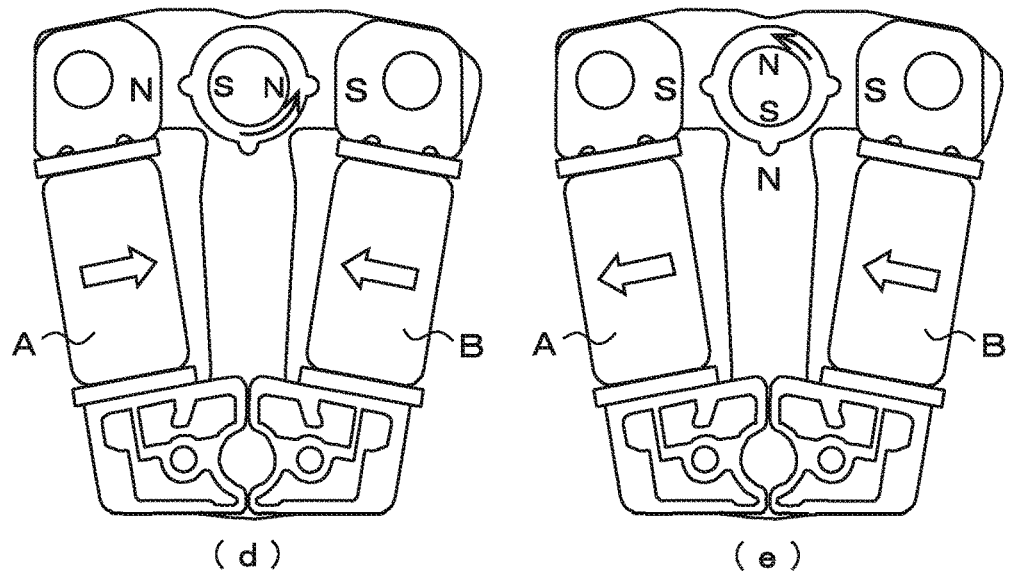

FIG.16
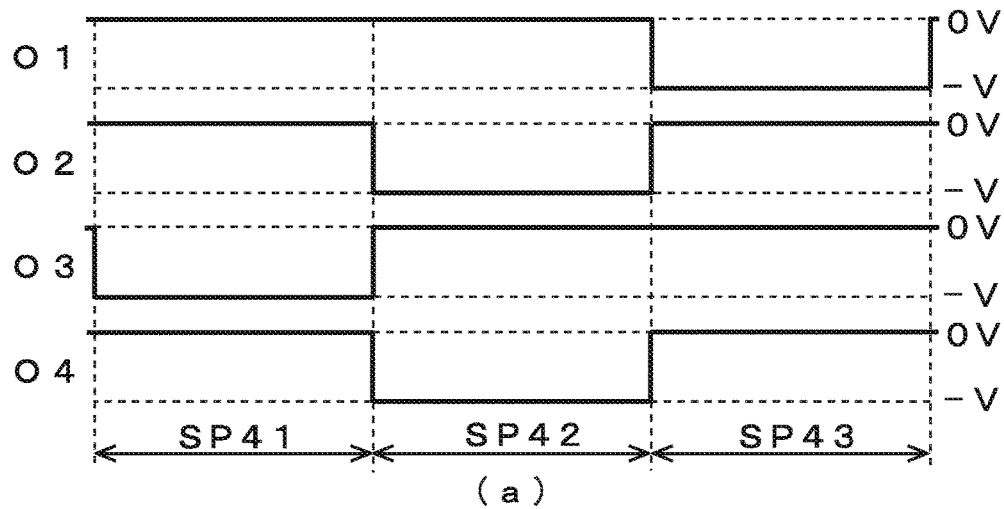
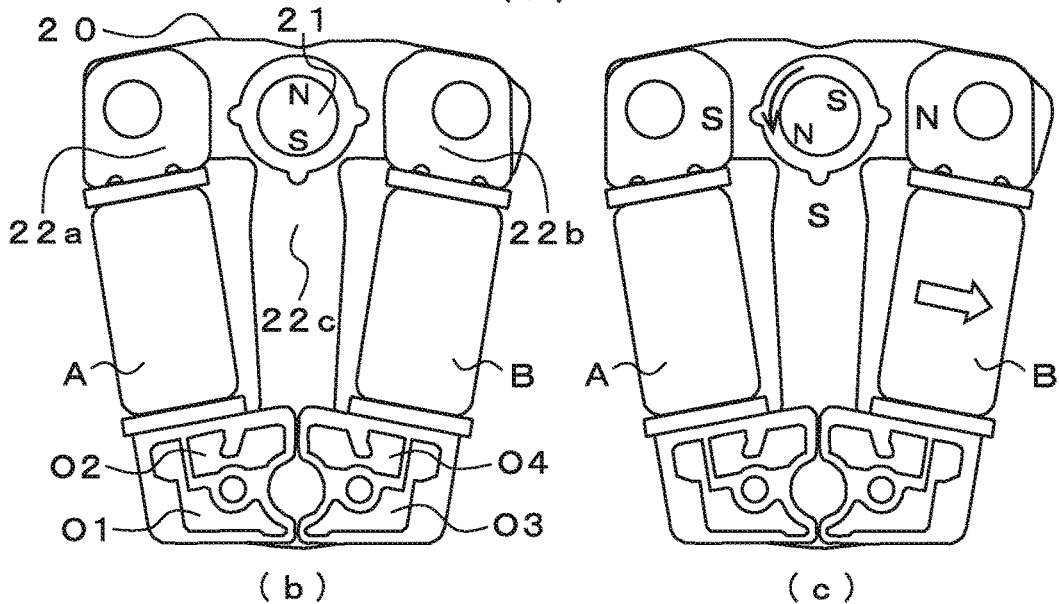
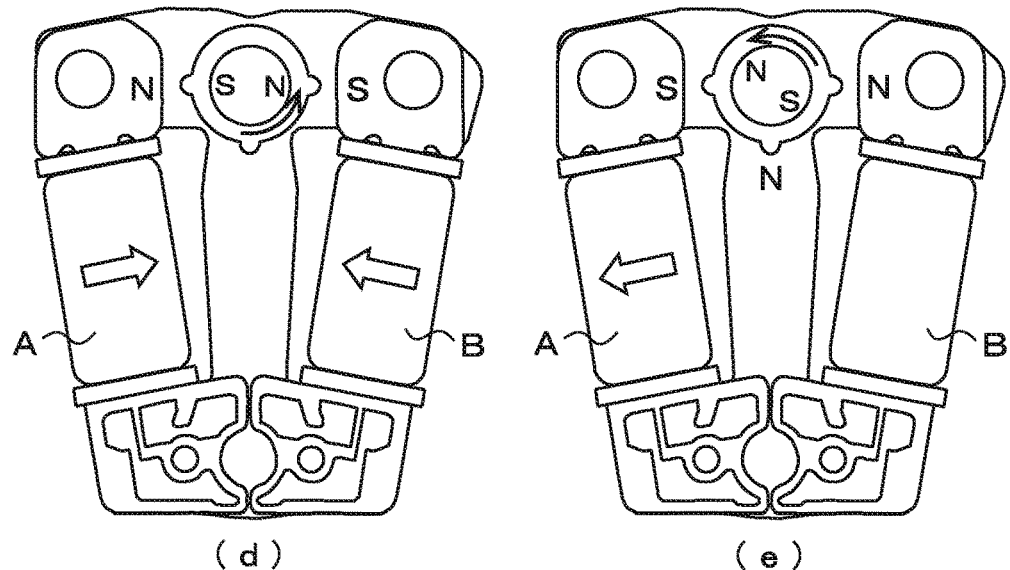

FIG.17
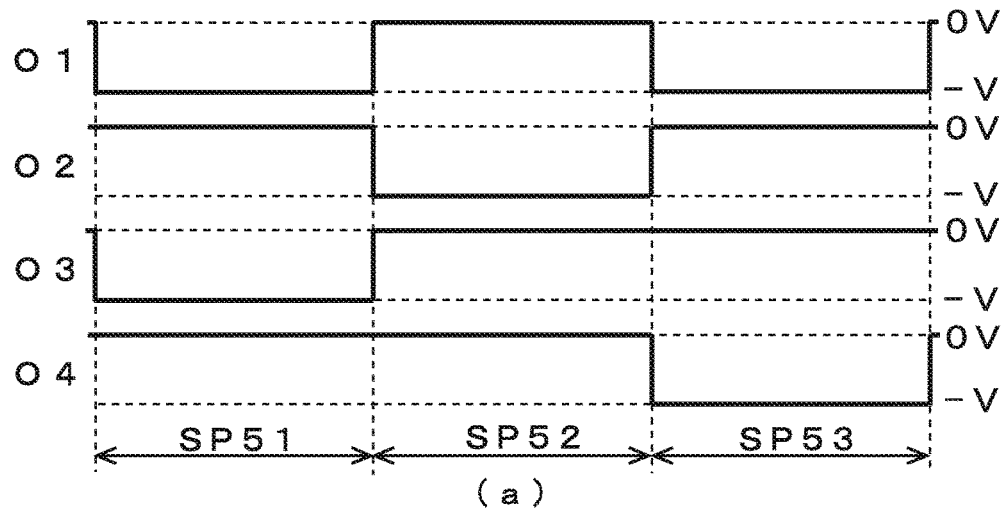
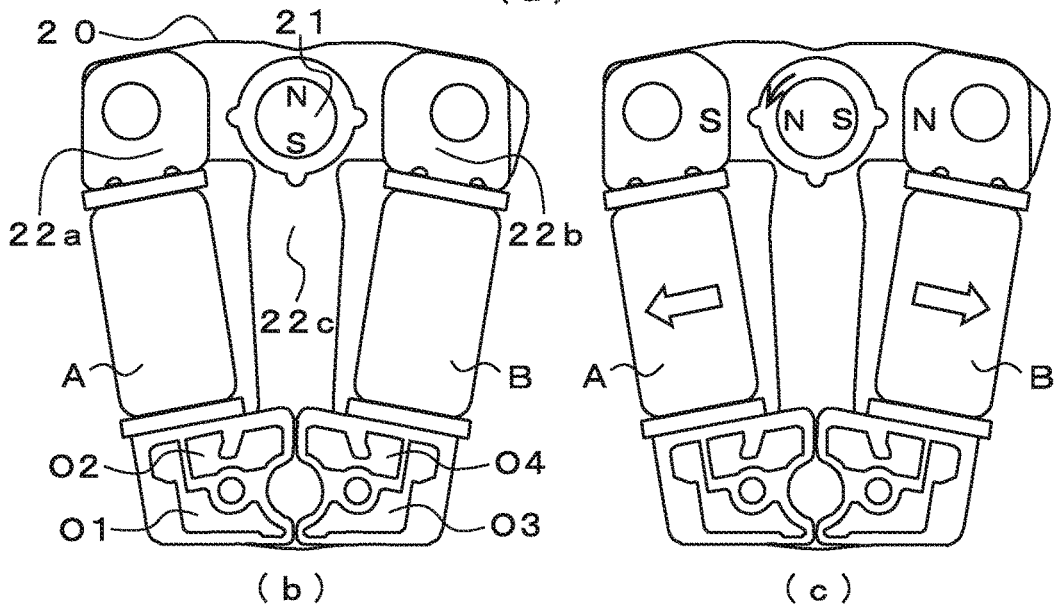
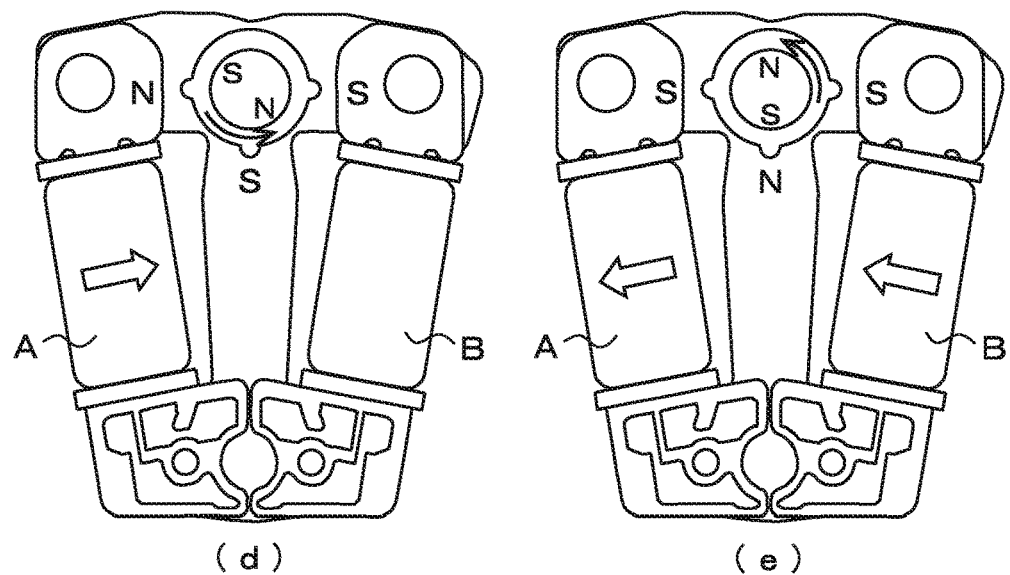

(a)

| REFERENCE SYMBOL | HIGH-SPEED DRIVE PULSE TRAIN SP60 | | |
|---|---|---|---|
| | SP61 | SP62 | SP63 |
| P1 | ON(OFF) | ON | OFF |
| N1 | OFF | OFF | ON(OFF) |
| P2' | ON | OFF | OFF |
| N2' | OFF | ON | ON |
| P3 | OFF | ON | ON |
| N3 | ON | OFF | OFF |

(b)

(a)

| REFERENCE SYMBOL | HIGH-SPEED DRIVE PULSE TRAIN SP70 | | | |
|---|---|---|---|---|
| | SP71 | SP72 | SP73a | SP73b |
| P1 | ON(OFF) | ON | OFF | OFF |
| N1 | OFF | OFF | ON | ON(OFF) |
| P2' | ON | OFF | ON | OFF |
| N2' | OFF | ON | OFF | ON |
| P3 | OFF | ON | ON(OFF) | ON |
| N3 | ON | OFF | OFF | OFF |

(b)

FIG.22
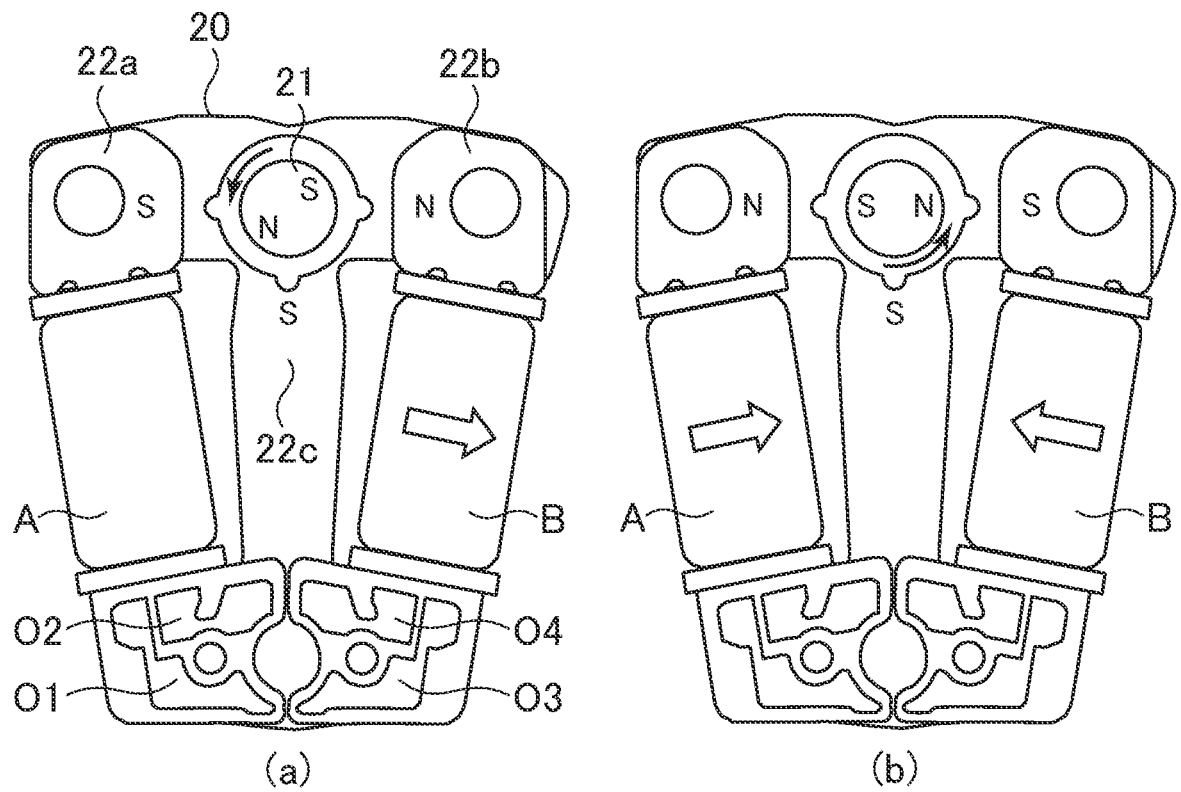
(a)　　　　　　　　　　(b)
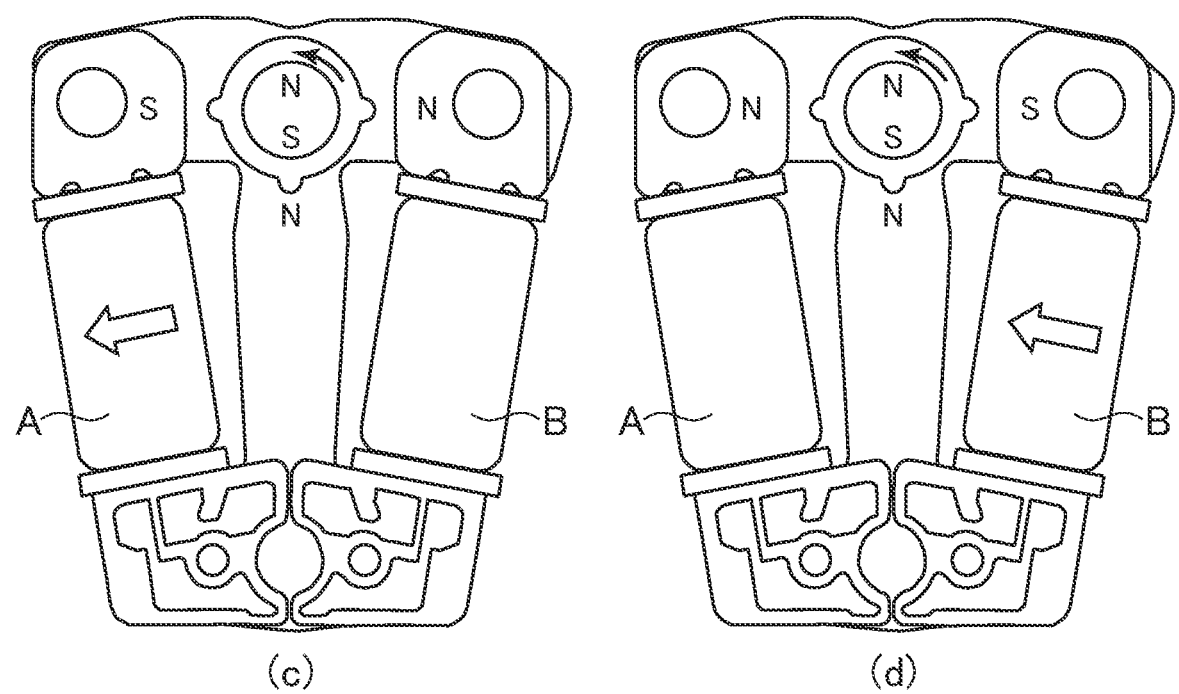
(c)　　　　　　　　　　(d)

FIG.26
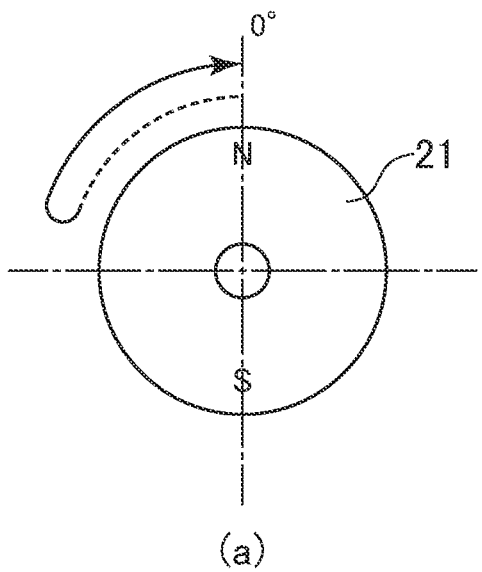
(a)
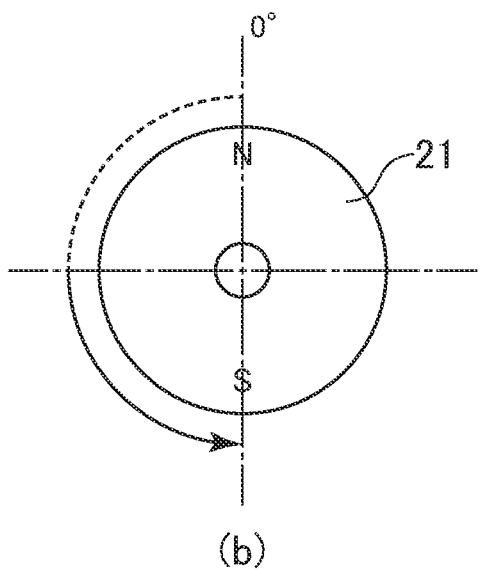
(b)

FIG.30
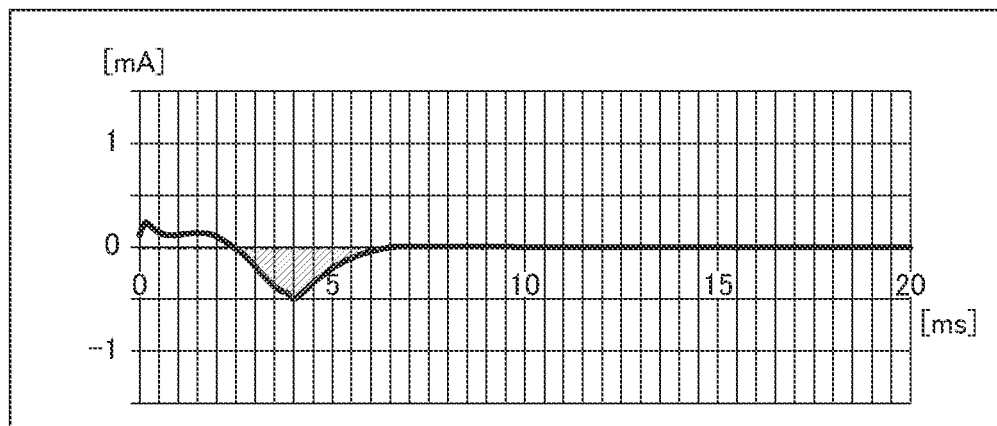
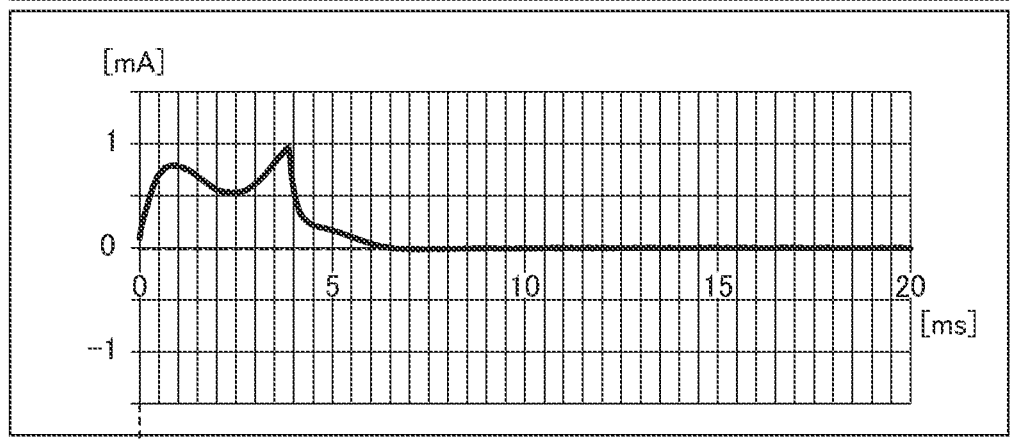
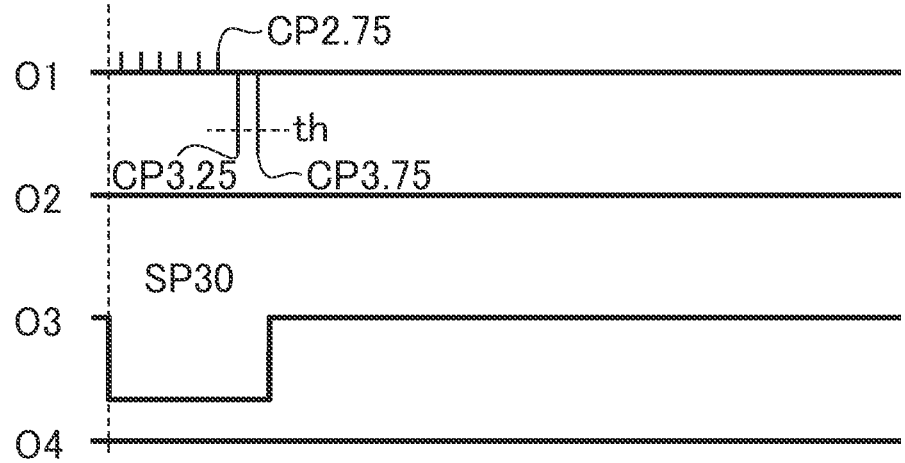

FIG.34
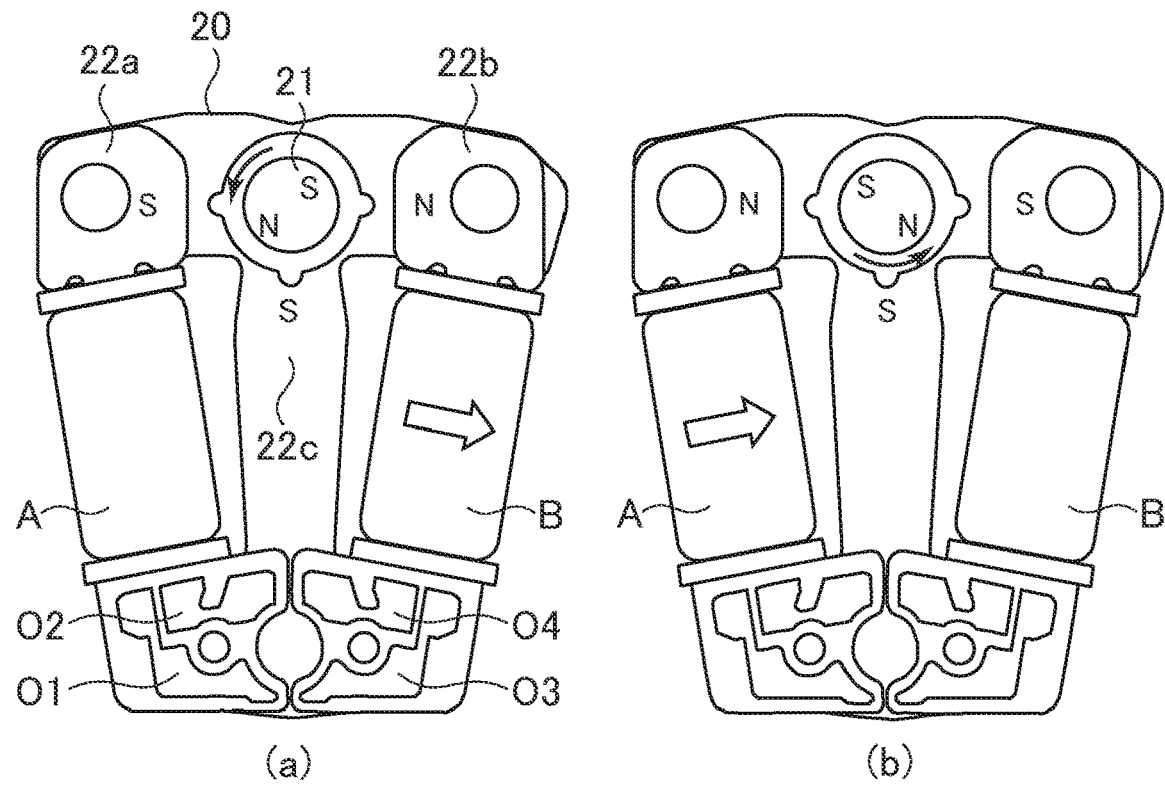
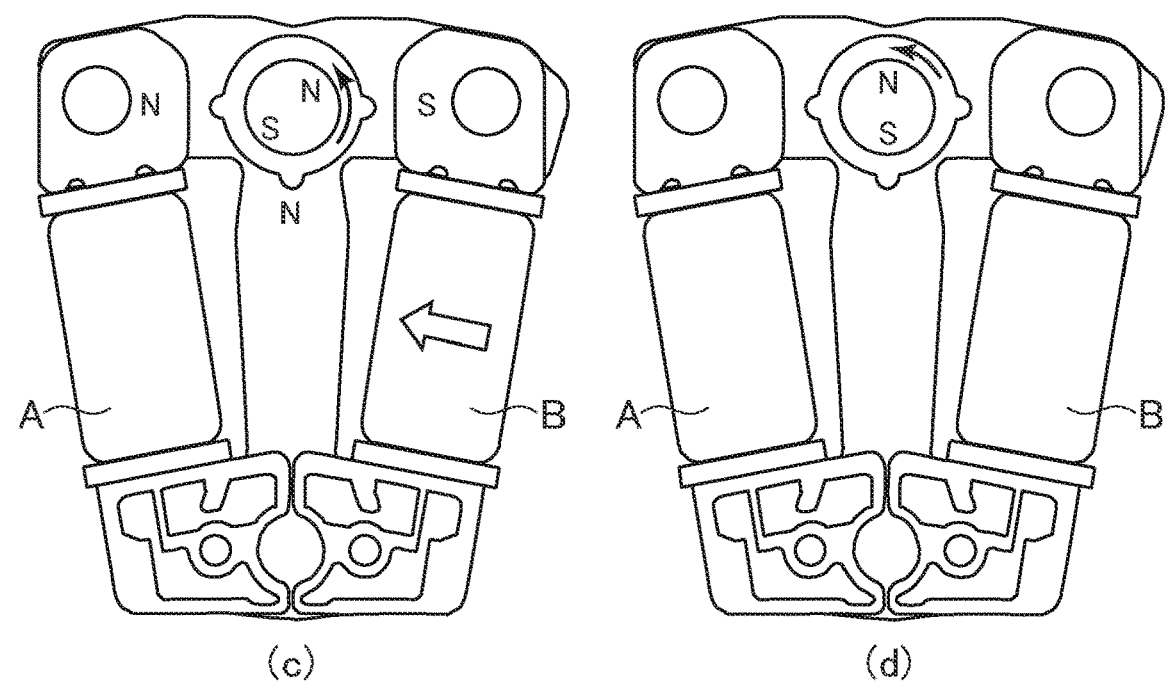

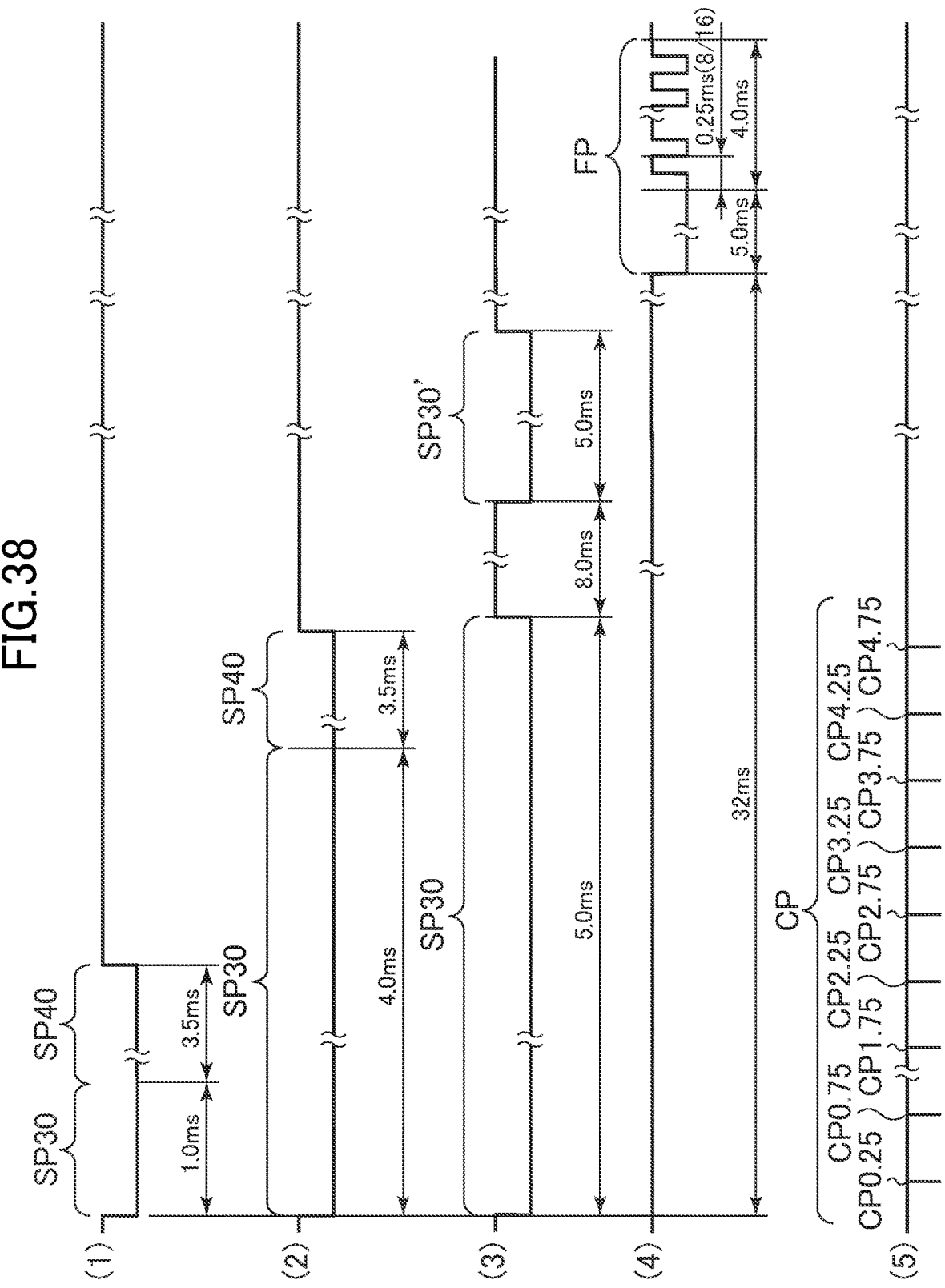

ELECTRONIC WATCH

CROSS REFERENCE TO RELATED APPLICATIONS

This application is a National Stage of International Application No. PCT/JP2017/005596 filed on Feb. 15, 2017, which claims priority from Japanese Patent Application 2016-025978, filed on Feb. 15, 2016. The contents of the above documents are incorporated herein by reference in their entirety.

TECHNICAL FIELD

The present invention relates to an analog indication-type electronic watch using a two-coil stepper motor.

BACKGROUND ART

Hitherto, in general, an electronic watch including analog indication means has hands that are driven by a stepper motor. This stepper motor includes a stator to be magnetized by a coil, and a rotor that is a disc-shaped rotary member magnetized into two poles. For example, the stepper motor is rotationally driven by 180° for each second to indicate the time with the hands.

In such an analog indication-type electronic watch based on a stepper motor, a position indicated by a second hand or the like deviates due to, for example, a backlash of a wheel train configured to move the hands, which causes the second hand or the like to deviate from a dial division. In addition, in order to prioritize miniaturization of the stepper motor, the holding torque of an indicator wheel is reduced, which leads to a problem that, for example, the position of a hand gets out of order due to an impact or the like.

In order to solve such a problem, there is proposed an electronic watch, which is configured so that a drive pulse for driving the stepper motor has a two-step configuration including a first drive pulse and a second drive pulse, and includes a motor control circuit configured to set an output interval between the first drive pulse and the second drive pulse to 50 mS or less (see, for example, Patent Literature 1).

According to the electronic watch of Patent Literature 1, as described therein, it is possible to set the rotation speed of a rotor higher than usual, for example, twice the rotation speed, by outputting the first drive pulse and the second drive pulse having an output interval of 50 mS or less, and hence a speed reduction ratio from the rotor to a second indicator wheel can be increased, to thereby be able to increase the holding torque of the hands and be able to alleviate the deviation of the positions indicated by the hands due to a backlash.

In addition, as a drive method for a stepper motor used in an analog indication-type electronic watch, there is proposed a method involving connecting a first coil and a second coil to a common connection point and switching a current to be applied for each of three phases (see, for example, Patent Literature 2).

CITATION LIST

Patent Literature

[PTL 1] JP 3166654 B2 (page 2, FIG. 1)
[PTL 2] JP 2016-178742 A

SUMMARY OF INVENTION

Technical Problem

However, in the electronic watch presented in Patent Literature 1, the rotor is rotated by one revolution (360°) through two-step drive, and hence there is a time interval between the first drive pulse and the second drive pulse, which causes, for example, deceleration, vibration, stop, and reacceleration in the movement of the rotor. As a result, the hands move in an awkward and unnatural manner to exhibit poor-looking movement, which causes a problem of causing a user of the electronic watch to feel discomfort.

In addition, when the time interval between the first drive pulse and the second drive pulse is reduced in order to avoid this problem, the subsequent drive is performed while vibration after the rotation of the rotor has not converged yet, and hence the frequency of an abnormal operation that reverses the rotor increases, which leads to a fear that a malfunction may be caused to a stepper motor. Further, the rotor is rotated by one revolution (360°) through two-step drive in the same manner as the related-art drive, and hence a limitation is imposed on the rotation of the rotor at high speed, which is not suitable for the high-speed drive of the stepper motor.

The present invention has an object to solve the above-mentioned problems and provide an electronic watch capable of driving the movement of the hands smoothly at high speed by rotationally driving a two-coil stepper motor in increments of 360° per step.

Solution to Problem

In order to solve the above-mentioned problems, an electronic watch according to embodiments of the present invention employs configurations described below.

According to one embodiment of the present invention, there is provided an electronic watch including: a two-coil stepper motor including: a rotor magnetized into two poles or more in a radial direction of the rotor; a stator including: a first stator magnetic-pole portion and a second stator magnetic-pole portion, which are formed so as to oppose to each other through the rotor; and a third stator magnetic-pole portion, which is formed between the first stator magnetic-pole portion and the second stator magnetic-pole portion so as to face the rotor; a first coil to be magnetically coupled to the first stator magnetic-pole portion and the third stator magnetic-pole portion; and a second coil to be magnetically coupled to the second stator magnetic-pole portion and the third stator magnetic-pole portion; and a drive pulse generation circuit configured to output a drive pulse for driving the rotor to the first coil or the second coil, wherein the drive pulse includes a plurality of drive pulses, and wherein the rotor is to be rotationally driven in increments of 360° due to a drive pulse train formed of the plurality of drive pulses.

With the electronic watch according to one embodiment of the present invention, the rotational drive in increments of 360° per step is enabled by a drive pulse train formed of a plurality of drive pulses, to thereby be able to achieve the high-speed drive of the stepper motor. In addition, the rotor is rotated by one revolution (360°) for a short period of time without stopping, and hence the movement of the hands becomes smoother, to thereby be able to provide an electronic watch having satisfactory appearance without awkwardness. Further, the stepper motor is driven in increments of 360° per step, and hence a gear speed reduction ratio can be doubled (to 1/60) compared with a gear speed reduction ratio of 1/30 of a wheel train in the related-art rotation by 180° per step for the stepper motor, and the torque of the hands can be increased, which improves the impact resistance of the hands.

Further, the electronic watch according to one embodiment of the present invention has a feature in that the drive pulse train is formed of three drive pulses of the plurality of drive pulses.

With this, the rotational drive by 360° per step can be achieved by as few as three drive pulses, and hence it is possible to perform the high-speed drive compared with the related-art two-step drive, which enables the hands to be moved in the fast-forwarding operation of the hands at a speed higher than in the related art.

Further, the electronic watch according to one embodiment of the present invention has a feature in that the electronic watch is configured to switch between high-speed drive, in which the rotor is to be rotationally driven in increments of 360°, and normal drive, in which the rotor is to be rotationally driven in increments of 180°, and that the rotor is to be driven in the high-speed drive at a frequency higher than in the normal drive.

With this, it is possible to switch between the high-speed drive, in which the rotor is to be rotated in increments of 360°, and the normal drive, in which the rotor is to be rotated in increments of 180°. Therefore, for example, it is possible to perform the high-speed drive based on the rotation by 360° per step when the hands are subjected to the fast-forwarding of the hands, while it is possible to perform the normal drive in increments of 180° per step in the case of moving the hand every second or other such case of normal hand movement.

Further, the electronic watch according to one embodiment of the present invention has a feature in that the electronic watch further includes: a first two-coil stepper motor to be subjected to the high-speed drive; and a second two-coil stepper motor to be subjected to the normal drive, and that a drive frequency of the second two-coil stepper motor is lower than a drive frequency of the first two-coil stepper motor.

With this, the first two-coil stepper motor to be subjected to the high-speed drive can be used for driving minute-hour hands, which are relatively large in hand shape and low in drive frequency. The minute-hour hands are relatively large in shape, which causes the impact resistance to be important, but are low in drive frequency, which eliminates the importance of the low-power-consumption drive. Therefore, the first two-coil stepper motor subjected to the high-speed drive, which is configured to rotate the rotor in increments of 360°, to thereby double the gear speed reduction ratio to increase the torque of the hands and improve the impact resistance, is suitable for the minute-hour hand drive. Further, the second stepper motor to be subjected to the normal drive can be used for driving a second hand, which is relatively small in hand shape and high in drive frequency. The second hand is relatively small in shape, which eliminates the importance of the impact resistance, and is high in drive frequency, which causes the low-power-consumption drive to be important. Therefore, the second two-coil stepper motor subjected to the normal drive is suitable for the second hand drive.

Further, the electronic watch according to one embodiment of the present invention has a feature in that the electronic watch is configured to select a high-speed drive pulse train or a normal drive pulse by switching a timing to select a specific drive pulse from the drive pulse train.

With this, it is possible to select and output the high-speed drive pulse train or the normal drive pulse by arranging one drive pulse generation circuit to switch a timing to select a specific drive pulse from the output drive pulse train, and hence it suffices that only one drive pulse generation circuit is provided, which is advantageous in that the circuit scale of the electronic watch can be reduced.

Further, the electronic watch according to one embodiment of the present invention has a feature in that one terminal of the first coil and one terminal of the second coil are short-circuited.

With this, it suffices that the number of drive waveforms to be supplied is three and that the number of transistors is small, and hence effects of miniaturization of the circuit scale and reduction in cost are expected to produced.

Further, the electronic watch according to one embodiment of the present invention has a feature in that at least one of the plurality of drive pulses included in the drive pulse train is formed of a pulse for exciting the first coil and a pulse for exciting the second coil so as to be alternately repeated.

With this, two coils are not simultaneously excited, and the maximum value of the current consumption can be suppressed to a low level. Therefore, the high-speed drive based on the rotational drive by 360° per step can be performed even when a power source condition is strict, for example, when the outside temperature is low or in a state in which the power supply voltage is lowered.

Further, the electronic watch according to one embodiment of the present invention has a feature in that the electronic watch further includes: a detection pulse generation circuit configured to generate a detection pulse for detecting rotation of the rotor; and a rotation detection determination circuit configured to determine rotation or non-rotation of the rotor based on a detection signal detected by applying the detection pulse to the first coil or the second coil, and that the electronic watch has a variable drive pulse formed of apart of the plurality of drive pulses included in the drive pulse train, and the variable drive pulse has a length changed depending on a result of determining the rotation or non-rotation of the rotor by the rotation detection determination circuit.

With this, the rotation or non-rotation of the rotor can be detected in the case of performing the rotational drive by 360° in one step, and it is possible to reliably rotate the rotor by outputting the correction pulse in the case of the non-rotation. Further, the length of the high-speed drive pulse train to be output is only required to be a length required for rotating the rotor. Therefore, the power consumption is reduced, and a dead time is eliminated to enable the high-speed drive.

Further, the electronic watch according to one embodiment of the present invention has a feature in that the drive pulse train has a duty cycle to be switched based on at least any one of a power supply voltage or a temperature.

With this, a plurality of kinds of drive pulses different in power consumption and output can be applied to the stepper motor.

Further, the electronic watch according to one embodiment of the present invention has a feature in that the drive pulse train has the duty cycle to be further changed based on an elapsed time from a start of the rotation.

With this, useless power consumption is reduced when the drive force is sufficient, while useless power consumption caused in the case of the non-rotation is suppressed when the drive force is insufficient, to thereby be able to achieve reduction in power consumption and the stable rotation of the rotor with a satisfactory balance.

Further, the electronic watch according to one embodiment of the present invention has a feature in that the electronic watch has a first drive pulse train for simultaneously exciting the first coil and the second coil and a second drive pulse train for avoiding simultaneously exciting the first coil and the second coil, and that the electronic watch is configured to select which one of the first drive pulse train and the second drive pulse train is to be used as the drive pulse train based on at least any one of a power supply voltage or a temperature.

With this, a current value is suppressed to suppress reduction in power supply voltage under a condition that causes a fear that a voltage may be temporarily lowered due to large current consumption, while it is possible to achieve a high-speed rotational drive by 360° per step under a condition with no such fear.

Further, the electronic watch according to one embodiment of the present invention has a feature in that the variable drive pulse includes the drive pulse train for avoiding simultaneously exciting the first coil and the second coil, that the electronic watch has, as fixed drive pulses formed of remaining drive pulses of the plurality of drive pulses included in the drive pulse train, a first fixed drive pulse for simultaneously exciting the first coil and the second coil and a second fixed drive pulse for avoiding simultaneously exciting the first coil and the second coil, and that the variable drive pulse is to be used irrespective of a condition, and which one of the first fixed drive pulse and the second fixed drive pulse is to be used as the fixed drive pulse is selected based on an elapsed time from a start of the rotation.

With this, only by detecting the timing for the rotation detection without directly detecting the value of the power supply voltage and the temperature of the electronic watch, it is possible to determine the condition in which temporary reduction in power supply voltage becomes a problem, to thereby avoid a problem of the temporary reduction in power supply voltage due to the large current consumption, while it is possible to achieve a stable high-speed rotation by 360° per step. Therefore, it is possible to achieve miniaturization and reduction in cost.

Further, the electronic watch according to one embodiment of the present invention has a feature in that the variable drive pulse includes the drive pulse train for avoiding simultaneously exciting the first coil and the second coil, that the electronic watch has: a fixed drive pulse formed of a remaining drive pulse of the plurality of drive pulses included in the drive pulse train; and a second variable drive pulse to be applied to a coil different from a coil to which the variable drive pulse is to be applied, and that the variable drive pulse is to be used irrespective of a condition, and which one of the fixed drive pulse and the second variable drive pulse is to be used is selected based on an elapsed time from a start of the rotation.

With this, only by detecting the timing for the rotation detection without directly detecting the value of the power supply voltage and the temperature of the electronic watch, it is possible to determine the condition in which temporary reduction in power supply voltage becomes a problem, to thereby avoid a problem of the temporary reduction in power supply voltage due to the large current consumption, while it is possible to achieve a stable high-speed rotation by 360° per step.

Advantageous Effects of Invention

As described above, according to one embodiment the present invention, the rotational drive in increments of 360° per step is enabled by a drive pulse train formed of a plurality of drive pulses, to thereby be able to achieve the high-speed drive of the stepper motor. In addition, the rotor is rotated by one revolution for a short period of time without stopping, and hence the movement of the hands becomes smoother, to thereby be able to provide an electronic watch having satisfactory appearance without awkwardness. Further, the stepper motor is driven in increments of 360° per step, and hence a gear speed reduction ratio can be doubled compared with the related-art rotation by 180° per step for the stepper motor, and the torque of the hands can be increased, which improves the impact resistance of the hands.

BRIEF DESCRIPTION OF DRAWINGS

FIG. 4 are a waveform diagram of a drive pulse, an operation table for transistors in the driver circuit, and operation diagrams of a stepper motor, for illustrating a first step of related-art rotational drive by 180° per step.

FIG. 5 are a waveform diagram of a drive pulse for illustrating a second step of the related-art rotational drive by 180° per step and operation diagrams of the stepper motor.

FIG. 7 are operation diagrams for illustrating rotational drive by 360° per step of the two-coil stepper motor in the first embodiment of the present invention.

FIG. 10 are waveform diagrams for illustrating a high-speed drive pulse and a normal drive pulse in the second embodiment of the present invention.

FIG. 11 is an operation table for transistors in the driver circuit in terms of high-speed drive and normal drive in the second embodiment of the present invention.

FIG. 14 are a waveform diagram of high-speed drive pulses and operation diagrams of high-speed drive of a two-coil stepper motor in the third embodiment of the present invention.

FIG. 16 are a waveform diagram of high-speed drive pulses and operation diagrams of high-speed drive of a two-coil stepper motor in Modification Example 2 of the third embodiment of the present invention.

FIG. 17 are a waveform diagram of high-speed drive pulses and operation diagrams of high-speed drive of a two-coil stepper motor in Modification Example 3 of the third embodiment of the present invention.

FIG. 22 are operation diagrams for illustrating rotational drive by 360° per step of a two-coil stepper motor in the fifth embodiment of the present invention.

FIG. 26 are diagrams for illustrating the rotation and non-rotation of the rotor of the stepper motor.

FIG. 30 is a diagram for illustrating waveforms of induced currents generated in a coil A and a coil B when a variable drive pulse is applied and illustrating pulses applied to coil terminals and detection signals.

FIG. 34 are operation diagrams for illustrating rotational drive by 360° per step of a two-coil stepper motor in the seventh embodiment of the present invention.

FIG. 38 is a diagram for illustrating pulse waveforms in the modification example of the eighth embodiment of the present invention.

DESCRIPTION OF EMBODIMENTS

Now, embodiments of the present invention are described in detail with reference to the accompanying drawings.

[Features of Respective Embodiments]

A feature of a first embodiment of the present invention resides in having a basic configuration of the present invention, which includes one two-coil stepper motor, and in which the two-coil stepper motor is rotated by 360° per step to move a second hand of an electronic watch by one second in one step. A feature of a second embodiment of the present invention resides in having a configuration including two two-coil stepper motors for minute-hour hand drive and for second hand drive, in which the two-coil stepper motor for the minute-hour hand drive is rotated by 360° per step to move a minute hand of the electronic watch by one minute in one step, and in which the two-coil stepper motor for the second hand drive is rotated by 180° per step to move the second hand of the electronic watch by one second in one step. A feature of a third embodiment of the present invention resides in having a configuration including one two-coil stepper motor and two drive pulse generation circuits, namely, a high-speed drive pulse generation circuit and a normal drive pulse generation circuit.

First Embodiment

Figure 1:
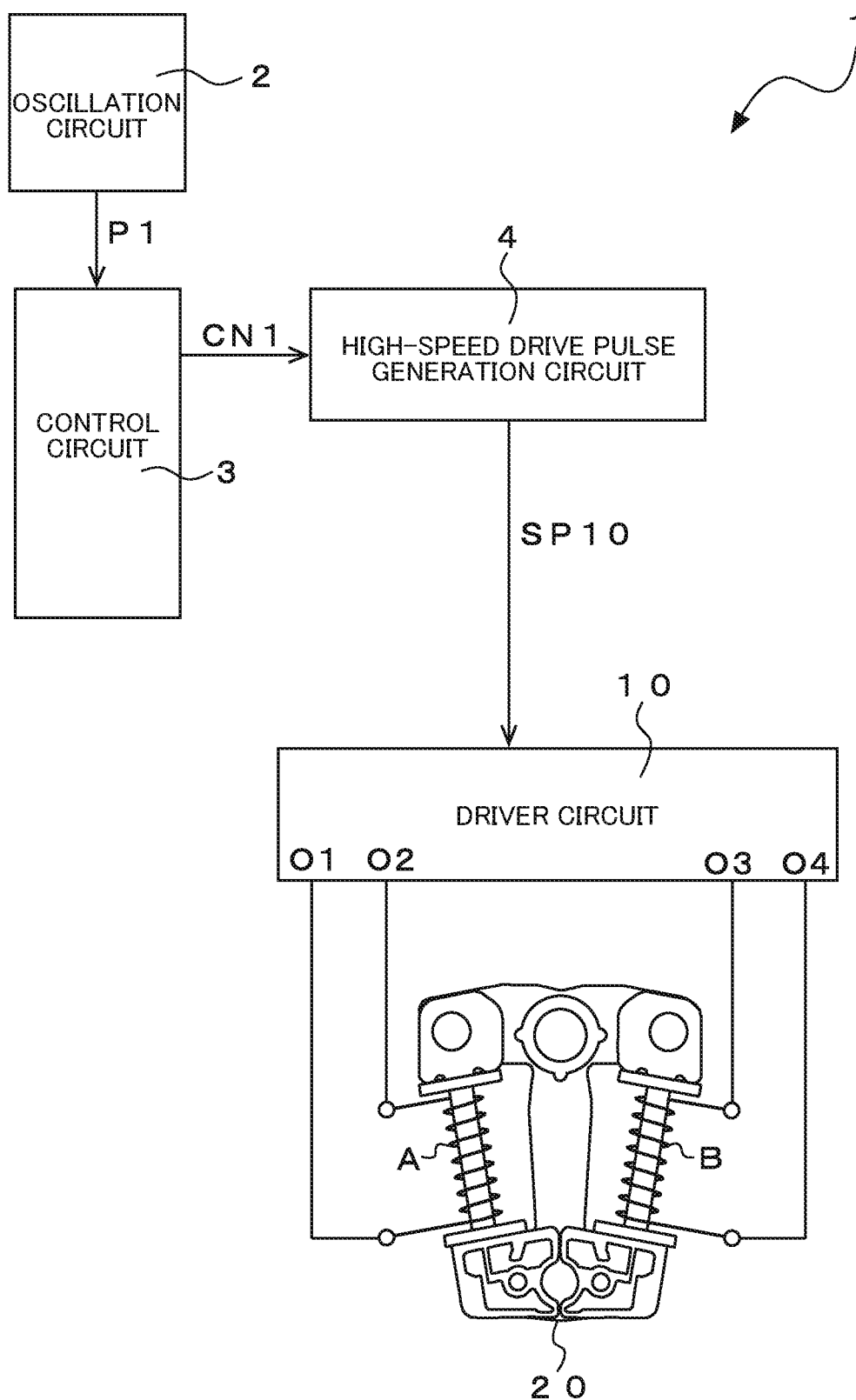
FIG. 1 is a configuration diagram for illustrating a schematic configuration of an electronic watch according to a first embodiment of the present invention.

[Description of Configuration of Electronic Watch According to First Embodiment: FIG. 1]

A schematic configuration of an electronic watch according to the first embodiment is described with reference to FIG. 1. Reference symbol 1 denotes an analog indication-type electronic watch according to the first embodiment. The electronic watch includes an oscillation circuit 2 configured to output a predetermined reference signal P1 through use of a quartz crystal unit (not shown), a control circuit 3 configured to receive as input the reference signal P1 to output a control signal CN1, a high-speed drive pulse generation circuit 4, a driver circuit 10, and a two-coil stepper motor 20 (hereinafter referred to as "stepper motor 20").

The electronic watch 1 includes an indication part including hands and a dial, a wheel train, a power source, and an operation member, but illustration thereof is omitted because those components do not directly relate to the present invention.

The high-speed drive pulse generation circuit 4 receives the control signal CN1 as input from the control circuit 3 to generate a high-speed drive pulse train SP10, which is formed of a plurality of high-speed drive pulses, for driving the stepper motor 20, and output the high-speed drive pulse train SP10 to the driver circuit 10. The high-speed drive pulse train SP10 is composed of, for example, four bits in order to control four buffer circuits of the driver circuit 10, which are described later, to output drive waveforms O1 to O4.

The high-speed drive pulse train SP10 is a drive pulse for rotating the stepper motor 20 in increments of 360° per step, but cannot always drive the hands at high speed depending on a gear speed reduction ratio of the wheel train for moving the hands. However, the high-speed drive pulse train SP10 is a drive pulse that enables the high-speed drive, and is therefore referred to as "high-speed drive pulse train".

The driver circuit 10 receives the high-speed drive pulse train SP10 as input to supply the drive waveforms O1, O2, O3, and O4 that are based on a plurality of drive pulses to the stepper motor 20, to thereby drive the stepper motor 20. A detailed configuration of the driver circuit 10 is described later.

The stepper motor 20 includes two coils, namely, a coil A and a coil B. Details of the stepper motor 20 are described later.

Figure 2:
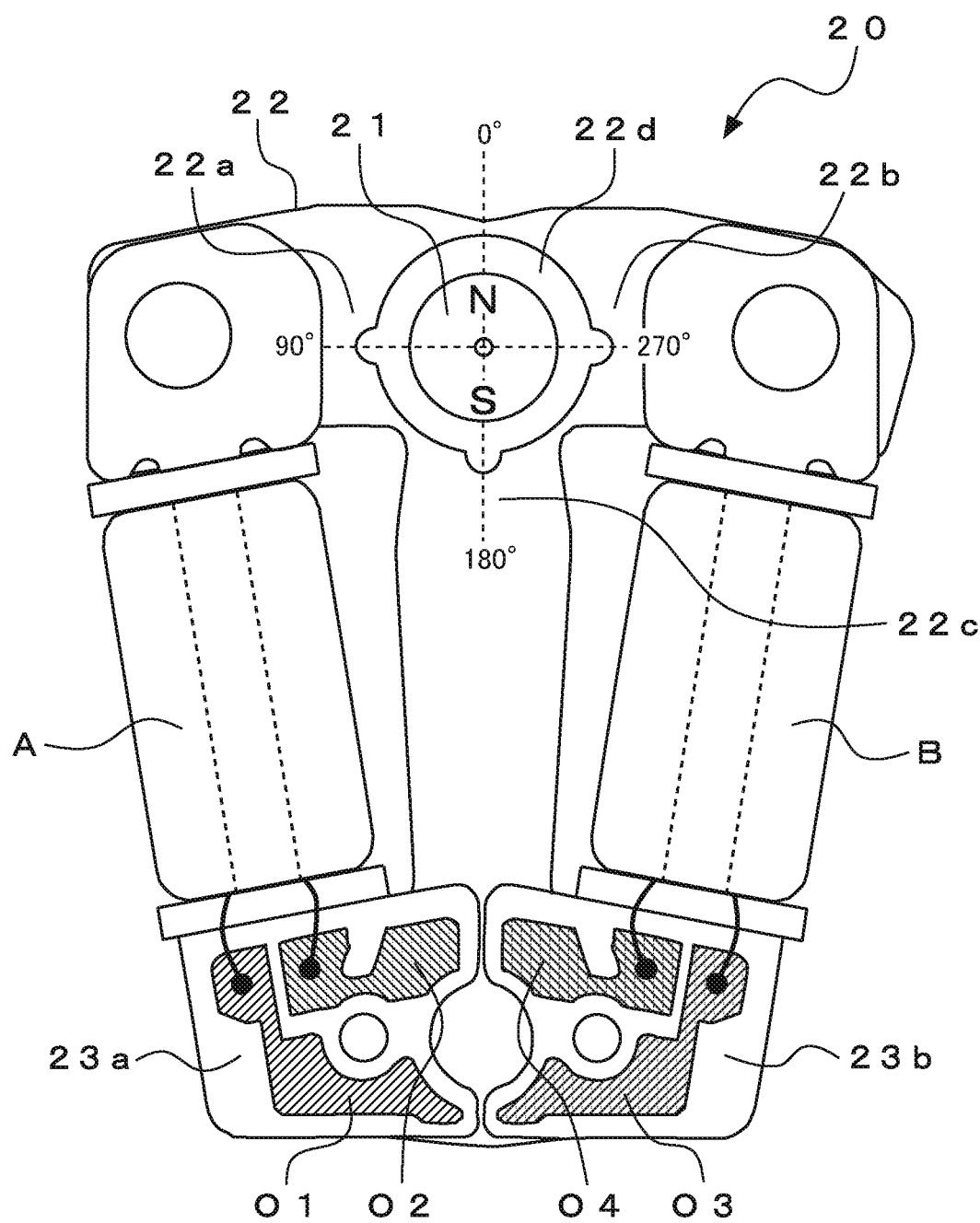
FIG. 2 is a plan view for illustrating a schematic configuration of a two-coil stepper motor in the first embodiment of the present invention.

[Description of Configuration of Stepper Motor: FIG. 2]

Next, the configuration of the stepper motor 20 is described. The stepper motor 20 includes a rotor 21, a stator 22, and the two coils A and B. The rotor 21 is a disc-shaped rotary member magnetized into two poles, and is magnetized to an S-pole and an N-pole in a radial direction of the rotor 21.

The stator 22 is made of a soft magnetic material, and has a rotor hole 22d for allowing the rotor 21 to be inserted therethrough. The rotor 21 is arranged in this rotor hole 22d. The stator 22 includes a first stator magnetic-pole portion 22a (hereinafter abbreviated as "first magnetic-pole portion 22a") and a second stator magnetic-pole portion 22b (hereinafter abbreviated as "second magnetic-pole portion 22b"), which are formed so as to substantially oppose to each other through the rotor 21. Further, the stator 22 includes a third stator magnetic-pole portion 22c (hereinafter abbreviated as "third magnetic-pole portion 22c") formed at a position between the first magnetic-pole portion 22a and the second magnetic-pole portion 22b so as to face the rotor 21.

In addition, the coil A is provided as a first coil to be magnetically coupled to the first magnetic-pole portion 22a and the third magnetic-pole portion 22c, and the coil B is provided as a second coil to be magnetically coupled to the second magnetic-pole portion 22b and the third magnetic-pole portion 22c.

The coil A includes coil terminals O1 and O2 on an insulating substrate 23a, and both ends of winding of the coil A are connected to the coil terminals O1 and O2. Further, the coil B includes coil terminals O3 and O4 on an insulating substrate 23b, and both ends of winding of the coil B are connected to the coil terminals O3 and O4. The above-mentioned drive waveforms O1 to O4 output from the driver circuit 20 are supplied to the coil terminals O1 to O4, respectively.

For easy understanding of the description, the same reference symbol is used for each coil terminal and each drive waveform to be supplied thereto. Further, for example, winding of the coil A is started at the coil terminal O1, and winding of the coil B is started at the coil terminal O4.

The rotor 21 illustrated in FIG. 2 is in a stationary state. The upper side of FIG. 2 is defined as 0°, and 90°, 180°, and 270° are defined from that position in a counterclockwise direction. When the N-pole of the rotor 21 is positioned at 0° and at 180°, the rotor 21 is at a stationary position (statically stable point). Thus, the rotor 21 illustrated in FIG. 2 is at the stationary position with the N-pole being positioned at 0°.

Figure 3:
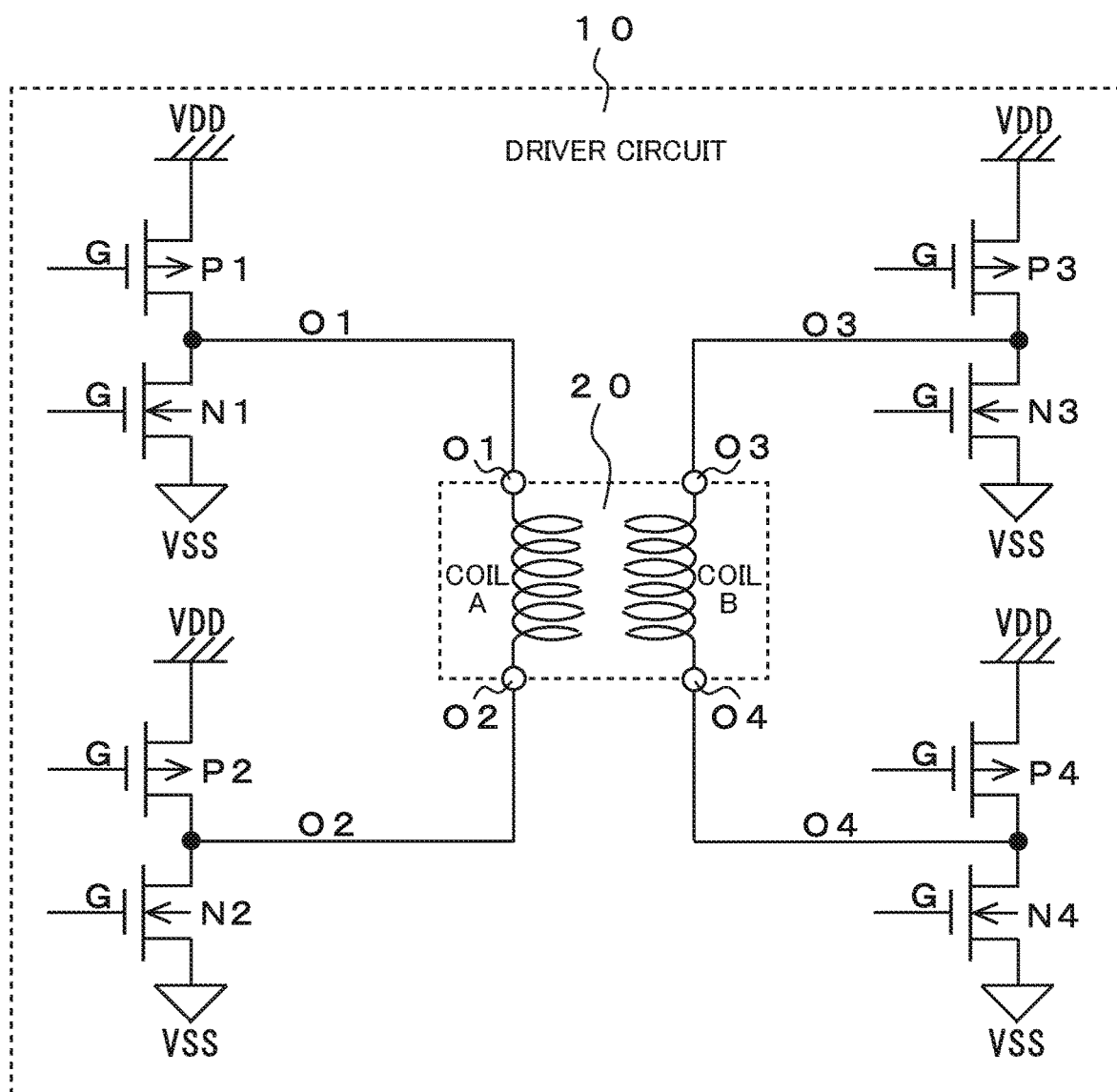
FIG. 3 is a circuit diagram for illustrating an example of a driver circuit in the first embodiment of the present invention.

[Description of Circuit Configuration of Driver Circuit: FIG. 3]

Next, an example of the circuit configuration of the driver circuit 10 configured to drive the stepper motor 20 is described with reference to FIG. 3. The driver circuit 10 includes four buffer circuits configured to supply the drive waveforms O1 and O2 and the drive waveforms O3 and O4 caused by the high-speed drive pulse train SP10 to the coil A and the coil B of the stepper motor 20, respectively.

Now, the configuration of those four buffer circuits is described. First, a buffer circuit including a transistor P1 being a P-channel MOS transistor having a low ON resistance and a transistor N1 being an N-channel MOS transistor having a low ON resistance, which are complementarily connected to each other, outputs the drive waveform O1 to be supplied to the coil terminal O1 of the coil A.

Further, similarly, a buffer circuit including a transistor P2 and a transistor N2 each having a low ON resistance, which are complementarily connected to each other, outputs the drive waveform O2 to be supplied to the coil terminal O2 of the coil A.

Further, similarly, a buffer circuit including a transistor P3 and a transistor N3 each having a low ON resistance, which are complementarily connected to each other, outputs the drive waveform O3 to be supplied to the coil terminal O3 of the coil B.

Further, similarly, a buffer circuit including a transistor P4 and a transistor N4 each having a low ON resistance, which are complementarily connected to each other, outputs the drive waveform O4 to be supplied to the coil terminal O4 of the coil B.

Although not shown, each of gate terminals G of the respective transistors P1 to P4 and N1 to N4 receives the high-speed drive pulse train SP10 output from the above-mentioned high-speed drive pulse generation circuit 4 as input, and each of the transistors is ON/OFF controlled based on the high-speed drive pulse train SP10 to output the drive waveforms O1 to O4. In this case, when the high-speed drive pulse train SP10 is composed of four bits as described above, although not shown, the high-speed drive pulse train SP10 of each of the bits is input to each of the gate terminals G of the transistors of the four buffer circuits. Details of the ON/OFF operation of each of the transistors are described later.

[Description of Drive of Related-Art Two-Coil Stepper Motor: FIG. 4 and FIGS. 5]

Next, a drive waveform for rotationally driving the two-coil stepper motor in increments of 180° per step is known, but is required for understanding the present invention, and hence an example of the related-art drive waveform for performing rotational drive by 180° per step in two steps to perform rotational drive by 360° and the outline of the rotational operation of a related-art stepper motor are described with reference to FIG. 4 and FIG. 5 through use of the stepper motor 20 illustrated in FIG. 2 and the driver circuit 10 of FIG. 3.

First, with reference to FIG. 4, description is given of a drive pulse SP01 in a first step for rotating the N-pole of the rotor 21 of the stepper motor 20 from the stationary position of 0° (see FIG. 2) in the forward rotation direction (counterclockwise) by 180° and the rotational operation of the rotor 21.

FIG. 4(a) is an illustration of a drive waveform based on the drive pulse SP01 for rotating the N-pole of the rotor 21 of the stepper motor 20 from the stationary position of 0° in the forward direction by 180° in one step, and the drive waveforms O1 to O4 output from the driver circuit 10 are illustrated. In this case, the drive waveforms O1 to O4 are maintained at a voltage of 0 V (VDD) in a normal state, and changed to have a voltage of less than 0 V (VSS) due to the drive pulse. The display forms of the drive waveforms O1 to O4 are used for all the drive waveforms described later in common.

FIG. 4(b) is an operation table (ON/OFF operation) for each of the transistors in the driver circuit 10 to be operated based on the drive pulse SP01 in the first step and a drive pulse SP02 in a second step, which is described later, of the stepper motor 20. FIG. 4(c) and FIG. 4(d) are illustrations of the rotational operation of the stepper motor 20 based on the drive pulse SP01 in the first step.

In FIG. 4(a), when the N-pole of the rotor 21 is rotated from the stationary position of 0° in the forward direction in the first step, the drive waveform O3 is changed to have a voltage of less than 0 V due to the drive pulse SP01, and the other drive waveforms O1, O2, and O4 are changed to have a voltage of 0 V. Further, when the output of the drive pulse SP01 is ended, all the drive waveforms O1 to O4 are maintained at a voltage of 0 V until the arrival of the next drive pulse.

Next, with reference to the operation table of FIG. 4(b), description is given of the operation of each of the transistors of the driver circuit 10 due to the drive pulse SP01 in the first step. In this case, the drive waveform O3 is changed to have a voltage of less than 0 V due to the drive pulse SP01, which turns on the transistor N3 and the transistors P4 of the driver circuit 10 and turns off the transistor P3 and the transistor N4, and hence a drive current flows from the coil terminal O4 into the coil terminal O3 to excite the coil B.

Further, the drive waveforms O1 and O2 output from the driver circuit 10 are both changed to have a voltage of 0 V due to the drive pulse SP01 in the first step, which turns on the transistors P1 and P2 and turns off the transistors N1 and N2. The coil terminals O1 and O2 of the coil A are both connected to VDD to be changed to have a voltage of 0 V, and a drive current is not caused to flow into the coil A, which inhibits the coil A from being excited.

Next, with reference to FIG. 4(c) and FIG. 4(d), description is given of the rotational operation of the stepper motor 20 in the first step. In FIG. 4(c), when the drive waveform O3 is changed to have a voltage of less than 0 V due to the drive pulse SP01, as described above, although not shown, a drive current flows from the coil terminal O4 into the coil terminal O3 to excite the coil B (the arrow in the coil B indicates the excitation direction). With this, the second magnetic-pole portion 22b is magnetized to the N-pole, and the third magnetic-pole portion 22c is magnetized to the S-pole. In addition, the coil A is inhibited from being excited. Thus, the first magnetic-pole portion 22a has the S-pole in the same manner as the third magnetic-pole portion 22c.

As a result, the N-pole of the rotor 21 and the S-poles of the first magnetic-pole portion 22a and the third magnetic-pole portion 22c attract each other, while the S-pole of the rotor 21 and the N-pole of the second magnetic-pole portion 22b attract each other. Thus, the rotor 21 is rotated from the stationary position of 0° in the counterclockwise direction by about 135°.

Next, in FIG. 4(d), when the drive pulse SP01 is ended, the coil B stops being excited, which cancels the magnetization of the first to third magnetic-pole portions 22a to 22c, but the rotor 21 continues to rotate until the N-pole moves from the position of about 135° to reach the statically stable point of 180°, and is held at that position. As a result, the rotor 21 is rotationally driven by 180° due to the drive pulse SP01 in the first step.

Next, with reference to FIG. 5, description is given of the drive pulse SP02 in the second step for rotating the N-pole of the rotor 21 of the stepper motor 20 from the stationary position of 180° in the forward direction (counterclockwise) and the rotational operation of the rotor 21. FIG. 5(a) is an illustration of a drive waveform based on the drive pulse SP02 for rotating the N-pole of the rotor 21 of the stepper motor 20 from the stationary position of 180° in the forward direction by 180° in one step, and the drive waveforms O1 to O4 output from the driver circuit 10 are illustrated. FIG. 5(b) to FIG. 5(d) are illustrations of the rotational operation of the stepper motor 20 based on the drive pulse SP02 in the second step.

In FIG. 5(a), when the N-pole of the rotor 21 is rotated from the stationary position of 180° in the forward direction in the second step, the drive waveform O4 is changed to have a voltage of less than 0 V due to the drive pulse SP02, and the other drive waveforms O1, O2, and O3 are changed to have a voltage of 0 V. Further, when the output of the drive pulse SP02 is ended, all the drive waveforms O1 to O4 are maintained at a voltage of 0 V until the arrival of the next drive pulse.

Next, with reference to the operation table of FIG. 4(b), description is given of the operation of each of the transistors of the driver circuit 10 due to the drive pulse SP02 in the second step. In this case, the drive waveform O4 is changed to have a voltage of less than 0 V due to the drive pulse SP02, which turns on the transistor N4 and the transistors P3 of the driver circuit 10 and turns off the transistor P4 and the transistor N3, and hence a drive current flows from the coil terminal O3 into the coil terminal O4 to excite the coil B in a direction reverse to that of the first step.

Further, similarly to the first step, the drive waveforms O1 and O2 are both changed to have a voltage of 0 V due to the drive pulse SP02 in the second step, which turns on the transistors P1 and P2 and turns off the transistors N1 and N2. The coil terminals O1 and O2 of the coil A are both connected to VDD to be changed to have a voltage of 0 V, and a drive current is not caused to flow into the coil A, which inhibits the coil A from being excited.

Next, with reference to FIG. 5(b) to FIG. 5(d), description is given of the rotational operation of the stepper motor 20 in the second step. FIG. 5(b) indicates the initial position of the rotor 21 in the second step, and is an illustration of a state in which the N-pole of the rotor 21 is located at the stationary position of 180° (downward direction on the figure) and is held.

After this state, in FIG. 5(c), when the drive waveform O4 is changed to have a voltage of less than 0 V due to the drive pulse SP02, as described above, although not shown, a drive current flows from the coil terminal O3 into the coil terminal O4 to excite the coil B (the arrow in the coil B indicates the excitation direction). With this, the second magnetic-pole portion 22b is magnetized to the S-pole, and the third magnetic-pole portion 22c is magnetized to the N-pole. In addition, the coil A is inhibited from being excited. Thus, the first magnetic-pole portion 22a has the N-pole in the same manner as the third magnetic-pole portion 22c.

As a result, the S-pole of the rotor 21 and the N-poles of the first magnetic-pole portion 22a and the third magnetic-pole portion 22c attract each other, while the N-pole of the rotor 21 and the S-pole of the second magnetic-pole portion 22b attract each other. Thus, the rotor 21 is rotated from the stationary position of 180° in the counterclockwise direction, and the N-pole of the rotor 21 is rotated from 0° to the position of about 315°.

Next, in FIG. 5(d), when the drive pulse SP02 is ended, the coil B stops being excited, which cancels the magnetization of the first to third magnetic-pole portions 22a to 22c, but the rotor 21 continues to rotate until the N-pole moves from the position of about 315° to reach the statically stable point of 0°, and is held at that position. As a result, the rotor 21 is rotationally driven by 180° due to the drive pulse SP02 in the second step.

In this manner, the related-art two-coil stepper motor is normally rotationally driven in increments of 180° per step due to a one-shot drive pulse, and accordingly is rotationally driven by 360° in two steps. In this rotational drive by 360° in two steps, there is a time interval between the drive pulse SP01 in the first step and the drive pulse SP02 in the second step. Even with the two-coil stepper motor, as described above, there occur, for example, deceleration, vibration, stop, and reacceleration in the movement of the rotor 21, and the hands move in an awkward and unnatural manner to exhibit lack in smoothness and poor-looking movement, which causes a problem.

Figure 6:
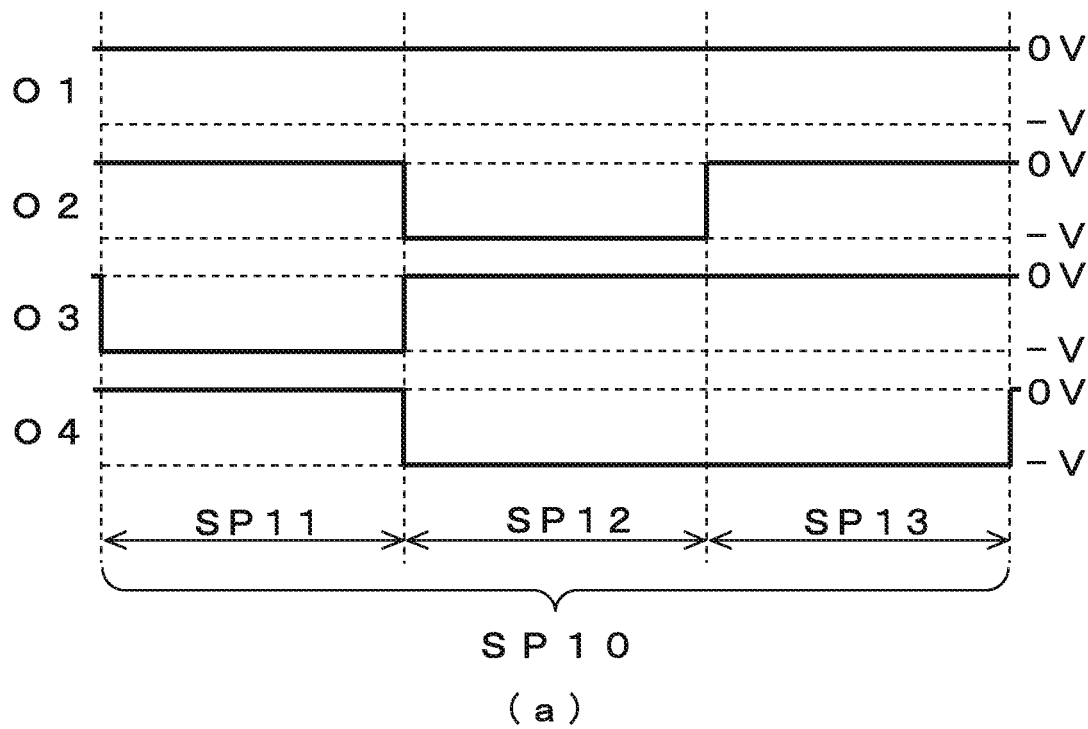
FIG. 6 are a waveform diagram of a high-speed drive pulse train and an operation table for transistors in the driver circuit in the first embodiment of the present invention.

[Description of High-Speed Drive Pulse and Operation of Each Transistor of Driver Circuit in First Embodiment: FIGS. 6]

Next, with reference to FIG. 6, description is given of an example of the drive waveform of a high-speed drive pulse for rotationally driving the stepper motor in the first embodiment in increments of 360° per step and the operation of each of the transistors of the driver circuit.

First, with reference to FIG. 6(a), description is given of the drive waveform of the high-speed drive pulse train SP10 for rotationally driving the N-pole of the rotor 21 of the stepper motor 20 from the stationary position of 0° (see FIG. 2) in the forward rotation direction (counterclockwise) in increments of 360°. FIG. 6(a) is an illustration of a drive waveform based on the high-speed drive pulse train SP10 for rotating the rotor 21 of the stepper motor 20 in increments of 360° per step and an example of the four drive waveforms O1 to O4 to be output from the driver circuit 10.

In FIG. 6(a), the high-speed drive pulse train SP10 is formed of three drive pulses, namely, a first drive pulse SP11, a second drive pulse SP12, and a third drive pulse SP13 so as to be output sequentially.

In the first drive pulse SP11, the drive waveform O3 has a voltage of less than 0 V, and the other drive waveforms O1, O2, and O4 have a voltage of 0 V. With this, a drive current flows into the coil B of the stepper motor 20 connected to the drive waveforms O3 and O4 to excite the coil B.

Further, in the second drive pulse SP12, the drive waveforms O2 and O4 have a voltage of less than 0 V, and the drive waveforms O1 and O3 have a voltage of 0 V. With this, a drive current flows into both the coil A and the coil B of the stepper motor 20 to excite both the coil A and the coil B.

Further, in the third drive pulse SP13, the drive waveform O4 has a voltage of less than 0 V, and the other drive waveforms O1, O2, and O3 have a voltage of 0 V. With this, the coil B of the stepper motor 20 is excited in the same direction as in the case of the second drive pulse SP12.

A cycle period of the high-speed drive pulse train SP10, namely, a total sum of the pulse widths of the first to third drive pulses SP11 to SP13 is freely set. Each of the drive waveforms O1 to O4 is illustrated as that of a continuous full pulse, but may be that of a chopper-shape drive pulse based on a plurality of minute pulse groups.

Next, with reference to the operation table of FIG. 6(b), description is given of the operation of each of the transistors of the driver circuit 10 based on the high-speed drive pulse train SP10. In regard to the driver circuit 10, FIG. 3 is referred to. In FIG. 6(b), in the first drive pulse SP11, the drive waveform O3 has a voltage of less than 0 V, and the drive waveform O4 has a voltage of 0 V. Thus, the transistor N3 and the transistor P4 are turned on, while the transistor P3 and the transistor N4 are turned off, and a drive current flows from the coil terminal O4 of the coil B into the coil terminal O3 to excite the coil B.

Further, the drive waveforms O1 and O2 both have a voltage of 0 V, and hence the transistors P1 and P2 are turned on, while the transistors N1 and N2 are turned off. Thus, a drive current is not caused to flow into the coil A, which inhibits the coil A from being excited.

Further, in the second drive pulse SP12, the drive waveform O1 has a voltage of 0 V, and the drive waveform O2 has a voltage of less than 0 V. Thus, the transistor P1 and the transistor N2 are turned on, and the transistor N1 and the transistor P2 are turned off, which causes a drive current to flow from the coil terminal O1 to the coil terminal O2 to excite the coil A. Further, the drive waveform O3 has a voltage of 0 V, and the drive waveform O4 has a voltage of less than 0 V. Thus, the transistor P3 and the transistor N4 are turned on, and the transistor N3 and the transistor P4 are turned off, which causes a drive current to flow from the coil terminal O3 into the coil terminal O4 to excite the coil B.

Further, in the third drive pulse SP13, the drive waveform O3 has a voltage of 0 V, and the drive waveform O4 has a voltage of less than 0 V. Thus, the transistor P3 and the transistor N4 are turned on, and the transistor N3 and the transistor P4 are turned off, which causes a drive current to flow from the coil terminal O3 to the coil terminal O4 to excite the coil B. Further, the drive waveforms O1 and O2 both have a voltage of 0 V. Thus, the transistor P1 and P2 are turned on, the transistor N1 and N2 are turned off, and a drive current is not caused to flow into the coil A, which inhibits the coil A from being excited.

In this manner, each of the transistors of the driver circuit 10 is ON/OFF controlled based on the three drive pulses, namely, the first to third drive pulses SP11 to SP13 of the high-speed drive pulse train SP10, to thereby excite the coils A and B of the stepper motor 20.

[Description of Rotational Drive by 360° Per Step in First Embodiment: FIGS. 7]

Next, with reference to FIG. 7, description is given of the high-speed rotational drive of the stepper motor 20 in increments of 360° per step in the first embodiment. As conditions of the description, it is assumed that the drive pulse is the high-speed drive pulse train SP10 illustrated and shown in FIG. 6, and the N-pole of the rotor 21 is located at the stationary position of 0° in the initial state of the stepper motor 20 as illustrated in FIG. 2 referred to above. Further, the reference symbols of the respective members of the stepper motor 20 are written only in FIG. 7(a) and omitted in the other figures.

FIG. 7(a) is an illustration of a state in which the first drive pulse SP11 of the high-speed drive pulse train SP10 is supplied to the stepper motor 20. In this case, as described above, a drive current (not shown) flows from the coil terminal O4 into the coil terminal O3 to excite the coil B in the direction indicated by the arrow. With this, the second magnetic-pole portion 22b is magnetized to the N-pole, and the third magnetic-pole portion 22c is magnetized to the S-pole. In addition, the coil A is inhibited from being excited. Thus, the first magnetic-pole portion 22a has the S-pole in the same manner as the third magnetic-pole portion 22c.

As a result, the N-pole of the rotor 21 and the S-poles of the first magnetic-pole portion 22a and the third magnetic-pole portion 22c attract each other, while the S-pole of the rotor 21 and the N-pole of the second magnetic-pole portion 22b attract each other. Thus, the rotor 21 is rotated in the counterclockwise direction, and the N-pole of the rotor 21 is rotated from the stationary position of 0° to the position of about 135°.

Next, in FIG. 7(b), when the second drive pulse SP12 is supplied, as described above, a drive current (not shown) flows from the coil terminal O1 into the coil terminal O2 to excite the coil A in the direction indicated by the arrow. Further, similarly, a drive current (not shown) flows from the coil terminal O3 into the coil terminal O4 to excite the coil B in the direction indicated by the arrow (direction reverse to that of the coil A).

With this, the first magnetic-pole portion 22a is magnetized to the N-pole, the second magnetic-pole portion 22b is magnetized to the S-pole, and the third magnetic-pole portion 22c is not magnetized due to canceled magnetization. As a result, the N-pole of the rotor 21 and the S-pole of the second magnetic-pole portion 22b attract each other, while the S-pole of the rotor 21 and the N-pole of the first magnetic-pole portion 22a attract each other. Thus, the rotor 21 is further rotated in the counterclockwise direction without stopping, and the N-pole of the rotor 21 is rotated to reach the position of about 270°.

Next, in FIG. 7(c), when the second drive pulse SP13 is supplied, as described above, a drive current (not shown) flows from the coil terminal O3 into the coil terminal O4 to excite the coil B in the direction indicated by the arrow. With this, the second magnetic-pole portion 22b is magnetized to the S-pole, and the third magnetic-pole portion 22c is magnetized to the N-pole. In addition, the coil A is inhibited from being excited. Thus, the first magnetic-pole portion 22a has the N-pole in the same manner as the third magnetic-pole portion 22c. As a result, the S-pole of the rotor 21 and the N-poles of the first magnetic-pole portion 22a and the third magnetic-pole portion 22c attract each other. Thus, the rotor 21 is further rotated in the counterclockwise direction without stopping, and the N-pole of the rotor 21 is rotated to reach the position of about 315°.

Next, in FIG. 7(d), when the supply of the high-speed drive pulse train SP10 is ended, the drive waveforms O1 to O4 all have a voltage of 0 V. Thus, the coil A and the coil B of the stepper motor 20 stop being excited, which cancels the magnetization of the first to third magnetic-pole portions 22a to 22c, but the rotor 21 continues to rotate until the N-pole moves from the position of about 315° to reach the statically stable point of) 360° (0°) without stopping, and is held at that position. In this manner, the stepper motor 20 is rotationally driven by 360° through one-step drive based on the high-speed drive pulse train SP10 formed of the three drive pulses SP11 to SP13. That is, it is possible to achieve the rotational drive in increments of 360° per step.

As described above, with the electronic watch according to the first embodiment, it is possible to perform the rotational drive in increments of 360° in one step by supplying the high-speed drive pulse train SP10 formed of the three drive pulses SP11 to SP13 to the stepper motor 20. With this, although the hands are hitherto moved for one second with the gear speed reduction ratio of the wheel train being set to 1/30 in the rotation by 180° per step, in the first embodiment, the stepper motor is driven to be rotated by 360° per step, which enables the hands to be moved for one second with the gear speed reduction ratio being double to 1/60, and an increase in torque of the hands can be achieved, to thereby greatly increase the impact resistance of the hands.

Further, the rotor 21 is rotated in increments of 360° without stopping during the rotation, and hence the movement of the hands becomes smoother, to thereby be able to provide an electronic watch having satisfactory appearance without awkwardness. Further, the stepper motor is rotated by 360° per step, to thereby be able to alleviate the deviation of the position indicated by the hands due to a backlash of the wheel train or the like.

When the N-pole of the rotor 21 of the stepper motor 20 is located at the stationary position of 0° (see FIG. 2), in order to rotate the rotor 21 reversely (in the clockwise direction) by 360° per step, although not shown, the stepper motor 20 is driven with the drive waveforms O1 and O4 being exchanged to each other and the drive waveforms O2 and O3 being exchanged to each other in the drive waveforms O1 to O4 illustrated in FIG. 6(a), to thereby be able to reversely rotate the rotor 21. Also in this reverse drive, the rotor 21 can be rotated in increments of 360° per step, and hence is possible to obtain the same effects.

Further, when the N-pole of the rotor 21 of the stepper motor 20 is located at the stationary position of 180° (S-pole is at 0°), the rotor 21 can be similarly driven in increments of 360° per step with the drive waveforms O1 and O2 being exchanged to each other and the drive waveforms O3 and O4 being exchanged to each other in the drive waveforms O1 to O4 illustrated in FIG. 6(a).

Second Embodiment

Figure 8:
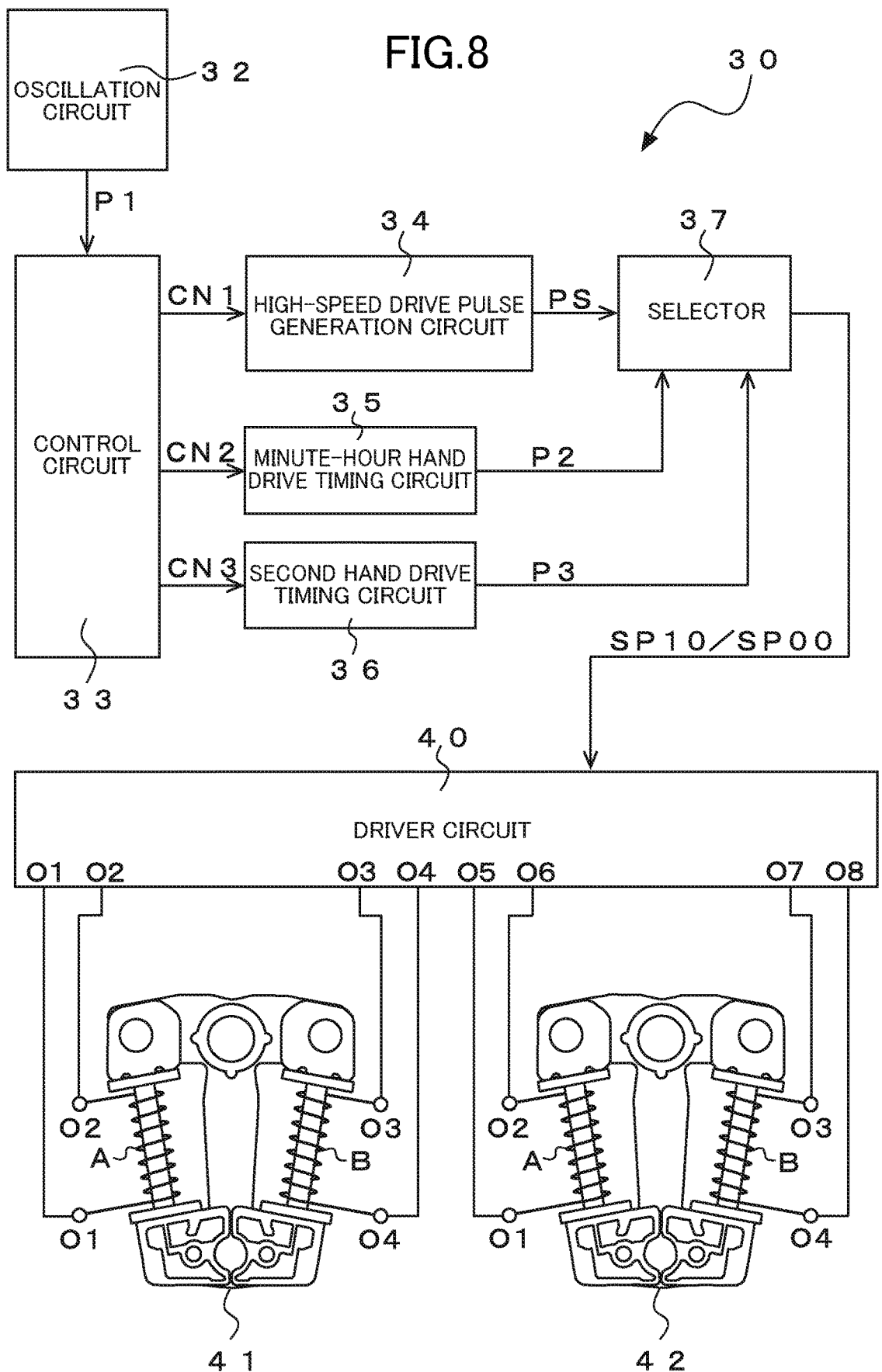
FIG. 8 is a configuration diagram for illustrating a schematic configuration of an electronic watch according to a second embodiment of the present invention.

[Description of Configuration of Electronic Watch According to Second Embodiment: FIG. 8]

Next, a schematic configuration of an electronic watch according to the second embodiment is described with reference to FIG. 8. Reference symbol 30 denotes an analog indication-type electronic watch according to the second embodiment. The electronic watch 30 includes an oscillation circuit 32 configured to output the predetermined reference signal P1 through use of a quartz crystal unit (not shown), a control circuit 33 configured to receive as input the reference signal P1 to output control signals CN1, CN2, and CN3, a high-speed drive pulse generation circuit 34, a minute-hour hand drive timing circuit 35, a second hand drive timing circuit 36, a selector 37, a driver circuit 40, a first two-coil stepper motor 41 (hereinafter abbreviated as "stepper motor 41"), and a second two-coil stepper motor 42 (hereinafter abbreviated as "stepper motor 42").

The electronic watch 30 includes an indication part including hands, a wheel train, a power source, and an operation member, but illustration thereof is omitted because those components do not directly relate to the present invention.

The high-speed drive pulse generation circuit 34 receives the control signal CN1 as input to generate and output a high-speed drive pulse train SP, which is formed of a plurality of high-speed drive pulses, for driving the stepper motors 41 and 42.

The minute-hour hand drive timing circuit 35 receives the control signal CN2 as input, and generates and outputs a high-speed drive timing signal P2 for selecting a high-speed drive pulse for driving minute-hour hands.

The secondhand drive timing circuit 36 receives the control signal CN3 as input, and generates and outputs a normal drive timing signal P3 for selecting a normal drive pulse for driving a second hand.

The selector 37 receives the high-speed drive pulse train SP as input, and passes the high-speed drive pulse train SP as it is based on the high-speed drive timing signal P2 to output the high-speed drive pulse train SP as the high-speed drive pulse train SP10. Further, the selector 37 selects a specific drive pulse of the high-speed drive pulse train SP based on the normal drive timing signal P3 to output the specific drive pulse as a normal drive pulse SP00. A case in which the high-speed drive pulse train SP10 is output is referred to as "high-speed drive mode", and a case in which the normal drive pulse SP00 is output is referred to as "normal drive mode".

The driver circuit 40 receives, as input, the high-speed drive pulse train SP10 or the normal drive pulse SP00 from the selector 37, and supplies the drive waveforms O1 to O4 and drive waveforms O5 to O8 based on the respective drive pulses to the coils A and the coils B of the respective two stepper motors 41 and 42, to thereby drive the stepper motors 41 and 42. A detailed configuration of the driver circuit 40 is described later.

The stepper motors 41 and 42 each include the coil A and the coil B, and have the same configuration as that of the stepper motor 20 in the first embodiment (see FIG. 2), and hence detailed description thereof is omitted. In this case, the stepper motor 41 is arranged to drive, for example, the minute-hour hands (not shown) of the electronic watch 30, and the stepper motor 42 is arranged to drive, for example, the second hand (not shown) of the electronic watch 30.

The coil terminals O1 and O2 of the coil A of the stepper motor 41 are connected to the drive waveforms O1 and O2 output from the driver circuit 40, respectively, while the coil terminals O3 and O4 of the coil B are connected to the drive waveforms O3 and O4 output from the driver circuit 40, respectively. Further, the coil terminals O1 and O2 of the coil A of the other stepper motor 42 are connected to the drive waveforms O5 and O6 output from the driver circuit 40, respectively, while the coil terminals O3 and O4 of the coil B are connected to the drive waveforms O7 and O8 output from the driver circuit 40, respectively. In this manner, the feature of the electronic watch 30 according to the second embodiment resides in including the two stepper motors 41 and 42 for the minute-hour hand drive and for the second hand drive.

Figure 9:
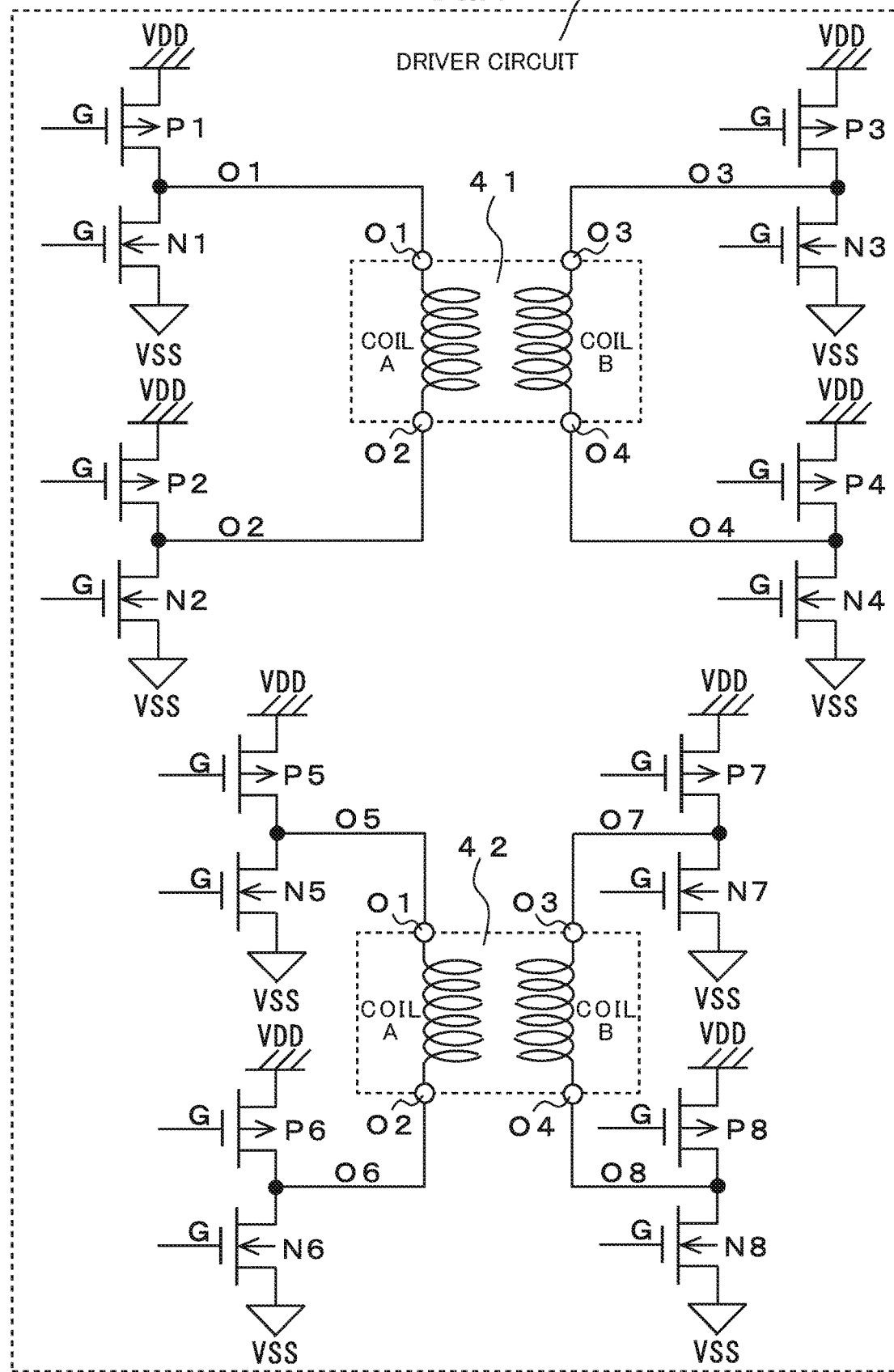
FIG. 9 is a circuit diagram for illustrating an example of a driver circuit in the second embodiment of the present invention.

[Description of Circuit Configuration of Driver Circuit in Second Embodiment: FIG. 9]

Next, with reference to FIG. 9, description is given of an example of the circuit configuration of the driver circuit 40 configured to drive the stepper motors 41 and 42. The driver circuit 40 is formed of eight buffer circuits configured to supply eight drive waveforms to the coils A and the coils B of the respective stepper motors 41 and 42.

In this case, a buffer circuit including the transistor P1 being a P-channel MOS transistor having a low ON resistance and the transistor N1 being an N-channel MOS transistor having a low ON resistance, which are complementarily connected to each other, outputs the drive waveform O1 and is connected to the coil terminal O1 of the coil A. Further, similarly, a buffer circuit including the transistor P2 and the transistor N2 each having a low ON resistance outputs the drive waveform O2 and is connected to the coil terminal O2 of the coil A.

Further, similarly, a buffer circuit including the transistor P3 and the transistor N3 each having a low ON resistance outputs the drive waveform O3 and is connected to the coil terminal O3 of the coil B.

Further, similarly, a buffer circuit including the transistor P4 and the transistor N4 each having a low ON resistance outputs the drive waveform O4 and is connected to the coil terminal O4 of the coil B.

Further, for the stepper motor 42, a buffer circuit including a transistor P5 having a low ON resistance and a transistor N5 having a low ON resistance, which are complementarily connected to each other, outputs the drive waveform O5 and is connected to the coil terminal O1 of the coil A.

Further, similarly, a buffer circuit including a transistor P6 and a transistor N6 each having a low ON resistance outputs the drive waveform O6 and is connected to the coil terminal O2 of the coil A.

Further, similarly, a buffer circuit including a transistor P7 and a transistor N7 each having a low ON resistance outputs the drive waveform O7 and is connected to the coil terminal O3 of the coil B.

Further, similarly, a buffer circuit including a transistor P8 and a transistor N8 each having a low ON resistance outputs the drive waveform O8 and is connected to the coil terminal O4 of the coil B.

Although not shown, each of gate terminals G of the respective transistors P1 to P8 and N1 to N8 receives the high-speed drive pulse train SP10 or the normal drive pulse SP00 output from the above-mentioned selector 37 as input, and each of the transistors is ON/OFF controlled based on the drive pulse to supply the drive waveforms O1 to O4 and the drive waveforms O5 to O8 to the coils A and the coils B of the respective two stepper motors 41 and 42.

[Description of Generation of Drive Pulse and Drive Waveform in Second Embodiment: FIGS. 10]

Next, with reference to FIG. 10, description is given of an example of the generation of a drive pulse and a drive waveform in the second embodiment. FIG. 10(a) is an example of the high-speed drive pulse train SP output from the high-speed drive pulse generation circuit 34, the high-speed drive timing signal P2, and the normal drive timing signal P3. FIG. 10(b) is an example of the drive waveform of the high-speed drive pulse train SP10 for driving the minute-hour hands in the high-speed drive mode. FIG. 10(c) is an example of the drive waveform of the normal drive pulse SP00 for driving the second hand in the normal drive mode. FIG. 10(a) to FIG. 10(c) share the same time axis when drawn. In regard to the configuration of the electronic watch 30, the configuration diagram of FIG. 8 is referred to.

In FIG. 10(a), the high-speed drive pulse train SP to be output from the high-speed drive pulse generation circuit 34 is a pulse train composed of, for example, four bits SPa to SPd and formed of three drive pulses, namely, a first drive pulse SP1, a second drive pulse SP2, and a third drive pulse SP3 in time series, which includes a logical "1" or a logical "0" in order to ON/OFF control each of the transistors of the driver circuit 40.

In the first drive pulse SP1, SPa, SPb, and SPd are a logical "1", and SPc is a logical "0". Further, in the second drive pulse SP2, SPa and SPc are a logical "1", and SPb and SPd are a logical "0". Further, in the third drive pulse SP3, SPa, SPb, and SPc are a logical "1", and SPd is a logical "0". This high-speed drive pulse train SP is repeatedly output for a freely-set period at a predetermined cycle under control of the control circuit 33, and it is indicated in FIG. 10(a) that the output is repeated at least two times.

Further, the high-speed drive timing signal P2 is a signal indicating, for example, a logical "0" at the timing of the first to third drive pulses SP1 to SP3 of the high-speed drive pulse train SP and a logical "1" at another timing. In the high-speed drive mode, the selector 37 passes the high-speed drive pulse train SP at the timing of the logical "0" of the high-speed drive timing signal P2, and supplies the high-speed drive pulse train SP to the driver circuit 40 as the high-speed drive pulse train SP10.

Further, the normal drive timing signal P3 is a signal having two steps and indicating a logical "0" in accordance with the timing of the first drive pulse SP1 of the high-speed drive pulse train SP in the initial first step and a logical "0" in accordance with the timing of the third drive pulse SP3 in the subsequent second step. In the normal drive mode, the selector 37 passes the first drive pulse SP1 (in the first step) and the third drive pulse SP3 (in the second step) of the high-speed drive pulse train SP at the timing of the logical "0" of the normal drive timing signal P3, and supplies the first drive pulse SP1 and the third drive pulse SP3 to the driver circuit 40 as the normal drive pulse SP00.

Next, with reference to FIG. 10(b), description is given of the drive pulse in the high-speed drive mode. When the high-speed drive mode is selected, the control circuit 33 outputs the control signal CN2, and the minute-hour hand drive timing circuit 35 outputs the high-speed drive timing signal P2 based on the control signal CN2. The selector 37 operates so that the four-bit high-speed drive pulse train SP passes therethrough to be output based on the high-speed drive timing signal P2.

With this, in the high-speed drive mode, as described above, the four-bit high-speed drive pulse train SP passes through the selector 37 as it is to be supplied to the driver circuit 40 as the high-speed drive pulse train SP10. The high-speed drive pulse train SP10 output from the selector 37 is the same as the high-speed drive pulse train SP10 in the first embodiment, and is therefore denoted by the same reference symbol, and the first, second, and third drive pulses SP11, SP12, and SP13, which form the high-speed drive pulse train SP10, are also denoted by the same reference symbols.

The driver circuit 40 sequentially ON/OFF operates each of the transistors based on the first to third drive pulses SP11 to SP13 of the input four-bit high-speed drive pulse train SP10 to output the drive waveforms O1 to O4 illustrated in FIG. 10(b).

The coil A and the coil B of the stepper motor 41 receive those drive waveforms O1 to O4 as input to be rotationally driven at high speed in increments of 360° per step. The high-speed rotational drive performed by the stepper motor 41 is the same as the high-speed rotational drive in increments of 360° per step in the above-mentioned first embodiment (see FIG. 7), and hence the description of the operation of the stepper motor is omitted.

In this case, when a cycle period T1 (see FIG. 10(b)) of the high-speed drive pulse train SP10 is set to 60 seconds and the gear speed reduction ratio of the wheel train (not shown) is set large (to 1/60) so that the minute hand proceeds by one minute based on the rotation by 360° per step of the stepper motor 41, the stepper motor 41 is rotated by 360° every 60 seconds, to thereby be able to move the minute hand by one minute.

Next, with reference to FIG. 10(c), description is given of the drive pulse in the normal drive mode. When the normal drive mode is selected, the control circuit 33 outputs the control signal CN3, and the second hand drive timing circuit 36 outputs the normal drive timing signal P3 based on the control signal CN3. The selector 37 operates so that the four-bit high-speed drive pulse train SP passes therethrough to be output during a period in which the normal drive timing signal P3 is a logical "0".

With this, in the normal drive mode, as described above, the four-bit normal drive pulse SP00 selected by the selector 37 is output to be supplied to the driver circuit 40. The drive pulse in the first step of the normal drive pulse SP00 is referred to as "first drive pulse SP01", and the drive pulse in the second step of the normal drive pulse SP00 is referred to as "second drive pulse SP02".

The driver circuit 40 ON/OFF operates each of the transistors based on the first drive pulse SP01 and the second drive pulse SP02 of the input four-bit normal drive pulse train SP00 to output the drive waveforms O5 to O8 illustrated in FIG. 10(c).

In this case, in the first drive pulse SP01 being the first step of the normal drive pulse SP00, the selected high-speed drive pulse train SPc indicates a logical "0" (see FIG. 10(a)), and hence the drive waveform O7 is controlled so as to have a voltage of less than 0 V, and the other drive waveforms O5, O6, and O8 have a voltage of 0 V. Further, in the second drive pulse SP02 being the second step of the normal drive pulse SP00, the selected high-speed drive pulse train SPd indicates a logical "0" (see FIG. 10(a)), the drive waveform O8 is controlled so as to have a voltage of less than 0 V, and the other drive waveforms O5, O6, and O7 have a voltage of 0 V. The coil A and the coil B of the stepper motor 42 receive those drive waveforms O5 to O8 as input to be subjected to normal drive.

The drive waveforms O5 to O8 based on this normal drive pulse SP00 are the same as the drive waveforms in the related-art rotation by 180° per step described above with reference to FIG. 4 and FIG. 5. Thus, the normal drive operation of the stepper motor 42 is the same as the related-art rotational drive by 180° per step, which is illustrated and shown in FIG. 4 and FIG. 5, and hence description thereof is omitted here.

In this manner, the normal drive pulse SP00 in the normal drive mode enables the stepper motor 42 configured to drive the second hand to be rotated by 180° per step. Then, when a cycle period T2 (FIG. 10(c)) between the first drive pulse SP01 and the second drive pulse SP02 is set to, for example, one second, the stepper motor 42 is rotated by 180° every second, to thereby be able to move the second hand by one second. That is, in the second embodiment, the minute hand is moved by one minute by subjecting the stepper motor 41 to the rotational drive by 360° per step due to the high-speed drive pulse train SP10 in the high-speed drive mode, while in the normal drive mode, the second hand is moved by one second by subjecting the stepper motor 42 to the rotational drive by 180° per step due to the normal drive pulse SP00 as in the related art.

The drive waveforms O1 to O4 based on the high-speed drive pulse train SP10 in the high-speed drive mode, which are illustrated in FIG. 10(b), are not limited to those drive waveforms, and any drive waveform that can subject the two-coil stepper motor to the rotational drive by 360° per step may be employed.

[Description of Operation of Driver Circuit in Second Embodiment: FIG. 11]

Next, with reference to the operation table for each of the transistors of FIG. 11, description is given of how each of the drive waveforms for the high-speed drive pulse train SP10 and the normal drive pulse SP00 is created based on the ON/OFF operation of each of the transistors of the driver circuit 40 in the second embodiment.

As described above, the driver circuit 40 in the second embodiment is formed of the eight buffer circuits, namely, the eight transistors P1 to P8 and the eight transistors N1 to N8, which are complementarily connected to each other, and the drive waveforms O1 to O8 are output from the respective buffer circuits (see FIG. 9).

First, with reference to the left part of the operation table of FIG. 11, description is given of the ON/OFF operation of each of the transistors in the high-speed drive mode. The stepper motor 41 driven in the high-speed drive mode (minute-hour hand drive) is driven based on the drive waveforms O1 to O4, and hence the transistors P1 to P4 and the transistors N1 to N4 of the driver circuit 40 are operated in the high-speed drive mode, to thereby output the drive waveforms O1 to O4.

In this case, in FIG. 11, in the first drive pulse SP11 of the high-speed drive pulse train SP10, the drive waveform O3 has a voltage of less than 0 V, and the other drive waveforms O1, O2, and O4 have a voltage of 0 V (see FIG. 10(b)). Thus, control is performed so that the transistor N3 is turned on and the transistor P3 is turned off, while the other transistors P1, P2, and P4 are turned on and the transistors N1, N2, and N4 are turned off.

Further, in the second drive pulse SP12, the drive waveforms O2 and O4 have a voltage of less than 0 V, and the other drive waveforms O1 and O3 have a voltage of 0 V (see FIG. 10(b)). Thus, control is performed so that the transistors N2 and N4 are turned on and the transistors P2 and P4 are turned off, while the other transistors P1 and P3 are turned on and the transistors N1 and N3 are turned off.

Further, in the third drive pulse SP13, the drive waveform O4 has a voltage of less than 0 V, and the other drive waveforms O1, O2, and O3 have a voltage of 0 V (see FIG. 10(b)). Thus, control is performed so that the transistor N4 is turned on and the transistor P4 is turned off, while the other transistors P1, P2, and P3 are turned on and the transistors N1, N2, and N3 are turned off.

Further, in the normal drive mode described later, the stepper motor 41 is not driven, and all the drive waveforms O1 to O4 have a voltage of 0 V. Thus, control is performed so that all the transistors P1 to P4 are turned on and all the transistors N1 to N4 are turned off.

Next, with reference to the right part of the operation table of FIG. 11, description is given of the ON/OFF operation of each of the transistors in the normal drive mode. The stepper motor 42 driven in the normal drive mode (second hand drive) is driven based on the drive waveforms O5 to O8, and hence the transistors P5 to P8 and the transistors N5 to N8 of the driver circuit 40 are operated in the normal drive mode, to thereby output the drive waveforms O5 to O8.

In this case, in FIG. 11, in the first drive pulse SP01 in the first step of the normal drive pulse SP00, the drive waveform O7 has a voltage of less than 0 V, and the other drive waveforms O5, O6, and O8 have a voltage of 0 V (see FIG. 10(c)). Thus, control is performed so that the transistor N7 is turned on and the transistor P7 is turned off, while the other transistors P5, P6, and P8 are turned on and the transistors N5, N6, and N8 are turned off.

Further, in the second drive pulse SP02 in the second step of the normal drive pulse SP00, the drive waveform O8 has a voltage of less than 0 V, and the other drive waveforms O5, O6, and O7 have a voltage of 0 V (see FIG. 10(c)). Thus, control is performed so that the transistor N8 is turned on and the transistor P8 is turned off, while the other transistors P5, P6, and P7 are turned on and the transistors N5, N6, and N7 are turned off.

Further, in the high-speed drive mode described above, the stepper motor 42 is not driven, and all the drive waveforms O5 to O8 have a voltage of 0 V. Thus, control is performed so that all the transistors P5 to P8 are turned on and all the transistors N5 to N8 are turned off.

In the operation table of FIG. 11, a position at which the ON/OFF operation of each of the transistors is switched due to each drive pulse is shown by being surrounded by an ellipse. For example, in the high-speed drive mode, in the first drive pulse SP11, the drive waveform O3 has a voltage of less than 0 V, and hence the transistor P3 is switched from ON to OFF, while the transistor N3 is switched from OFF to ON. Thus, OFF for the transistor P3 and ON for the transistor N3 are surrounded by ellipses, to thereby indicate that the operations of the transistors P3 and N3 are switched due to the first drive pulse SP11.

Further, the operation of the stepper motor 41 being rotated by 360° per step due to the high-speed drive pulse train SP10 is the same as the operation of the stepper motor 20 in the above-mentioned first embodiment (see FIG. 7), while the operation of the stepper motor 42 due to the normal drive pulse SP00 is the same as the operation of the related-art stepper motor described above (see FIG. 4 and FIG. 5), and hence description thereof is omitted here.

As described above, the electronic watch according to the second embodiment includes two stepper motors, namely, the stepper motor 41 configured to perform the high-speed drive based on the rotation by 360° per step for the minute-hour hand drive and the stepper motor 42 configured to perform normal drive based on the rotation by 180° per step for the second hand drive. Further, the drive frequency (output interval between drive pulses) of the normal drive pulse SP00 for driving the stepper motor 42 configured to move the second hand is set lower than the drive frequency of the high-speed drive pulse train SP10 for driving the stepper motor 41 configured to drive the minute-hour hands. With this, it is possible to achieve hand movements different in drive frequency by two stepper motors.

In this case, the second hand is generally smaller in hand shape and is lighter in weight than other hands, and hence impact resistance thereof is not considered so important. However, the second hand is usually moved every second, and hence the drive frequency is high, which increases the importance of low-power-consumption drive. In addition, the minute-hour hands are generally larger in hand shape and heavier in weight than the secondhand, and hence impact resistance thereof is considered important, but the drive frequency is low, which eliminates the importance of the low-power-consumption drive.

Therefore, it is possible to increase the gear speed reduction ratio of the minute hand (to 1/60) by arranging the stepper motor 41 to be rotated by 360° per step for the minute-hour hand drive, and hence it is possible to achieve an increase in torque of the minute-hour hands and improve the impact resistance of the minute-hour hands, to thereby be able to satisfy performance required for the minute-hour hands. Further, by arranging the stepper motor 42 configured to perform the normal drive based on the rotation by 180° per step for the second hand drive, the gear speed reduction ratio of the second hand is 1/30 in the same manner as in the related art, but it is possible to achieve a one-shot drive pulse per step (see FIG. 10(c)), which enables the low-power-consumption drive.

Further, in the second embodiment, the high-speed drive pulse train SP10 and the normal drive pulse SP00 are generated by arranging the high-speed drive pulse generation circuit 34 to switch a timing to select a specific drive pulse from one drive pulse train, and hence it suffices that only one drive pulse generation circuit is provided, which is advantageous in that the circuit scale of the electronic watch can be reduced.

Third Embodiment

Figure 12:
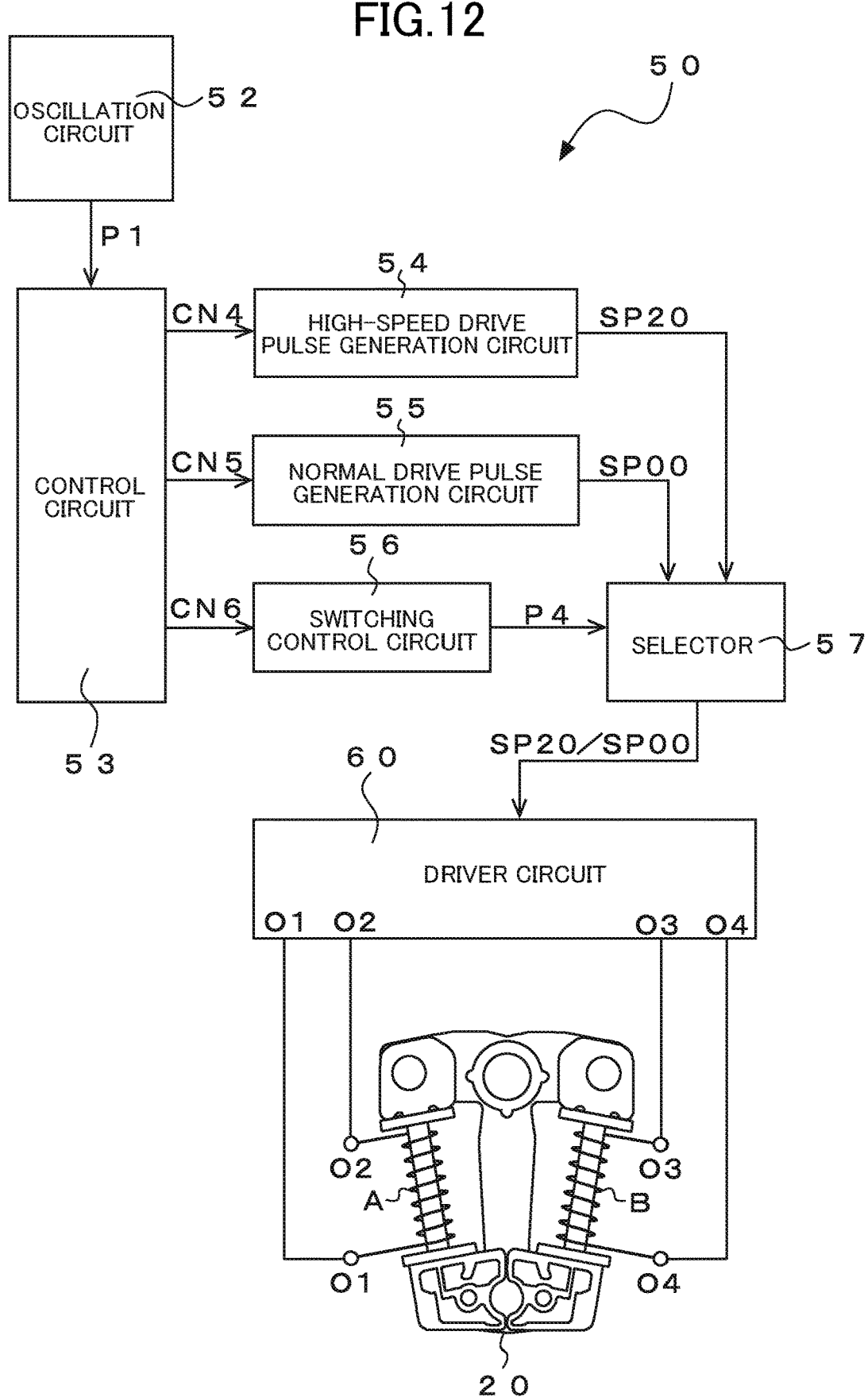
FIG. 12 is a configuration diagram for illustrating a schematic configuration of an electronic watch according to a third embodiment of the present invention.

[Description of Configuration of Electronic Watch According to Third Embodiment: FIG. 12]

Next, a schematic configuration of an electronic watch according to the third embodiment is described with reference to FIG. 12. Reference symbol 50 denotes an analog indication-type electronic watch according to the third embodiment. The electronic watch 50 includes an oscillation circuit 52 configured to output the predetermined reference signal P1 through use of a quartz crystal unit (not shown), a control circuit 53 configured to receive as input the reference signal P1 to output control signals CN4, CN5, and CN6, a high-speed drive pulse generation circuit 54, a normal drive pulse generation circuit 55, a switching control circuit 56, a selector 57, a driver circuit 60, and the two-coil stepper motor 20 (hereinafter referred to as "stepper motor 20").

The electronic watch 50 includes an indication part including hands, a wheel train, a power source, and an operation member, but illustration thereof is omitted because those components do not directly relate to the present invention.

The high-speed drive pulse generation circuit 54 receives the control signal CN4 as input, and generates and outputs a high-speed drive pulse train SP20 for driving the stepper motor 20 at high speed. The high-speed drive pulse train SP20 indicates an example of having a drive waveform different from that of the high-speed drive pulse train SP10 in each of the above-mentioned first and second embodiments, and is therefore denoted by a different reference symbol. The high-speed drive pulse train SP20 is also formed of three drive pulses in the same manner as the high-speed drive pulse train SP10, but is described later in detail.

The normal drive pulse generation circuit 55 receives the control signal CN5 as input, and generates and outputs the normal drive pulse SP00 for subjecting the stepper motor 20 to the normal drive. The normal drive pulse SP00 in the third embodiment has the same drive waveform as that of the normal drive pulse SP00 in the second embodiment, and is therefore denoted by the same reference symbol.

The switching control circuit 56 receives the control signal CN6 as input, and outputs a switching signal P4 for switching between the high-speed drive pulse train SP20 and the normal drive pulse SP00 depending on the drive mode.

The selector 57 receives two kinds of drive pulses, namely, the high-speed drive pulse train SP20 and the normal drive pulse SP00 as input, and selects and outputs any one of those two kinds of drive pulses based on the switching signal P4.

The driver circuit 60 receives, as input, any one of the drive pulses, namely, the high-speed drive pulse train SP20 or the normal drive pulse SP00 from the selector 57, and supplies the drive waveforms O1 to O4 based on the drive pulse to the coil A and the coil B of the stepper motor 20, to thereby drive the stepper motor 20. The circuit configuration of the driver circuit 60 is the same as that of the driver circuit 10 in the above-mentioned first embodiment (see FIG. 3), and hence the description of the circuit configuration and the operation of each of the transistors is omitted.

The stepper motor 20 includes two coils, namely, the coil A and the coil B as a first coil and a second coil, respectively, and is the same as the stepper motor 20 in the first embodiment described above (see FIG. 2). Thus, the stepper motor 20 is denoted by the same reference symbol, and detailed description of the configuration is omitted.

[Description of Operation of Electronic Watch According to Third Embodiment: FIG. 12]

Next, with reference to FIG. 12, description is given of a schematic operation of the electronic watch according to the third embodiment. As described above, the electronic watch 50 includes one stepper motor 20 and two drive pulse generation circuits, namely, the high-speed drive pulse generation circuit 54 and the normal drive pulse generation circuit 55.

The electronic watch 50 has the normal drive mode of, for example, moving the hand every second and the high-speed drive mode of moving the hand at high speed for time correction or other such purpose. In this case, when the electronic watch 50 is in the high-speed drive mode, the control circuit 53 outputs the control signal CN4 to activate the high-speed drive pulse generation circuit 54, and outputs the high-speed drive pulse train SP20. Meanwhile, when the electronic watch 50 is in the normal drive mode, the control circuit 53 outputs the control signal CN5 to activate the normal drive pulse generation circuit 55, and outputs the normal drive pulse SP00.

Further, when the electronic watch 50 selects the high-speed drive mode, the control circuit 53 outputs the control signal CN6 to operate the switching control circuit 56, and outputs and transmits the switching signal P4 in the high-speed drive mode to the selector 57. The selector 57 receives the switching signal P4 as input, and selects the high-speed drive pulse train SP20 to output the high-speed drive pulse train SP20 to the driver circuit 60.

The driver circuit 60 operates an internal buffer circuit based on the high-speed drive pulse train SP20 formed of a plurality of drive pulses, and sequentially outputs the drive waveforms O1 to O4 corresponding to the high-speed drive to subject the stepper motor 20 to the high-speed rotational drive in increments of 360° per step.

Further, when the electronic watch 50 selects the normal drive mode, the control circuit 53 outputs the control signal CN6 to operate the switching control circuit 56, and outputs and transmits the switching signal P4 in the normal drive mode to the selector 57. The selector 57 receives the switching signal P4 as input, and selects the normal drive pulse SP00 to output the normal drive pulse SP00 to the driver circuit 60.

The driver circuit 60 operates the internal buffer circuit based on the normal drive pulse SP00, and outputs the drive waveforms O1 to O4 corresponding to the normal drive to subject the stepper motor 20 to the normal rotational drive (for example, moving the hand every second) in increments of 180° per step.

Figure 13:
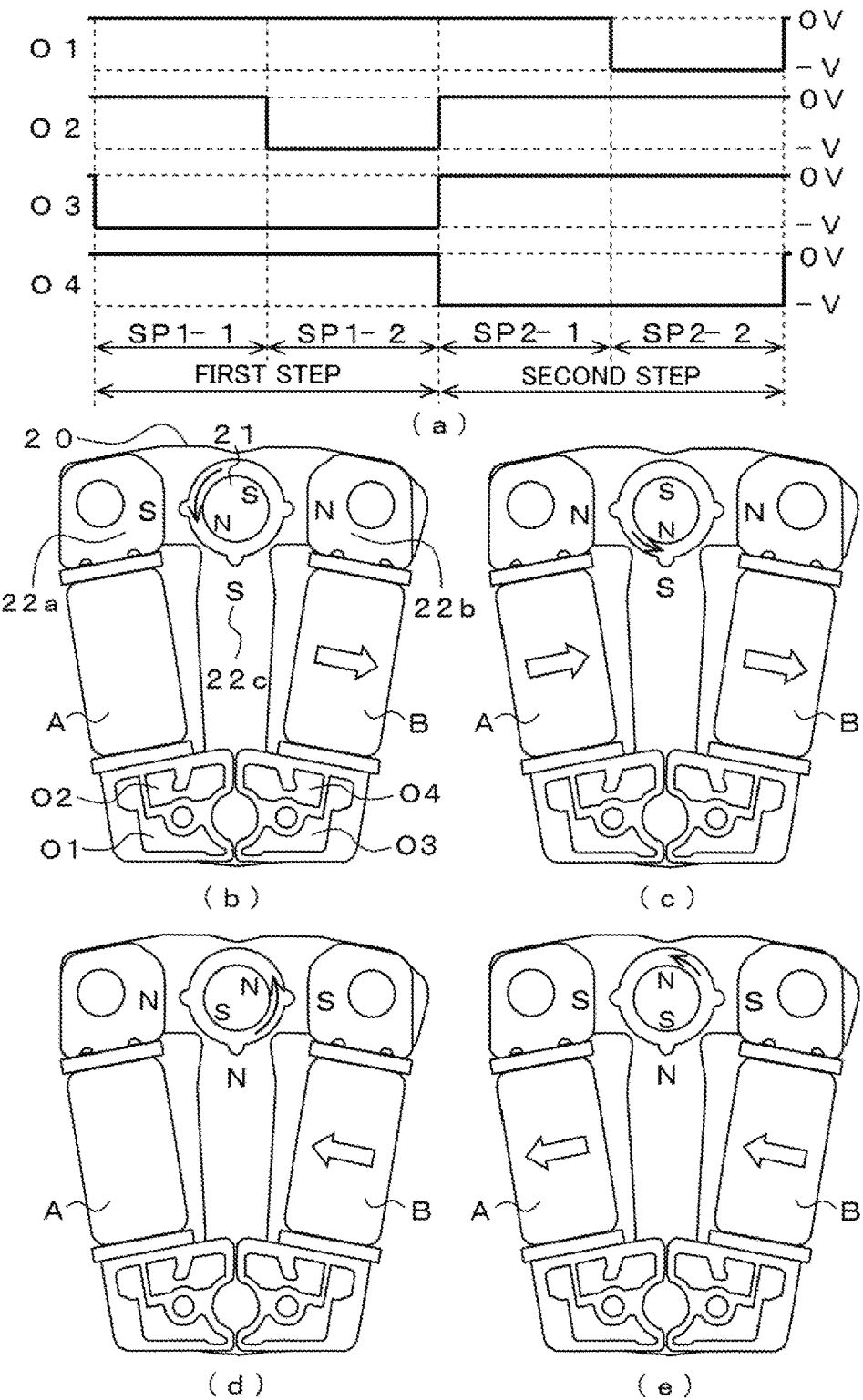
FIG. 13 are a waveform diagram and operation diagrams of high-speed drive of a related-art two-coil stepper motor.

[Description of Rotational Drive by 360° Per Two Steps of Related-Art Two-Coil Stepper Motor: FIGS. 13]

Next, an example of the related-art high-speed drive operation performed by the two-coil stepper motor is described with reference to FIG. 13 for the sake of comparison prior to the description of a high-speed drive operation for the stepper motor in the third embodiment. The configuration diagram of the third embodiment illustrated in FIG. 12 is employed for the two-coil stepper motor and the driver circuit.

FIG. 13(*a*) is an example of the drive waveform for rotationally driving the rotor by 360° per two steps at high speed by subjecting the stepper motor 20 to the related-art rotation by 180° per step continuously in two steps. In FIG. 13(*a*), in a first drive pulse SP1-1 in the first step, the drive waveform O3 has a voltage of less than 0 V, and the other drive waveforms O1, O2, and O4 have a voltage of 0 V. With this, a drive current flows into the coil B of the stepper motor 20 connected to the drive waveforms O3 and O4 to excite the coil B.

Next, in a second drive pulse SP1-2 in the first step, the drive waveforms O2 and O3 have a voltage of less than 0 V, and the drive waveforms O1 and O4 have a voltage of 0 V. With this, a drive current flows into both the coil A and the coil B of the stepper motor 20, and both the coil A and the coil B are excited in the same direction.

Next, in a first drive pulse SP2-1 in the second step, the drive waveform O4 has a voltage of less than 0 V, and the other drive waveforms O1, O2, and O3 have a voltage of 0 V. With this, a drive current flows into the coil B of the stepper motor 20 connected to the drive waveforms O3 and O4, and the coil B is excited in a direction reverse to that of the first step.

Next, in a second drive pulse SP2-2 in the second step, the drive waveforms O1 and O4 have a voltage of less than 0 V, and the drive waveforms O2 and O3 have a voltage of 0 V.

With this, a drive current flows into both the coil A and the coil B of the stepper motor 20, and both the coil A and the coil B are excited in the direction reverse to that of the first step.

Next, with reference to FIG. 13(*b*) to FIG. 13(*e*), description is given of the operation of the stepper motor configured to perform the related-art rotational drive by 360° per two steps. The reference symbols of the respective members of the stepper motor 20 are written only in FIG. 13(*b*) and omitted in the other figures. FIG. 13(*b*) is an illustration of an operation performed when the first drive pulse SP1-1 in the first step is supplied to the stepper motor 20. In this case, when the first drive pulse SP1-1 is supplied, a drive current (not shown) flows from the coil terminal O4 into the coil terminal O3 to excite the coil B in the direction indicated by the arrow.

With this, the second magnetic-pole portion 22*b* is magnetized to the N-pole, and the third magnetic-pole portion 22*c* is magnetized to the S-pole. In addition, the coil A is inhibited from being excited. Thus, the first magnetic-pole portion 22*a* has the S-pole in the same manner as the third magnetic-pole portion 22*c*. As a result, the N-pole of the rotor 21 and the S-poles of the first magnetic-pole portion 22*a* and the third magnetic-pole portion 22*c* attract each other, and the S-pole of the rotor 21 and the N-pole of the second magnetic-pole portion 22*b* attract each other. Thus, the rotor 21 is further rotated in the counterclockwise direction, and the N-pole of the rotor 21 is rotated from the stationary position of 0° to reach the position of about 135°.

Next, in FIG. 13(*c*), when the second drive pulse SP1-2 in the first step is supplied, a drive current flows from the coil terminal O1 into the coil terminal O2 to excite the coil A in the direction indicated by the arrow. Further, similarly, a drive current flows from the coil terminal O4 into the coil terminal O3 to excite the coil B in the direction indicated by the arrow.

With this, the first magnetic-pole portion 22*a* and the second magnetic-pole portion 22*b* are magnetized to the N-pole, and the third magnetic-pole portion 22*c* is magnetized to the S-pole. As a result, the N-pole of the rotor 21 and the S-pole of the third magnetic-pole portion 22*c* attract each other, and the S-pole of the rotor 21 and the N-poles of both the first magnetic-pole portion 22*a* and the second magnetic-pole portion 22*b* attract each other. Thus, the rotor 21 is further rotated in the counterclockwise direction, the N-pole of the rotor 21 is rotated to reach the position of 180°, and becomes stationary. That is, the rotor 21 is rotated by 180° in the first step.

Next, in FIG. 13(*d*), when the first drive pulse SP2-1 in the second step is supplied next, a drive current flows from the coil terminal O3 into the coil terminal O4 to excite the coil B in the direction indicated by the arrow. With this, the second magnetic-pole portion 22*b* is magnetized to the S-pole, and the third magnetic-pole portion 22*c* is magnetized to the N-pole. In addition, the coil A is inhibited from being excited. Thus, the first magnetic-pole portion 22*a* has the N-pole in the same manner as the third magnetic-pole portion 22*c*.

As a result, the N-pole of the rotor 21 and the S-pole of the second magnetic-pole portion 22*b* attract each other, while the S-pole of the rotor 21 and the N-poles of the first magnetic-pole portion 22*a* and the third magnetic-pole portion 22*c* attract each other. Thus, the rotor 21 is rotated in the counterclockwise direction, and the N-pole of the rotor 2*l* is rotated to the position of about 315°.

Next, in FIG. 13(*e*), when the second drive pulse SP2-2 in the second step is supplied, a drive current flows from the coil terminal O2 into the coil terminal O1 to excite the coil A in the direction indicated by the arrow. Further, similarly, a drive current flows from the coil terminal O3 into the coil terminal O4 to excite the coil B in the direction indicated by the arrow.

With this, the first magnetic-pole portion 22*a* and the second magnetic-pole portion 22*b* are magnetized to the S-pole, and the third magnetic-pole portion 22*c* is magnetized to the N-pole. As a result, the S-pole of the rotor 21 and the N-pole of the third magnetic-pole portion 22*c* attract each other, and the N-pole of the rotor 21 and the S-poles of both the first magnetic-pole portion 22*a* and the second magnetic-pole portion 22*b* attract each other. Thus, the rotor 21 is further rotated in the counterclockwise direction, the N-pole of the rotor 21 is rotated to reach the position of 360° (0°), and becomes stationary. That is, the rotor 21 is rotated by 180° in the second step, and rotationally driven by 360° in two steps in total.

In this manner, when the related-art rotational drive by 180° per step is repeatedly performed, the rotor 21 is rotated by 360° at relatively high speed, but the drive is still performed in two steps, which requires a total of four drive pulses, namely, the first drive pulse SP1-1 and the first drive pulse SP1-2 in the first step and the first drive pulse SP1-1 and the second drive pulse SP2-2 in the second step. Thus, this drive cannot be considered as maximizing the high-speed rotational performance of the stepper motor. In addition, the driver circuit supplies a total of four drive pulses to the stepper motor in the rotational drive by 360°, which raises another problem that drive power consumption is high.

[Description of High-Speed Drive in Third Embodiment: FIGS. 14]

Next, with reference to FIG. 14, description is given of the high-speed rotational drive in increments of 360° per step in the high-speed drive mode in the third embodiment. FIG. 14(*a*) is an example of the drive waveform of the high-speed drive pulse train SP20 for rotationally driving the stepper motor 20 in increments of 360° per step. In this case, the high-speed drive pulse train SP20 in the third embodiment is formed of three drive pulses, namely, a first drive pulse SP21, a second drive pulse SP22, and a third drive pulse SP23.

In FIG. 14(*a*), in the first drive pulse SP21, the drive waveform O3 has a voltage of less than 0 V, and the other drive waveforms O1, O2, and O4 have a voltage of 0 V. With this, a drive current flows into the coil B of the stepper motor 20 connected to the drive waveforms O3 and O4 to excite the coil B.

Next, in the second drive pulse SP22, the drive waveforms O2 and O4 has a voltage of less than 0 V, and the drive waveforms O1 and O3 have a voltage of 0 V. With this, a drive current flows into both the coil A and the coil B of the stepper motor 20, and both the coil A and the coil B are excited in such directions as to face each other.

Next, in the third drive pulse SP23, the drive waveforms O1 and O4 has a voltage of less than 0 V, and the drive waveforms O2 and O3 have a voltage of 0 V. With this, a drive current flows into both the coil A and the coil B of the stepper motor 20, and both the coil A and the coil B are excited in the same direction.

Next, with reference to FIG. 14(*b*) to FIG. 14(*e*), description is given of the high-speed drive of the stepper motor in the rotation by 360° per step in the high-speed drive mode in the third embodiment. The reference symbols of the respective members of the stepper motor 20 are written only in FIG. 14(*b*) and omitted in the other figures. FIG. 14(*b*) is an illustration of a stationary state of the stepper motor 20 and a state in which the N-pole of the rotor 21 of the stepper motor 20 is located at the stationary position of 0° (upward direction on the figure) and is held.

Next, FIG. 14(c) is an illustration of an operation performed when the first drive pulse SP21 is supplied after the stationary state of the stepper motor 20. In this case, when the first drive pulse SP21 is supplied, a drive current (not shown) flows from the coil terminal O4 into the coil terminal O3 to excite the coil B in the direction indicated by the arrow.

With this, the second magnetic-pole portion 22b is magnetized to the N-pole, and the third magnetic-pole portion 22c is magnetized to the S-pole. In addition, the coil A is inhibited from being excited. Thus, the first magnetic-pole portion 22a has the S-pole in the same manner as the third magnetic-pole portion 22c. As a result, the N-pole of the rotor 21 and the S-poles of the first magnetic-pole portion 22a and the third magnetic-pole portion 22c attract each other, and the S-pole of the rotor 21 and the N-pole of the second magnetic-pole portion 22b attract each other. Thus, the rotor 21 is further rotated in the counterclockwise direction, and the N-pole of the rotor 21 is rotated from the stationary position of 0° to reach the position of about 135°.

Next, in FIG. 14(d), in a case where the subsequent second drive pulse SP22 is supplied when the N-pole of the rotor 21 is positioned near about 135°, a drive current flows from the coil terminal O1 into the coil terminal O2 to excite the coil A in the direction indicated by the arrow. Further, similarly, a drive current flows from the coil terminal O3 into the coil terminal O4 to excite the coil B in the direction indicated by the arrow.

With this, the first magnetic-pole portion 22a is magnetized to the N-pole, the second magnetic-pole portion 22b is magnetized to the S-pole, and the third magnetic-pole portion 22c is not magnetized due to canceled magnetization. As a result, the N-pole of the rotor 21 and the S-pole of the second magnetic-pole portion 22b attract each other, and the S-pole of the rotor 21 and the N-pole of the first magnetic-pole portion 22a attract each other. Thus, the rotor 21 is further rotated in the counterclockwise direction, and the N-pole of the rotor 21 is rotated to reach the position of about 270°.

Next, in FIG. 14(e), in a case where the subsequent third drive pulse SP23 is supplied when the N-pole of the rotor 21 is positioned near about 270°, a drive current flows from the coil terminal O2 into the coil terminal O1 to excite the coil A in the direction indicated by the arrow. Further, similarly, a drive current flows from the coil terminal O3 into the coil terminal O4 to excite the coil B in the direction indicated by the arrow.

With this, the first magnetic-pole portion 22a and the second magnetic-pole portion 22b are magnetized to the S-pole, and the third magnetic-pole portion 22c is magnetized to the N-pole. As a result, the S-pole of the rotor 21 and the N-pole of the third magnetic-pole portion 22c attract each other, and the N-pole of the rotor 21 and the S-poles of both the first magnetic-pole portion 22a and the second magnetic-pole portion 22b attract each other. Thus, the rotor 21 is further rotated in the counterclockwise direction, and the N-pole of the rotor 21 is rotated to reach the position of about 360° (0°). In this manner, the stepper motor 20 can achieve the high-speed rotational drive in increments of 360° per step based on the high-speed drive pulse train SP20 formed of three drive pulses.

In this case, as illustrated in FIG. 14(e), when the high-speed drive pulse train SP20 is continuously supplied at the time of the rotor 21 returning to the position of 360° (0°), as illustrated in FIG. 14(c), the second magnetic-pole portion 22b is again magnetized to the N-pole, and the third magnetic-pole portion 22c and the first magnetic-pole portion 22a are again magnetized to the S-pole, due to the first drive pulse SP21 at the head. As a result, the N-pole of the rotor 21 and the S-poles of the first magnetic-pole portion 22a and the third magnetic-pole portion 22c attract each other, and the S-pole of the rotor 21 and the N-pole of the second magnetic-pole portion 22b attract each other. Thus, the rotor 21 is continuously rotated in the counterclockwise direction, and the N-pole of the rotor 21 is rotated from the stationary position of 0° to reach the position of about 135°.

After that, the respective drive pulses of the high-speed drive pulse train SP20 are continuously supplied, to thereby cause the rotor 21 of the stepper motor 20 to repeat the rotational operation illustrated in FIG. 14(c) to FIG. 14(e). That is, the continuous output of the high-speed drive pulse train SP20 causes the stepper motor 20 to continue the high-speed rotational drive in increments of 360° per step.

The normal drive in the normal drive mode in the third embodiment is the same as the related-art rotational drive by 180° per step, which is illustrated and shown in FIG. 4 and FIG. 5, and hence description thereof is omitted here. Then, it is possible to move the second hand every second by outputting the normal drive pulse SP00 in the normal drive mode at a cycle of, for example, one second.

As described above, according to the third embodiment, the rotational drive by 360° per step can be achieved by as few as three drive pulses, and hence compared with the related-art two-step drive (see FIG. 13), it is possible to perform the high-speed drive at a speed close to the rotation limit of the stepper motor.

Further, it is possible to continuously rotate the stepper motor 20 at high speed by continuously outputting the high-speed drive pulse train SP20. With this, for example, in the fast-forwarding operation of the hands, the fast-forwarding operation can be performed at a speed higher than in the related art, which enables the time correction or the like of the hands to be performed quickly in a short period of time.

Further, although four drive pulses are required for the related-art two-step drive (see FIG. 13), in the third embodiment, the rotational drive by 360° per step can be achieved by as few as three drive pulses, and hence it is possible to achieve the low-power-consumption drive by an amount corresponding to the reduced number of drive pulses.

Further, the drive pulse is required to be provided with a sufficient drive force in consideration of, for example, individual differences of the stepper motor 20 or power supply variation, and hence the rotor 21 of the stepper motor 20 is often rotated with an overlap of an electromagnetic stable point for each drive pulse. When this overlap is present, there is a case in which the rotor 21 is rotated slightly backward or vibrated minutely. Such movement of the rotor 21 is a loss for the stepper motor 20, and causes a reduction in driving efficiency. However, in the third embodiment, the rotational drive by 360° is achieved by as few as three drive pulses of the high-speed drive pulse train SP20, and hence the number of times of overlapping of the rotor 21 is reduced, with the result that the driving efficiency of the stepper motor is improved.

In this manner, in the third embodiment, in the high-speed drive mode, the high-speed drive pulse train SP20 is continuously output, to thereby drive the rotor of the stepper motor with a drive frequency higher than that of the normal drive pulse SP00 in the normal drive mode (for example, moving the hand every second), which enables the hands to be driven at high speed.

In the third embodiment, there are provided two drive pulse generation circuits, namely, the high-speed drive pulse generation circuit 54 and the normal drive pulse generation circuit 55, but the present invention is not limited to this configuration, and as in the second embodiment, the high-speed drive pulse train and a normal drive pulse from one drive pulse generation circuit may be selected and switched depending on the timing.

Figure 15:
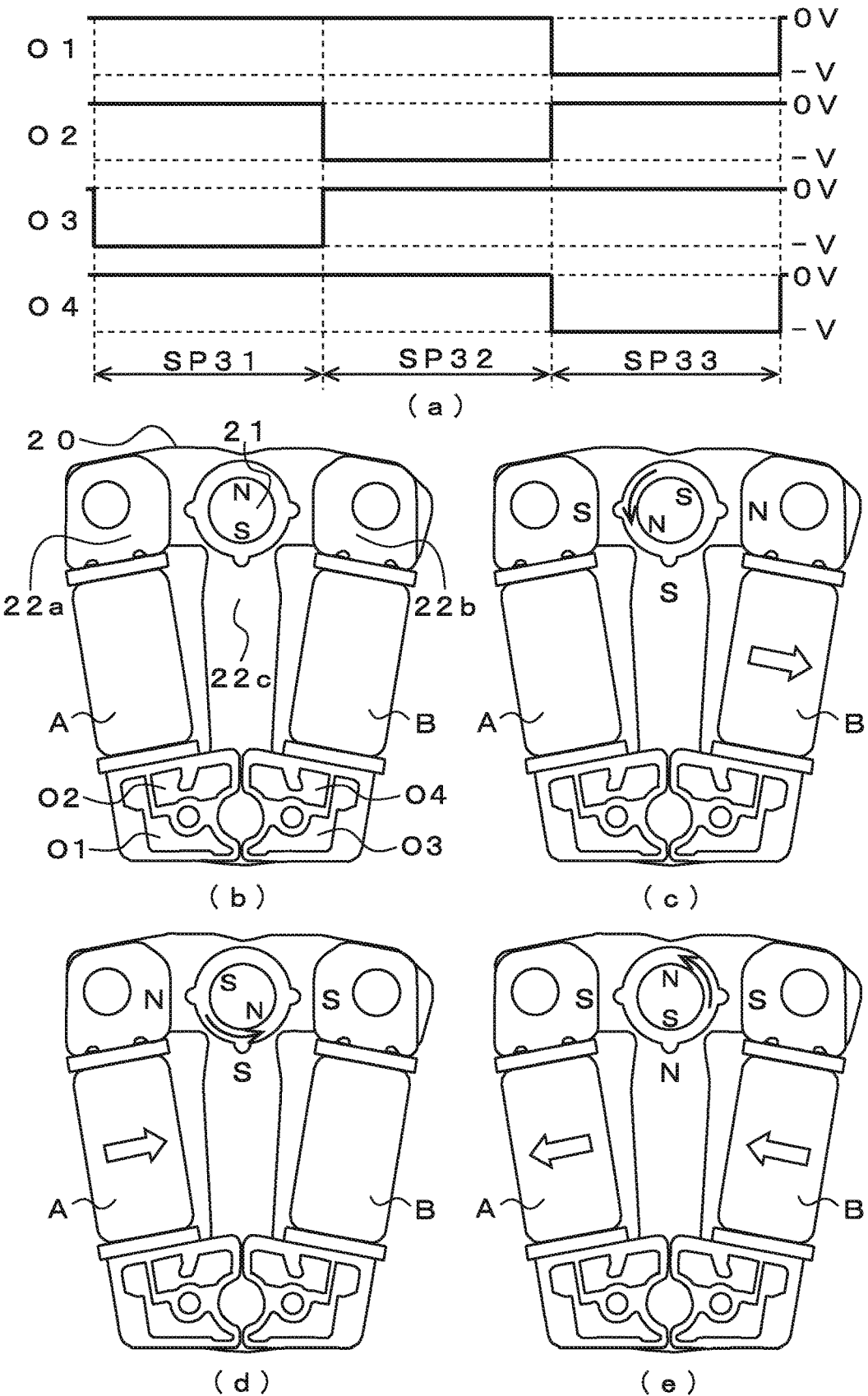
FIG. 15 are a waveform diagram of high-speed drive pulses and operation diagrams of high-speed drive of a two-coil stepper motor in Modification Example 1 of the third embodiment of the present invention.

[Description of High-Speed Drive in Modification Example 1 of Third Embodiment: FIGS. 15]

Next, with reference to FIG. 15, description is given of the high-speed drive of the two-coil stepper motor in Modification Example 1 of the third embodiment. Respective modification examples including other modification examples described later are different only in drive waveform of the high-speed drive pulse train. Thus, description is given of only the drive waveform in the high-speed drive mode and a high-speed drive operation for the stepper motor, and the configuration diagram of each modification example and the description of the normal drive mode are omitted.

FIG. 15(a) is an example of the drive waveform of a high-speed drive pulse train SP30 for performing the rotational drive by 360° per step in Modification Example 1 of the third embodiment. In FIG. 15(a), the high-speed drive pulse train SP30 is formed of three drive pulses, namely, a first drive pulse SP31, a second drive pulse SP32, and a third drive pulse SP33.

In the first drive pulse SP31, the drive waveform O3 has a voltage of less than 0 V, and the other drive waveforms O1, O2, and O4 have a voltage of 0 V. With this, a drive current flows into the coil B of the stepper motor 20 connected to the drive waveforms O3 and O4 to excite the coil B.

Next, in the second drive pulse SP32, the drive waveform O2 has a voltage of less than 0 V, and the other drive waveforms O1, O2, and O4 have a voltage of 0 V. With this, a drive current flows into the coil A of the stepper motor 20 connected to the drive waveforms O1 and O2 to excite the coil A.

Next, in the third drive pulse SP33, the drive waveforms O1 and O4 has a voltage of less than 0 V, and the drive waveforms O2 and O3 have a voltage of 0 V. With this, a drive current flows into both the coil A and the coil B of the stepper motor 20, and both the coil A and the coil B are excited in the same direction.

Next, with reference to FIG. 15(b) to FIG. 15(e), description is given of the high-speed drive of the stepper motor in the rotation by 360° per step in Modification Example 1. The reference symbols of the respective members of the stepper motor 20 are written only in FIG. 15(b) and omitted in the other figures. FIG. 15(b) is an illustration of a stationary state of the stepper motor 20 and a state in which the N-pole of the rotor 21 of the stepper motor 20 is located at the stationary position of 0° (upward direction on the figure) and is held.

Next, FIG. 15(c) is an illustration of an operation performed when the first drive pulse SP31 is supplied after the stationary state of the stepper motor 20. In this case, when the first drive pulse SP31 is supplied, a drive current (not shown) flows from the coil terminal O4 into the coil terminal O3 to excite the coil B in the direction indicated by the arrow.

With this, the second magnetic-pole portion 22b is magnetized to the N-pole, and the third magnetic-pole portion 22c is magnetized to the S-pole. In addition, the coil A is inhibited from being excited. Thus, the first magnetic-pole portion 22a has the S-pole in the same manner as the third magnetic-pole portion 22c. As a result, the N-pole of the rotor 21 and the S-poles of the first magnetic-pole portion 22a and the third magnetic-pole portion 22c attract each other, and the S-pole of the rotor 21 and the N-pole of the second magnetic-pole portion 22b attract each other. Thus, the rotor 21 is further rotated in the counterclockwise direction, and the N-pole of the rotor 21 is rotated from the stationary position of 0° to reach the position of about 135°.

Next, in FIG. 15(d), in a case where the subsequent second drive pulse SP32 is supplied when the N-pole of the rotor 21 is positioned near about 135°, a drive current flows from the coil terminal O1 into the coil terminal O2 to excite the coil A in the direction indicated by the arrow.

With this, the first magnetic-pole portion 22a is magnetized to the N-pole, and the third magnetic-pole portion 22c is magnetized to the S-pole. In addition, the coil B is inhibited from being excited. Thus, the second magnetic-pole portion 22b has the S-pole in the same manner as the third magnetic-pole portion 22c. As a result, the N-pole of the rotor 21 and the S-poles of the second magnetic-pole portion 22b and the third magnetic-pole portion 22c attract each other, and the S-pole of the rotor 21 and the N-pole of the first magnetic-pole portion 22a attract each other. Thus, the rotor 21 is further rotated in the counterclockwise direction, and the N-pole of the rotor 21 is rotated to reach the position of about 225°.

Next, in FIG. 15(e), in a case where the subsequent third drive pulse SP33 is supplied when the N-pole of the rotor 21 is positioned near about 225°, a drive current flows from the coil terminal O2 into the coil terminal O1 to excite the coil A in the direction indicated by the arrow. Further, similarly, a drive current flows from the coil terminal O3 into the coil terminal O4 to excite the coil B in the same direction as that of the coil A.

With this, the first magnetic-pole portion 22a and the second magnetic-pole portion 22b are magnetized to the S-pole, and the third magnetic-pole portion 22c is magnetized to the N-pole. As a result, the S-pole of the rotor 21 and the N-pole of the third magnetic-pole portion 22c attract each other, and the N-pole of the rotor 21 and the S-poles of both the first magnetic-pole portion 22a and the second magnetic-pole portion 22b attract each other. Thus, the rotor 21 is further rotated in the counterclockwise direction, and the N-pole of the rotor 21 is rotated to reach the position of about 360° (0°). In this manner, also in Modification Example 1, the stepper motor 20 can achieve the high-speed rotational drive in increments of 360° per step based on the high-speed drive pulse train SP30 formed of three drive pulses.

As described above, according to Modification Example 1 of the third embodiment, the rotational drive by 360° per step can be achieved by as few as three drive pulses, and hence it is possible to obtain the same excellent effects as those of the third embodiment.

[Description of High-Speed Drive in Modification Example 2 of Third Embodiment: FIGS. 16]

Next, with reference to FIG. 16, description is given of the high-speed drive of the two-coil stepper motor in Modification Example 2 of the third embodiment. FIG. 16(a) is an example of the drive waveform of a high-speed drive pulse train SP40 for performing the rotational drive by 360° per step in Modification Example 2 of the third embodiment.

In FIG. 16(a), the high-speed drive pulse train SP40 is formed of three drive pulses, namely, a first drive pulse SP41, a second drive pulse SP42, and a third drive pulse SP43. In the first drive pulse SP41, the drive waveform O3 has a voltage of less than 0 V, and the other drive waveforms O1, O2, and O4 have a voltage of 0 V. With this, a drive current flows into the coil B of the stepper motor 20 connected to the drive waveforms O3 and O4 to excite the coil B.

Next, in the second drive pulse SP42, the drive waveforms O2 and O4 have a voltage of less than 0 V, and the drive waveforms O1 and O3 have a voltage of 0 V. With this, a drive current flows into both the coil A and the coil B of the stepper motor 20 to excite the coil A and the coil B in directions opposed to each other.

Next, in the third drive pulse SP43, the drive waveform O1 has a voltage of less than 0 V, and the drive waveforms O2, O3, and O4 have a voltage of 0 V. With this, a drive current flows into the coil A of the stepper motor 20 to excite the coil A.

Next, with reference to FIG. 16(b) to FIG. 16(e), description is given of the high-speed drive of the stepper motor in the rotation by 360° per step in Modification Example 2. The reference symbols of the respective members of the stepper motor 20 are written only in FIG. 16(b) and omitted in the other figures. FIG. 16(b) is an illustration of a stationary state of the stepper motor 20 and a state in which the N-pole of the rotor 21 of the stepper motor 20 is located at the stationary position of 0° (upward direction on the figure) and is held.

Next, FIG. 16(c) is an illustration of an operation performed when the first drive pulse SP41 is supplied after the stationary state of the stepper motor 20. In this case, when the first drive pulse SP41 is supplied, a drive current flows from the coil terminal O4 into the coil terminal O3 to excite the coil B in the direction indicated by the arrow.

With this, the second magnetic-pole portion 22b is magnetized to the N-pole, and the third magnetic-pole portion 22c is magnetized to the S-pole. In addition, the coil A is inhibited from being excited. Thus, the first magnetic-pole portion 22a has the S-pole in the same manner as the third magnetic-pole portion 22c. As a result, the N-pole of the rotor 21 and the S-poles of the first magnetic-pole portion 22a and the third magnetic-pole portion 22c attract each other, and the S-pole of the rotor 21 and the N-pole of the second magnetic-pole portion 22b attract each other. Thus, the rotor 21 is further rotated in the counterclockwise direction, and the N-pole of the rotor 21 is rotated from the stationary position of 0° to reach the position of about 135°.

Next, in FIG. 16(d), in a case where the subsequent second drive pulse SP42 is supplied when the N-pole of the rotor 21 is positioned near about 135°, a drive current flows from the coil terminal O1 into the coil terminal O2 to excite the coil A in the direction indicated by the arrow. Further, similarly, a drive current flows from the coil terminal O3 into the coil terminal O4 to excite the coil B in the direction indicated by the arrow.

With this, the first magnetic-pole portion 22a is magnetized to the N-pole, the second magnetic-pole portion 22b is magnetized to the S-pole, and the third magnetic-pole portion 22c is not magnetized due to canceled magnetization. As a result, the N-pole of the rotor 21 and the S-pole of the second magnetic-pole portion 22b attract each other, and the S-pole of the rotor 21 and the N-pole of the first magnetic-pole portion 22a attract each other. Thus, the rotor 21 is further rotated in the counterclockwise direction, and the N-pole of the rotor 21 is rotated to reach the position of about 270°.

Next, in FIG. 16(e), in a case where the subsequent third drive pulse SP43 is supplied when the N-pole of the rotor 21 is positioned near about 270°, a drive current flows from the coil terminal O2 into the coil terminal O1 to excite the coil A in the direction indicated by the arrow.

With this, the first magnetic-pole portion 22a is magnetized to the S-pole, and the third magnetic-pole portion 22c is magnetized to the N-pole. In addition, the coil B is inhibited from being excited. Thus, the second magnetic-pole portion 22b has the N-pole in the same manner as the third magnetic-pole portion 22c. As a result, the N-pole of the rotor 21 and the S-pole of the first magnetic-pole portion 22a attract each other, and the S-pole of the rotor 21 and the N-poles of the second magnetic-pole portion 22b and the third magnetic-pole portion 22c attract each other. Thus, the rotor 21 is further rotated in the counterclockwise direction, and the N-pole of the rotor 21 is rotated to reach the position exceeding about 360° (0°) as illustrated in FIG. 16(e). After that, when the third drive pulse SP43 is ended, the N-pole of the rotor 21 returns to the position of the stationary position of 360° (0°), and becomes stationary.

When the high-speed drive pulse train SP40 is continuously output, the N-pole of the rotor 21 avoids returning from the position exceeding about 360° (0°), and the N-pole of the rotor 21 is rotated to reach the position of about 135° due to the subsequent first drive pulse SP41 (see FIG. 16(c)). After that, the high-speed rotational drive is continued. In this manner, also in Modification Example 2, the stepper motor 20 can achieve the high-speed rotational drive in increments of 360° per step based on the high-speed drive pulse train SP40 formed of three drive pulses.

As described above, according to Modification Example 2 of the third embodiment, the rotational drive by 360° per step can be achieved by as few as three drive pulses, and hence it is possible to obtain the same excellent effects as those of the third embodiment.

[Description of High-Speed Drive in Modification Example 3 of Third Embodiment: FIGS. 17]

Next, with reference to FIG. 17, description is given of the high-speed drive of the two-coil stepper motor in Modification Example 3 of the third embodiment. FIG. 17(a) is an example of the drive waveform of the high-speed drive pulse train SP50 for performing the rotational drive by 360° per step in Modification Example 3 of the third embodiment.

In FIG. 17(a), the high-speed drive pulse train SP50 is formed of three drive pulses, namely, a first drive pulse SP51, a second drive pulse SP52, and a third drive pulse SP53. In the first drive pulse SP51, the drive waveforms O1 and O3 have a voltage of less than 0 V, and the drive waveforms O2 and O4 have a voltage of 0 V. With this, a drive current flows into both the coil A and the coil B of the stepper motor 20 to excite the coil A and the coil B.

Next, in the second drive pulse SP52, the drive waveform O2 has a voltage of less than 0 V, and the drive waveforms O1, O3, and O4 have a voltage of 0 V. With this, a drive current flows into the coil A of the stepper motor 20 to excite the coil A.

Next, in the third drive pulse SP53, the drive waveforms O1 and O4 have a voltage of less than 0 V, and the drive waveforms O2 and O3 have a voltage of 0 V. With this, a drive current flows into both the coil A and the coil B of the stepper motor 20 to excite both the coil A and the coil B in the same direction.

Next, with reference to FIG. 17(b) to FIG. 17(e), description is given of the high-speed drive of the stepper motor configured to perform the rotation by 360° per step in Modification Example 3. The reference symbols of the respective members of the stepper motor 20 are written only in FIG. 17(b) and omitted in the other figures. FIG. 17(b) is an illustration of the stationary state of the stepper motor 20 and a state in which the N-pole of the rotor 21 of the stepper motor 20 is located at the stationary position of 0° (upward direction on the figure) and is held.

Next, FIG. 17(c) is an illustration of an operation performed when the first drive pulse SP51 is supplied after the stationary state of the stepper motor 20. In this case, when the first drive pulse SP51 is supplied, a drive current flows from the coil terminal O2 into the coil terminal O1 to excite the coil A in the direction indicated by the arrow. Further, similarly, a drive current flows from the coil terminal O4 into the coil terminal O3 to excite the coil B in the direction indicated by the arrow.

With this, the first magnetic-pole portion 22a is magnetized to the S-pole, the second magnetic-pole portion 22b is magnetized to the N-pole, and the third magnetic-pole portion 22c is not magnetized due to canceled magnetization. As a result, the N-pole of the rotor 21 and the S-pole of the first magnetic-pole portion 22a attract each other, and the S-pole of the rotor 21 and the N-pole of the second magnetic-pole portion 22b attract each other. Thus, the rotor 21 is rotated in the counterclockwise direction, and the N-pole of the rotor 21 is rotated from the stationary position of 0° to reach the position of about 90°.

Next, in FIG. 17(d), in a case where the subsequent second drive pulse SP52 is supplied when the N-pole of the rotor 21 is positioned near about 90°, a drive current flows from the coil terminal O1 into the coil terminal O2 to excite the coil A in the direction indicated by the arrow.

With this, the first magnetic-pole portion 22a is magnetized to the N-pole, and the third magnetic-pole portion 22c is magnetized to the S-pole. In addition, the coil B is inhibited from being excited. Thus, the second magnetic-pole portion 22b has the S-pole in the same manner as the third magnetic-pole portion 22c. As a result, the N-pole of the rotor 21 and the S-poles of the second magnetic-pole portion 22b and the third magnetic-pole portion 22c attract each other, and the S-pole of the rotor 21 and the N-pole of the first magnetic-pole portion 22a attract each other. Thus, the rotor 21 is further rotated in the counterclockwise direction, and the N-pole of the rotor 21 is rotated to reach the position of about 225°.

Next, in FIG. 17(e), in a case where the subsequent third drive pulse SP53 is supplied when the N-pole of the rotor 21 is positioned near about 225°, a drive current flows from the coil terminal O2 into the coil terminal O1 to excite the coil A in the direction indicated by the arrow. Further, similarly, a drive current flows from the coil terminal O3 into the coil terminal O4 to excite the coil B in the same direction as that of the coil A.

With this, the first magnetic-pole portion 22a and the second magnetic-pole portion 22b are both magnetized to the S-pole, and the third magnetic-pole portion 22c is magnetized to the N-pole. As a result, the S-pole of the rotor 21 and the N-pole of the third magnetic-pole portion 22c attract each other, and the N-pole of the rotor 21 and the S-poles of the first magnetic-pole portion 22a and the second magnetic-pole portion 22b attract each other. Thus, the rotor 21 is further rotated in the counterclockwise direction, and the N-pole of the rotor 21 is rotated to reach the position of 360° (0°). In this manner, also in Modification Example 3, the stepper motor 20 can achieve the high-speed rotational drive in increments of 360° per step based on the high-speed drive pulse train SP50 formed of three drive pulses.

As described above, according to Modification Example 3 of the third embodiment, the rotational drive by 360° per step can be achieved by as few as three drive pulses, and hence it is possible to obtain the same excellent effects as those of the third embodiment.

Fourth Embodiment

Figure 18:
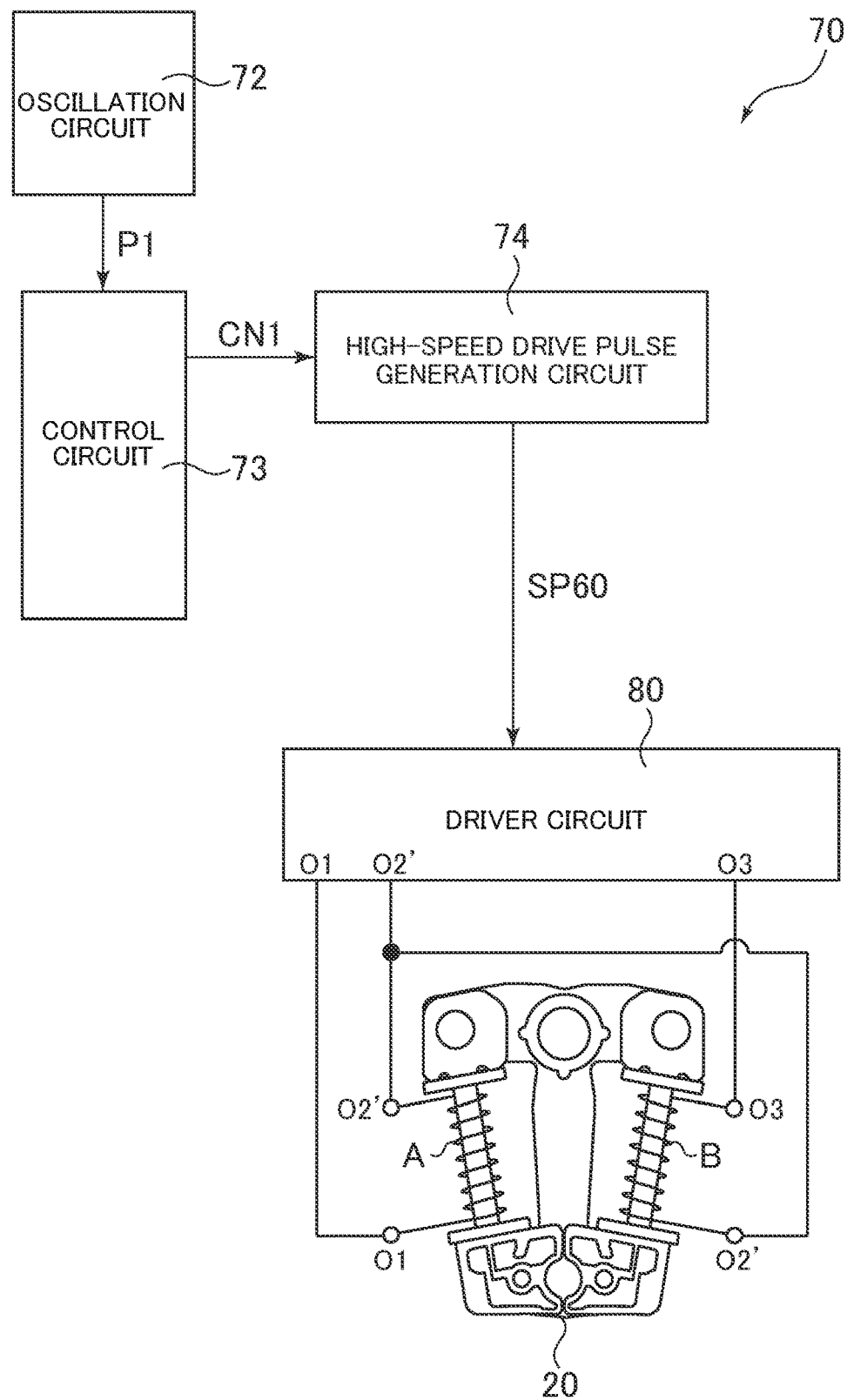
FIG. 18 is a configuration diagram for illustrating a schematic configuration of an electronic watch according to a fourth embodiment of the present invention.

[Description of Configuration of Electronic Watch According to Fourth Embodiment: FIG. 18]

Next, a schematic configuration of an electronic watch according to a fourth embodiment of the present invention is described with reference to FIG. 18. Reference symbol 70 denotes an analog indication-type electronic watch according to the fourth embodiment. The electronic watch 70 is similar to that of the first embodiment described above in that the electronic watch 70 includes, as basic components, an oscillation circuit 72 configured to output the predetermined reference signal P1, a control circuit 73 configured to receive as input the reference signal P1 to output the control signal CN1, a high-speed drive pulse generation circuit 74, a driver circuit 80, and the stepper motor 20.

In the fourth embodiment, two coils, namely, the coil A and the coil B, of the stepper motor 20 and the driver circuit 80 are connected to each other so as to short-circuit the coil terminals corresponding to the coil terminal O2 and the coil terminal O4 described in the first embodiment with reference to FIG. 1. Therefore, three drive waveforms, namely, the drive waveform O1, a drive waveform O2', and the drive waveform O3 are supplied from the driver circuit 80. The drive waveform O1 is supplied to the coil terminal O1 of the coil A, and the drive waveform O3 is supplied to the coil terminal O3 of the coil B, while the drive waveform O2' is supplied to the coil terminals O2' of the coil A and the coil B in common.

The high-speed drive pulse generation circuit 74 receives the control signal CN1 as input, and generates and outputs a high-speed drive pulse train SP60 for driving the stepper motor 20 at high speed. The high-speed drive pulse train SP60 indicates an example of having a drive waveform different from that of the high-speed drive pulse trains SP10 and SP20 in each of the above-mentioned embodiments, and is therefore denoted by a different reference symbol. The high-speed drive pulse train SP60 is also formed of three drive pulses.

Figure 19:
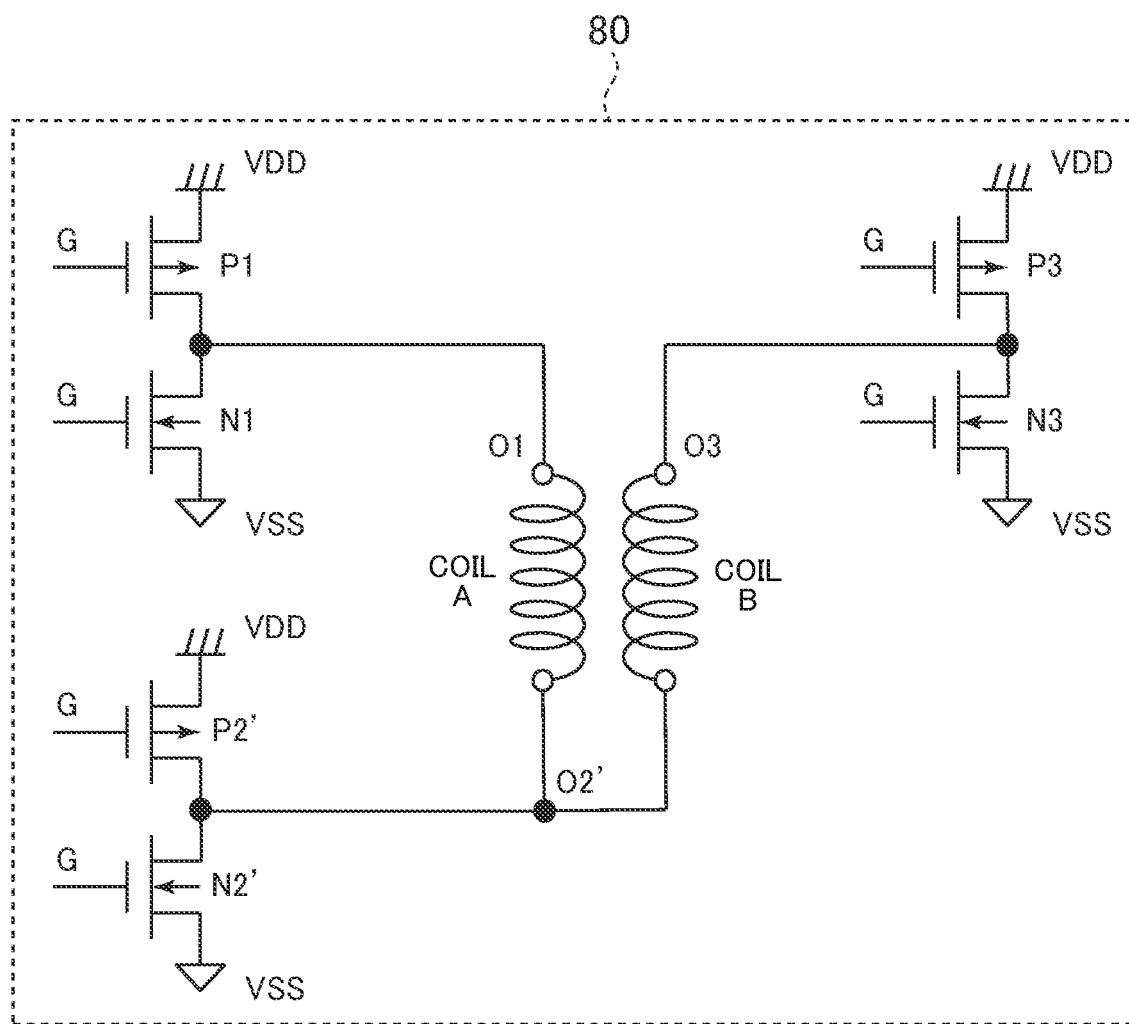
FIG. 19 is a circuit diagram for illustrating an example of a driver circuit in the fourth embodiment of the present invention.

[Description of Circuit Configuration of Driver Circuit: FIG. 19]

Next, with reference to FIG. 19, description is given of an example of the circuit configuration of the driver circuit 80 configured to drive the stepper motor 20. The driver circuit 80 is formed of three buffer circuits configured to supply three drive waveforms to the coil A and the coil B of the stepper motor 20.

A buffer circuit including the transistor P1 being a P-channel MOS transistor and the transistor N1 being an N-channel MOS transistor, which are complementarily connected to each other, is connected to the coil terminal O1 of the coil A, and outputs the drive waveform O1.

A buffer circuit including the transistor P3 being a P-channel MOS transistor and the transistor N3 being an N-channel MOS transistor, which are complementarily connected to each other, is connected to the coil terminal O3 of the coil B, and outputs the drive waveform O3.

In addition, a buffer circuit including a transistor P2' being a P-channel MOS transistor and a transistor N2' being an N-channel MOS transistor, which are complementarily connected to each other, is connected to the coil terminals O2' provided to the coil A and the coil B in common, and is configured to output the drive waveform O2' to the coil A and the coil B in common.

Figure 20:
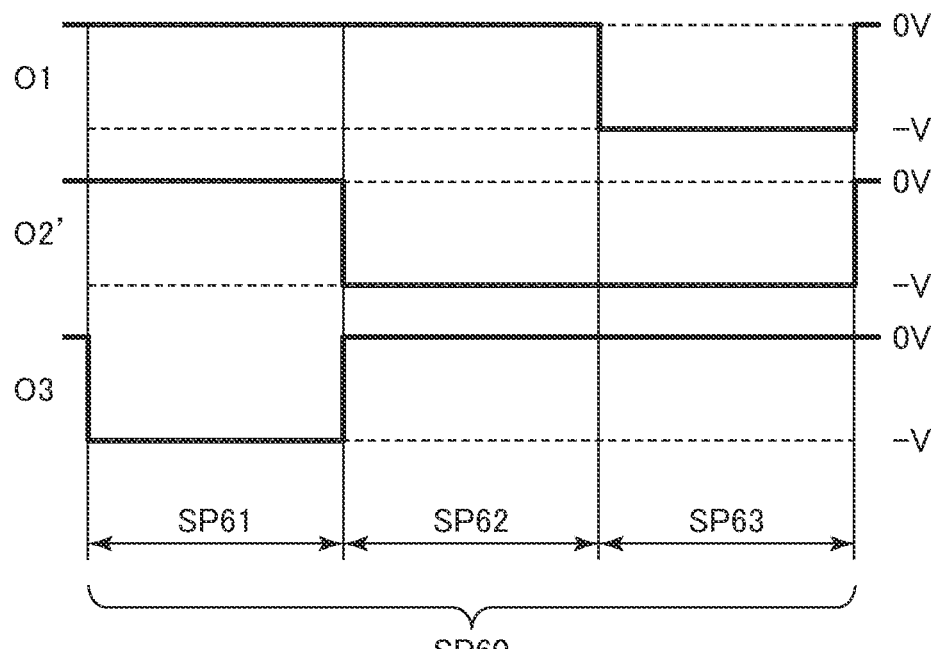
FIG. 20 are a waveform diagram of a high-speed drive pulse train and an operation table for transistors in the driver circuit in the fourth embodiment of the present invention.

[Description of Generation of Drive Pulse and Drive Waveform in Fourth Embodiment: FIGS. 20]

Next, with reference to FIG. 20, description is given of an example of the drive waveform of a high-speed drive pulse for rotationally driving the stepper motor in the fourth embodiment in increments of 360° per step and the operation of each of the transistors of the driver circuit.

First, the high-speed drive pulse train SP60 is used for rotationally driving the rotor of the stepper motor 20 of FIG. 18 from the stationary position of 0° in the forward rotation direction (counterclockwise) in increments of 360°. FIG. 20(*a*) is an illustration of a drive waveform based on the high-speed drive pulse SP60 and the three drive waveforms O1, O2', and O3 to be output from the driver circuit 80.

In FIG. 20(*a*), the high-speed drive pulse train SP60 to be output from the high-speed drive pulse generation circuit 74 is, in this example, a pulse train composed of 3 bits, namely, SP61 to SP63 and formed of the three drive pulses, namely, the first drive pulse SP61, the second drive pulse SP62, and the third drive pulse SP63 in time series, which includes a logical "1" or a logical "0" in order to turn on/off each of the transistors of the driver circuit 80.

In the first drive pulse SP1, the drive waveform O3 has a voltage of less than 0 V, and the other drive waveforms O1 and O2' have a voltage of 0 V. With this, a drive current flows into the coil B of the stepper motor 20 connected to the coil terminals O2' and O3 to excite the coil B.

Further, in the second drive pulse SP62, the drive waveform O2' has a voltage of less than 0 V, and the drive waveforms O1 and O3 have a voltage of 0 V. Then, the drive waveform O2' is applied to both the coil A and the coil B, which causes a drive current to flow into the coil A and the coil B of the stepper motor 20 to excite both the coil A and the coil B.

Further, in the third drive pulse SP63, the drive waveforms O1 and O2' have a voltage of less than 0 V, and the other drive waveform O3 has a voltage of 0 V. With this, a drive current flows into the coil B of the stepper motor 20 connected to the drive waveforms O2' and O3 to excite the coil B in a direction reverse to that of the first drive pulse SP61.

Next, with reference to the operation table of FIG. 20(*b*), description is given of the operation of each of the transistors of the driver circuit 80 based on the high-speed drive pulse train SP60. In regard to the driver circuit, FIG. 19 is referred to. In FIG. 20(*b*), in the first drive pulse SP61, the drive waveform O3 has a voltage of less than 0 V, and the other drive waveforms O1 and O2' have a voltage of 0 V. Thus, the transistors P2' and N3 are turned on, while the transistors N2' and P3 are turned off, and a drive current flows from the coil terminal O2' of the coil B into the coil terminal O3 to excite the coil B.

Further, the transistor N1 is turned off, the transistor P1 is turned on, and both the drive waveforms O1 and O2' have a voltage of 0 V. Thus, a drive current is not caused to flow into the coil A, which inhibits the coil A from being excited. In this case, the transistor P1 is turned on, but may be turned off. In FIG. 20(*b*), this is written as "OFF" in parentheses.

Further, in the second drive pulse SP62, the drive waveform O2' has a voltage of less than 0 V, and the other drive waveforms O1 and O3 have a voltage of 0 V. Thus, the transistors P1, N2', and P3 are turned on, and the transistors N1, P2', and N3 are turned off. Then, a drive current flows from the coil terminal O1 of the coil A into the coil terminal O2' while flowing from the coil terminal O3 of the coil B into the coil terminal O2', and hence the coil A and the coil B are both excited.

Further, in the third drive pulse SP63, the drive waveform O1 has a voltage of less than 0 V, and the other drive waveforms O2' and O3 have a voltage of 0 V. Thus, the transistors N2' and P3 are turned on, while the transistors P2' and N3 are turned off, and a drive current flows from the coil terminal O3 of the coil B into the coil terminal O2' to excite the coil B.

Further, the transistor P1 is turned off, the transistor N1 is turned on, and both the drive waveforms O1 and O2' have a voltage of less than 0 V. Thus, a drive current is not caused to flow into the coil A, which inhibits the coil A from being excited. In this case, the transistor N1 is turned on, but may be turned off.

In this manner, each of the transistors of the driver circuit 80 is ON/OFF controlled based on the three drive pulses, namely, the first to third drive pulses SP61 to SP63 of the high-speed drive pulse train SP60, to thereby excite the coils A and B of the stepper motor 20.

[Description of Rotational Drive by 360° Per Step in Fourth Embodiment: FIGS. 7]

The high-speed rotational drive of the stepper motor 20 in increments of 360° per step in the fourth embodiment is the same as that in the first embodiment, and is therefore described with reference to FIG. 7. First, FIG. 7(*a*) is an illustration of a state in which the first drive pulse SP61 of the high-speed drive pulse train SP60 is supplied to the stepper motor 20. The coil B is excited in the direction indicated by the arrow, and hence the second magnetic-pole portion 22*b* is magnetized to the N-pole, while the third magnetic-pole portion 22*c* is magnetized to the S-pole. Meanwhile, the coil A is not magnetized, and hence the first magnetic-pole portion 22*a* has the S-pole in the same manner as the third magnetic-pole portion 22*c*. Therefore, the rotor 21 is rotated in the counterclockwise direction, and the N-pole of the rotor 21 is rotated in the counterclockwise direction from the stationary position of 0° to reach the position of about 135°.

Next, as illustrated in FIG. 7(*b*), when the second drive pulse SP62 is supplied, both the coil A and the coil B are excited in the direction indicated by the arrow. Thus, the first magnetic-pole portion 22*a* is magnetized to the N-pole, the second magnetic-pole portion 22*b* is magnetized to the S-pole, and the third magnetic-pole portion 22*c* is not magnetized. As a result, the rotor 21 is further rotated in the counterclockwise direction, the N-pole of the rotor 21 is rotated to reach the position of about 270°.

Further, as illustrated in FIG. 7(*c*), when the third drive pulse SP63 is supplied, the coil B is excited in the direction indicated by the arrow. Thus, the second magnetic-pole portion 22*b* is magnetized to the S-pole, and the third magnetic-pole portion 22*c* is magnetized to the N-pole. In addition, the coil A is inhibited from being excited. Thus, the first magnetic-pole portion 22*a* has the N-pole in the same manner as the third magnetic-pole portion 22*c*. As a result, the rotor 21 is further rotated in the counterclockwise direction without stopping, and the N-pole of the rotor 21 is rotated to reach the position of about 315°.

After that, as illustrated in FIG. 7(*d*), when the supply of the high-speed drive pulse train SP60 is ended, the drive waveforms O1, O2', and O3 all have a voltage of 0 V, and the coil A and the coil B stop being excited, which cancels the magnetization of the first to third magnetic-pole portions, and the rotor 21 continues to rotate until reaching the statically stable point of 360° (0°) without stopping, and is held at that position. In this manner, the stepper motor 20 is rotationally driven by 360° through one-step drive based on the high-speed drive pulse train SP60 formed of the three drive pulses SP61 to SP63.

In this manner, with the electronic watch according to the fourth embodiment, even when the coil terminals O2' of the coil A and the coil B are short-circuited to be used in common, it is possible to perform the rotational drive by 360° in one step by supplying the high-speed drive pulse train SP60 formed of the three drive pulses SP61 to 63. In this case, it suffices that the number of drive waveforms to be supplied is three and that the number of transistors is smaller than that in the first embodiment, which is effective in miniaturization of the circuit scale and reduction in cost.

It is to be understood that, by setting the gear speed reduction ratio to 1/60, it is possible to obtain the effect of an increase in torque of the hands and the effect of improvement in impact resistance, as well as the effect that the movement of the hands becomes smoother to achieve satisfactory appearance, in the same manner as those of the first embodiment.

It is also to be understood that the rotational drive by 360° through one-step drive in the fourth embodiment may replace the rotational drive by 360° per step in the high-speed drive mode in the second embodiment.

Fifth Embodiment

[Description of Configuration of Electronic Watch According to Fifth Embodiment and Circuit Configuration of Driver Circuit in Fifth Embodiment: FIG. 18 and FIG. 19]

Next, description is given of an electronic watch according to a fifth embodiment of the present invention. A schematic configuration of the electronic watch 70 according to the fifth embodiment is the same as that of the fourth embodiment described above as illustrated in FIG. 18. The same applies to basic components included in the electronic watch 70, namely, the oscillation circuit 72 configured to output the reference signal P1, the control circuit 73 configured to receive as input the reference signal P1 to output the control signal CN1, the high-speed drive pulse generation circuit 74, the driver circuit 80, and the stepper motor 20. However, there is a difference in high-speed drive pulse output from the high-speed drive pulse generation circuit 74, and hence reference symbol SP60 in FIG. 18 is replaced here by reference symbol SP70 in the fifth embodiment.

In addition, the circuit configuration of the driver circuit 80 configured to drive the stepper motor 20 in the fifth embodiment is also the same as that in the fourth embodiment described above, and hence FIG. 19 is referred to here.

Figure 21:
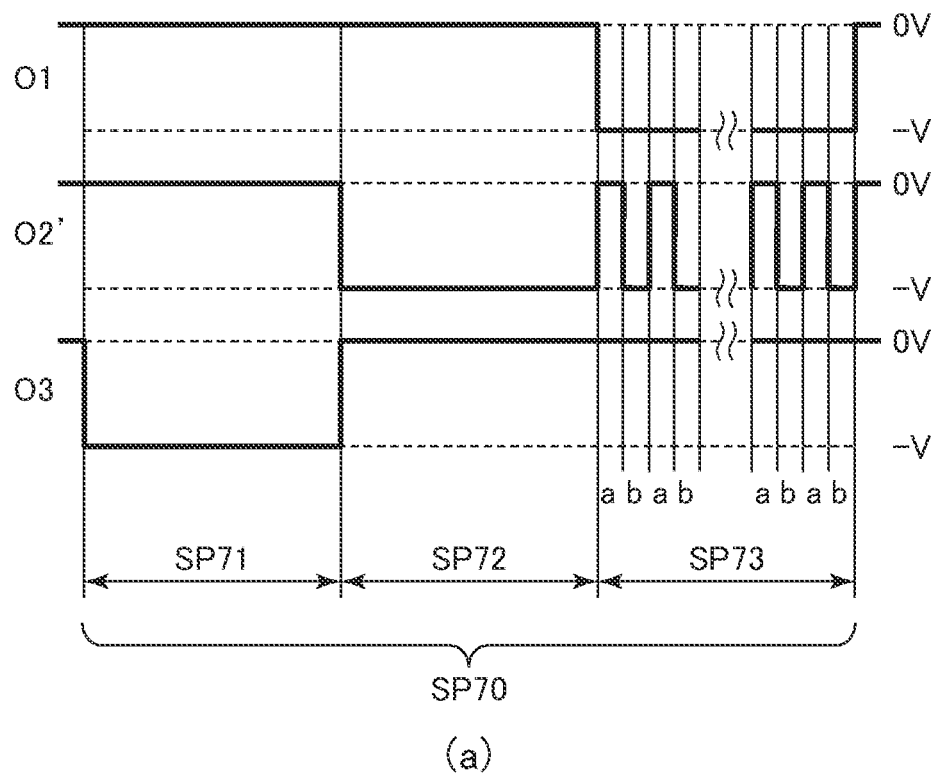
FIG. 21 are a waveform diagram of a high-speed drive pulse train and an operation table for transistors in the driver circuit in a fifth embodiment of the present invention.

[Description of Generation of Drive Pulse and Drive Waveform in Fifth Embodiment: FIGS. 21]

Next, with reference to FIG. 21, description is given of an example of the drive waveform of a high-speed drive pulse for rotationally driving the stepper motor in the fifth embodiment in increments of 360° per step and the operation of each of the transistors of the driver circuit.

First, the high-speed drive pulse train SP70 is used for rotationally driving the rotor of the stepper motor 20 of FIG. 18 from the stationary position of 0° in the forward rotation direction (counterclockwise) in increments of 360°. FIG. 21(*a*) is an illustration of a drive waveform based on the high-speed drive pulse SP60 and the three drive waveforms O1, O2', and O3 to be output from the driver circuit 80.

In FIG. 21(*a*), the high-speed drive pulse train SP70 to be output from the high-speed drive pulse generation circuit 74 is, in this example, a pulse train composed of 3 bits, namely, SP71 to SP73 and formed of the three drive pulses, namely, the first drive pulse SP71, the second drive pulse SP72, and the third drive pulse SP73 in time series, which includes a logical "1" or a logical "0" in order to turn on/off each of the transistors of the driver circuit 80.

In the first drive pulse SP1, the drive waveform O3 has a voltage of less than 0 V, and the other drive waveforms O1 and O2' have a voltage of 0 V. With this, a drive current flows into the coil B of the stepper motor 20 connected to the drive waveforms O2' and O3 to excite the coil B.

Further, in the second drive pulse SP72, the drive waveform O2' has a voltage of less than 0 V, and the drive waveforms O1 and O3 have a voltage of 0 V. Then, the drive waveform O2' is applied to both the coil A and the coil B, which causes a drive current to flow into the coil A and the coil B of the stepper motor 20 to excite both the coil A and the coil B.

The third drive pulse SP73 includes a drive pulse SP73*a*, in which the drive waveform O1 has a voltage of less than 0 V and the drive waveform O2' has a voltage of 0 V, and a drive pulse SP73*b*, in which the drive waveform O1 and the drive waveform O2' both have a voltage of less than 0 V. The drive pulse SP73*a* and the drive pulse 73*b* are repeated in a regular pattern to collectively form the drive pulse SP73. The other drive waveform O3 has a voltage of 0 V. With this, while the drive pulse SP73*a* is applied, a drive current flows into the coil A of the stepper motor 20 connected to the coil terminals O2' and O1 to excite the coil A, and while the drive pulse SP73*b* is applied, a drive current flows into the coil B of the stepper motor 20 connected to the coil terminals O2' and O3 to excite the coil B.

Next, with reference to the operation table of FIG. 21(*b*), description is given of the operation of each of the transistors of the driver circuit 80 based on the high-speed drive pulse train SP70. In FIG. 21(*b*), in the first drive pulse SP71, the drive waveform O3 has a voltage of less than 0 V, and the other drive waveforms O1 and O2' have a voltage of 0 V. Thus, the transistors P2' and N3 are turned on, while the transistors N2' and P3 are turned off, and a drive current flows from the coil terminal O2' of the coil B into the coil terminal O3 to excite the coil B.

Further, the transistor N1 is turned off, the transistor P1 is turned on, and both the drive waveforms O1 and O2' have a voltage of 0 V. Thus, a drive current is not caused to flow into the coil A, which inhibits the coil A from being excited. In this case, the transistor P1 is turned on, but may be turned off.

Further, in the second drive pulse SP72, the drive waveform O2' has a voltage of less than 0 V, and the other drive waveforms O1 and O3 have a voltage of 0 V. Thus, the transistors P1, N2', and P3 are turned on, and the transistors N1, P2', and N3 are turned off. Then, a drive current flows from the coil terminal O1 of the coil A into the coil terminal O2' while flowing from the coil terminal O3 of the coil B into the coil terminal O2', and hence the coil A and the coil B are both excited.

Further, in the third drive pulse SP73, the drive waveform O1 and the drive waveform O3 are maintained at a voltage of less than 0 V and a voltage of 0 V, respectively, and the voltage of the drive waveform O2' differs depending on the segment. In the segment of the third drive pulse SP73*a*, the drive waveform O2' has a voltage of 0 V, and hence the transistor P2' is turned on, while the transistor N2' is turned off. Then, the transistors P1 and N3 are in an off state, and the transistors N1 and P3 are in an on state. Thus, a drive current flows from the coil terminal O1 of the coil A into the coil terminal O2' to excite the coil A. Meanwhile, in the segment of the third drive pulse SP73*b*, the drive waveform O2' has a voltage of less than 0 V, and hence the transistor P2' is turned off, while the transistor N2' is turned on. Then, similarly, the transistors P1 and P3 are in an off state, and the transistors N1 and P3 are in an on state. Thus, a drive current flows from the coil terminal O2' of the coil B into the coil terminal O3 to excite the coil B.

In the segment of the third drive pulse SP73a, the coil terminals O3 and O2' both have a voltage of 0 V. Thus, a drive current is not caused to flow into the coil B, which inhibits the coil B from being excited. At this time, the transistor P3 is turned on, but may be turned off.

Further, in the segment of the third drive pulse SP73b, the coil terminals O1 and O2' both have a voltage of −V. Thus, a drive current is not caused to flow into the coil A, which inhibits the coil A from being excited. At this time, the transistor N1 is turned on, but may be turned off.

The order in which the third drive pulse SP73a and the third drive pulse 73b are repeated in the third drive pulse SP73 is not particularly limited. In the example described here, the third drive pulse SP73a is first applied, and the third drive pulse 73b is then applied, which is repeated subsequently in the same manner, but the order may be reversed. Further, the third drive pulse SP73a, the third drive pulse SP73b, the third drive pulse SP73b, and the third drive pulse SP73a may be applied in the stated order to be repeated subsequently in the same manner. It is desired to equalize the total period occupied by the third drive pulse SP73a and the total period occupied by the third drive pulse 73b within the segments of the third drive pulse SP73 so that magnetic forces excited by the coil A and the coil B become equal to each other. However, the total periods may differ from each other within such a range that the magnetic forces excited by the coil A and the coil B are practically equal to each other. Further, the lengths of the third drive pulse SP73a and the third drive pulse 73b are desired to be set equal to each other in terms of ease of forming the third drive pulse SP73, but may not necessarily match each other.

In this manner, each of the transistors of the driver circuit 80 is ON/OFF controlled based on the three drive pulses, namely, the first to third drive pulses SP71 to SP73 of the high-speed drive pulse train SP70, to thereby excite the coils A and B of the stepper motor 20.

[Description of Rotational Drive by 360° Per Step in Fifth Embodiment: FIGS. 22]

The high-speed rotational drive of the stepper motor 20 in increments of 360° per step in the fifth embodiment is described with reference to FIG. 22. First, FIG. 22(a) is an illustration of a state in which the first drive pulse SP71 of the high-speed drive pulse train SP70 is supplied to the stepper motor 20. The coil B is excited in the direction indicated by the arrow, and hence the second magnetic-pole portion 22b is magnetized to the N-pole, while the third magnetic-pole portion 22c is magnetized to the S-pole. Meanwhile, the coil A is not magnetized, and hence the first magnetic-pole portion 22a has the S-pole in the same manner as the third magnetic-pole portion 22c. Therefore, the rotor 21 is rotated in the counterclockwise direction, and the N-pole of the rotor 21 is rotated in the counterclockwise direction from the stationary position of 0° to reach the position of about 135°.

Next, as illustrated in FIG. 22(b), when the second drive pulse SP72 is supplied, both the coil A and the coil B are excited in the direction indicated by the arrow. Thus, the first magnetic-pole portion 22a is magnetized to the N-pole, the second magnetic-pole portion 22b is magnetized to the S-pole, and the third magnetic-pole portion 22c is not magnetized. As a result, the rotor 21 is further rotated in the counterclockwise direction, the N-pole of the rotor 21 is rotated to reach the position of about 270°.

In addition, the third drive pulse SP73 is supplied. The third drive pulse SP73 is formed of the third drive pulse SP73a and the third drive pulse SP73b. FIG. 22(c) is an illustration of a state in which the third drive pulse SP73a is supplied. The coil A is excited in the direction indicated by the arrow, and hence the first magnetic-pole portion 22a is magnetized to the S-pole, while the second magnetic-pole portion 22b and the third magnetic-pole portion 22c are magnetized to the N-pole. Further, FIG. 22(d) is an illustration of a state in which the third drive pulse SP73b is supplied. The coil B is excited in the direction indicated by the arrow, and hence the second magnetic-pole portion 22b is magnetized to the S-pole, while the first magnetic-pole portion 22a and the third magnetic-pole portion 22c are magnetized to the N-pole.

Then, in the segments of the third drive pulse SP73, the third drive pulse SP73a and the third drive pulse SP73b are repeatedly applied at short intervals, and hence the magnetization state illustrated in FIG. 22(c) and the magnetization state illustrated in FIG. 22(d) repeatedly appear. An effective magnetization state that appears in the stepper motor 20 can be assumed to be obtained by combining the two magnetization states. As a result, the third magnetic-pole portion 22c is magnetized to the N-pole in the same manner as in the magnetization states illustrated in FIG. 22(c) and FIG. 22(d), and therefore has the N-pole over all the segments of the third drive pulse SP73. Meanwhile, different poles alternately appear in the first magnetic-pole portion 22a and the second magnetic-pole portion 22b, and hence the magnetization states are apparently canceled, which results in effectively demagnetized state, namely, a weakly magnetized state. With this, the rotor 21 is further rotated in the counterclockwise direction, and the N-pole of the rotor 21 is rotated to reach the position of about 360°.

In this manner, it is possible to achieve the rotational drive by 360° through one-step drive based on the high-speed drive pulse train 70 formed of the three drive pulses SP71 to SP73.

In the third embodiment, the magnetization state of the third drive pulse SP73, which is obtained by combining the magnetization state illustrated in FIG. 22(c) and the magnetization state illustrated in FIG. 22(d) at this time is substantially the same as that illustrated in FIG. 14(e). However, as apparent from FIG. 22, the coil A and the coil B are not simultaneously excited, and hence in order to supply a sufficient rotational force to the rotor 21, the length of the third drive pulse SP73 may be set longer than those of the first drive pulse SP71 and the second drive pulse SP72.

In this manner, with the electronic watch according to the fifth embodiment, even when the coil terminals O2' of the coil A and the coil B are short-circuited to be used in common, it is possible to perform the rotational drive by 360° in one step by supplying the high-speed drive pulse train SP70 formed of the three drive pulses SP71 to 73. In this case, it suffices that the number of drive waveforms to be supplied is three and that the number of transistors is smaller than that in the first embodiment, which is effective in miniaturization of the circuit scale and reduction in cost.

Further, the rotational drive by 360° through one-step drive in the fifth embodiment may replace the rotational drive by 360° per step in the high-speed drive mode in the third embodiment. With this configuration, it is possible to achieve the rotational drive by 360° per step in the high-speed drive mode in addition to the rotational drive by 180° per step in the normal drive mode. In addition, in the rotational drive by 360° through one-step drive in the fifth embodiment, the coil A and the coil B are not simultaneously excited, and the maximum value of the current consumption can be suppressed to a low level. Therefore, the high-speed drive based on the rotational drive by 360° per step can be performed even when a power source condition is strict, for example, when the outside temperature is low or in a state in which the power supply voltage is lowered.

Sixth Embodiment

Figure 23:
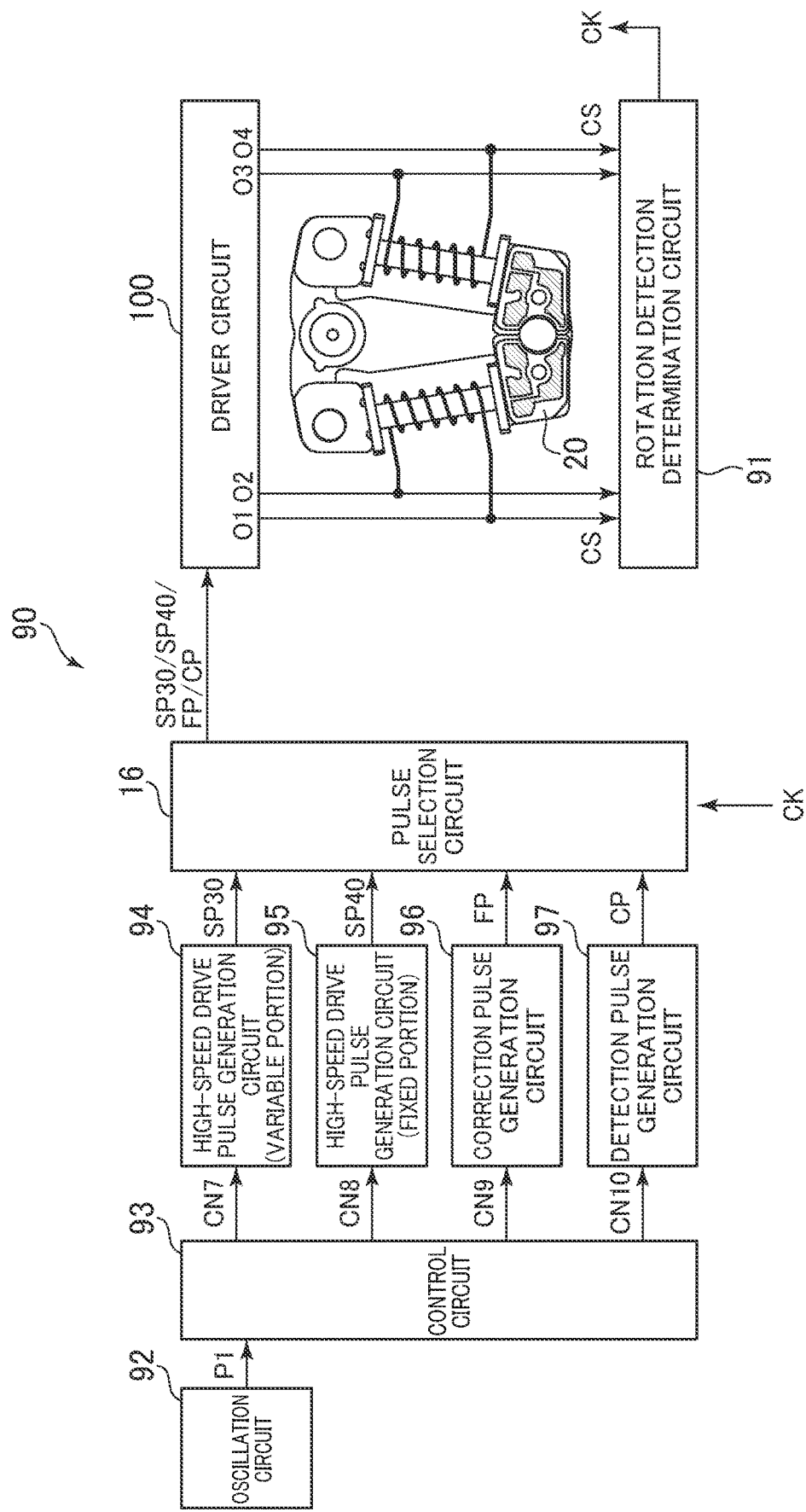
FIG. 23 is a configuration diagram for illustrating a schematic configuration of an electronic watch according to a sixth embodiment of the present invention.

[Description of Configuration of Electronic Watch According to Sixth Embodiment: FIG. 23]

Next, a schematic configuration of an electronic watch according to a sixth embodiment of the present invention is described with reference to FIG. 23. Reference symbol 90 denotes an analog indication-type electronic watch according to the sixth embodiment. The electronic watch 90 includes, as basic components, an oscillation circuit 92 configured to output the reference signal P1, a control circuit 93 configured to receive the reference signal P1 as input and to output control signals CN7, CN8, CN9, and CN10, two high-speed drive pulse generation circuits, namely, a high-speed drive pulse generation circuit (variable portion) 94 and a high-speed drive pulse generation circuit (fixed portion) 95, a correction pulse generation circuit 96, a detection pulse generation circuit 97, a pulse selection circuit 16, a driver circuit 100, and the stepper motor 20, and further includes a rotation detection determination circuit 91.

The high-speed drive pulse generation circuit (variable portion) 94 and the high-speed drive pulse generation circuit (fixed portion) 95 receive the control signals CN7 and CN8, respectively, as input, and generates and outputs SP30 and SP40, respectively, being parts of the high-speed drive pulse train formed of a plurality of drive pulses for driving the stepper motor 20.

The correction pulse generation circuit 96 receives the control signal CN9 as input, and generates and outputs a correction pulse FP for driving the stepper motor 20.

The detection pulse generation circuit 97 receives the control signal CN10 as input, and generates and outputs the detection pulse CP for detecting that the rotor 21 of the stepper motor 20 has been rotated in a normal state.

The pulse selection circuit 16 selects the pulses SP30, SP40, FP, and CP, which are generated and output by the high-speed drive pulse generation circuit (variable portion) 94 and the high-speed drive pulse generation circuit (fixed portion) 95, the correction pulse generation circuit 96, and the detection pulse generation circuit 97, respectively, and outputs the pulses SP30, SP40, FP, and CP to the driver circuit 100 at an appropriate timing.

The driver circuit 100 supplies the drive waveforms O1 to O4 to the coil A and the coil B of the stepper motor 20 based on the pulses input from the pulse selection circuit 16 to drive the stepper motor 20.

The rotation detection determination circuit 91 detects an induced current due to the free rotation of the rotor 21 of the stepper motor 20 based on detection signals CS detected when the detection pulse CP is supplied to the coil A and the coil B of the stepper motor 20 to determine the presence or absence of the rotation of the rotor 21, and outputs a determination result CK. The output determination result CK is input to the pulse selection circuit 16 to be used for the switching control of the pulse.

Figure 24:
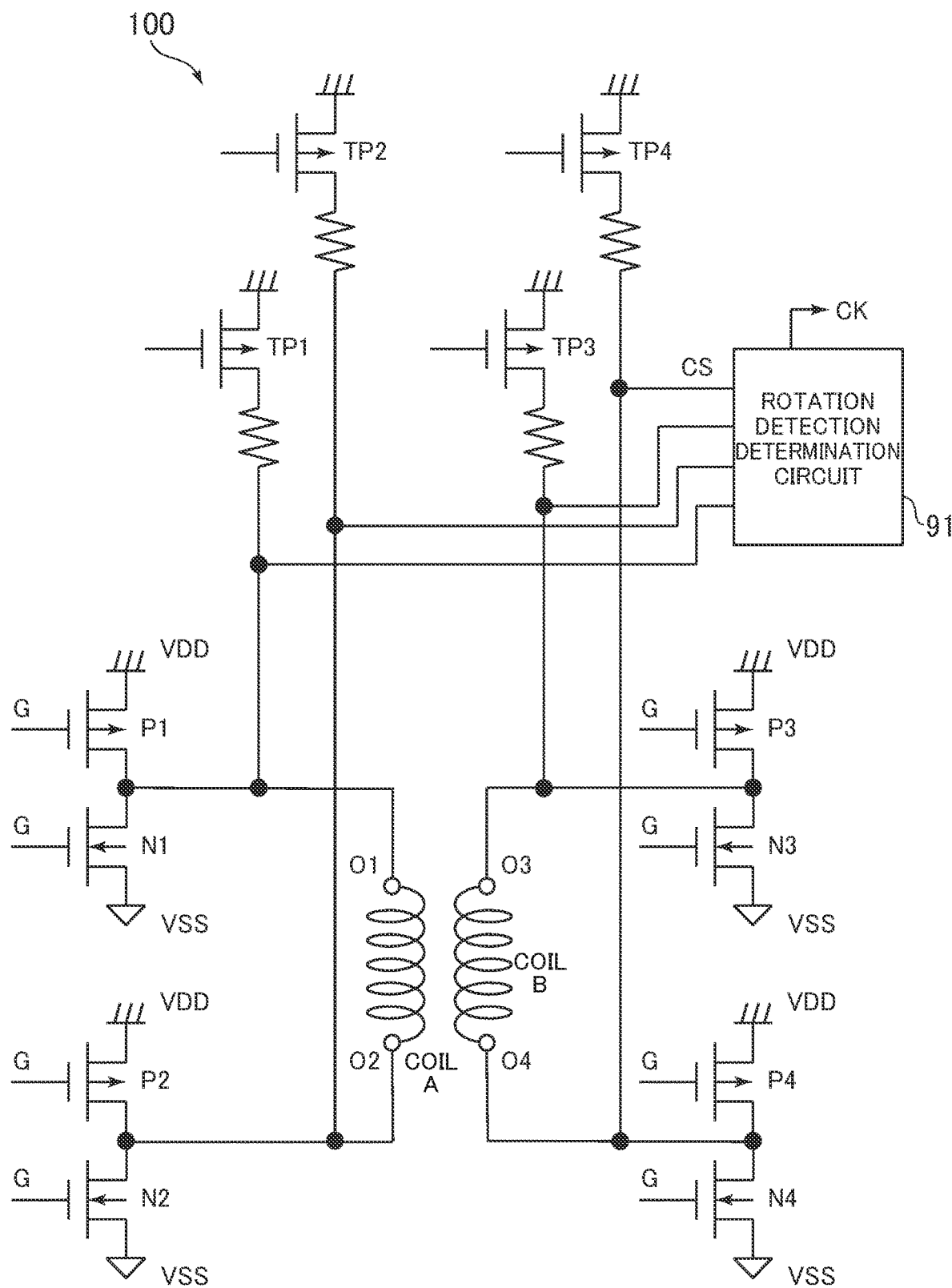
FIG. 24 is a circuit diagram for illustrating an example of a driver circuit in the sixth embodiment of the present invention.

[Description of Circuit Configuration of Driver Circuit in Sixth Embodiment: FIG. 24]

Next, with reference to FIG. 24, description is given of an example of the circuit configuration of the driver circuit 100 configured to drive the stepper motor 20. The driver circuit 100 is formed of four buffer circuits configured to supply four drive waveforms to the coil A and the coil B of the stepper motor 20.

As illustrated in FIG. 24, buffer circuits including the transistors P1 to 4 being the P-channel MOS transistors and the transistors N1 to 4 being the N-channel MOS transistors, which are complementarily connected to each other, are connected to the coil terminals O1 to O4 of the coil A and the coil B, and are configured to output the drive waveforms O1 to O4, respectively.

In addition, transistors TP1 and TP2 being P-channel MOS transistors are connected to the coil terminals O1 and O2, respectively, of the coil A via detection resistances, and transistors TP3 and TP4 being P-channel MOS transistors are connected to the coil terminals O3 and O4, respectively, of the coil B via detection resistances. The detection pulse CP is output to the transistors TP1 to TP4, and the detection signals CS obtained thereby are input to the rotation detection determination circuit 91.

Figure 25:
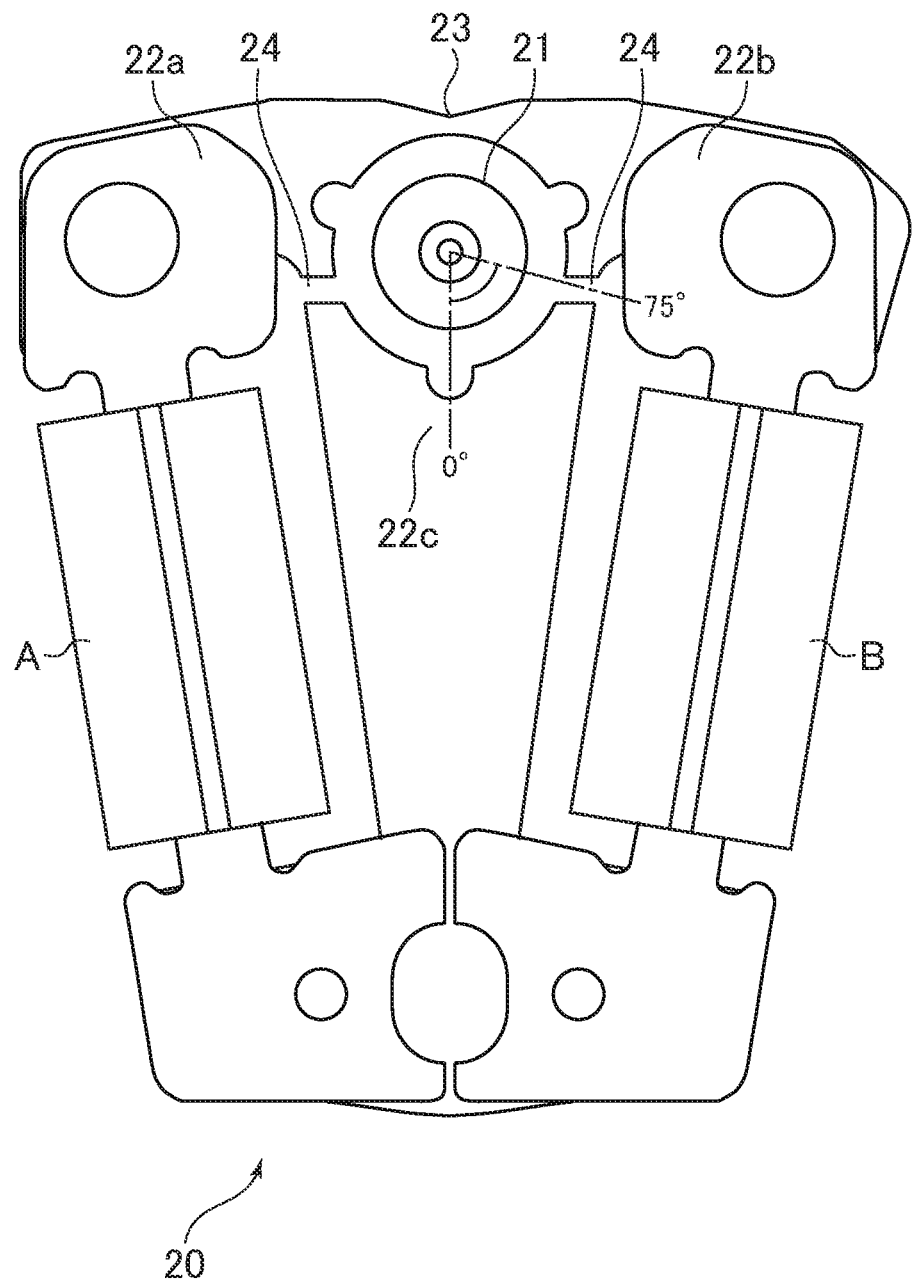
FIG. 25 is a diagram for illustrating a structure of the stepper motor.

[Description of Rotation Detection in Sixth Embodiment: FIG. 25 and FIGS. 26]

Now, the rotation detection of the rotor 21 of the stepper motor 20 by the detection pulse CP and the rotation detection determination circuit 91 is described with reference to FIG. 25 and FIG. 26.

FIG. 25 is a diagram for illustrating a structure of the stepper motor 20. A stator of the stepper motor 20 includes the first magnetic-pole portion 22a and the second magnetic-pole portion 22b, which are formed so as to oppose to each other through the rotor 21, and the third magnetic-pole portion 22c, which is formed between the first magnetic-pole portion 22a and the second magnetic-pole portion 22b so as to oppose to the rotor 21. There are provided the coil A so as to form a magnetic circuit between the first magnetic-pole portion 22a and the third magnetic-pole portion 22c and the coil B so as to form a magnetic circuit between the second magnetic-pole portion 22b and the third magnetic-pole portion 22c.

A constriction portion 23, in which the stator has a small width, is provided between the first magnetic-pole portion 22a and the second magnetic-pole portion 22b on the opposite side of the third magnetic-pole portion 22c through the rotor 21. In addition, a direction of the third magnetic-pole portion 22c is set as 0° when viewed from the center of the rotor 21, and slits 24 are formed at positions on the left and right by about 75°. The slits 24 are formed so that the first magnetic-pole portion 22a and the third magnetic-pole portion 22c are not directly magnetically connected to each other and the second magnetic-pole portion 22b and the third magnetic-pole portion 22c are not directly magnetically connected to each other. The slit 24 may be formed as a gap as illustrated here, or a non-magnetic material having a small width may be inserted into the position of the slit 24 to be combined with the stator.

With the constriction portion 23 and the slits 24 being thus provided, magnetism generated in the stator due to electromagnetic induction while the rotor 21 is rotated by being supplied with a drive pulse and while the rotor 21 is freely rotated due to the inertia of the rotor 21 becomes hard to pass through the slits 24 and the constriction portion 23 having large magnetic resistance, and hence a large part of the magnetism follows a path passing through the coil A or the coil B. With this, the use of the coil A or the coil B increases detection sensitivity exhibited when the induced current, which is induced by the rotation of the rotor 21, is detected through use of the coil A or B.

That is, by turning on the transistors TP1 to TP4 illustrated in FIG. 24 based on the detection pulse CP at a predetermined timing, it is possible to extract magnitudes of the induced currents generated in the coil terminals O1 to O4 corresponding to the respective transistors as the detection signals CS being voltage signals. The rotation detection determination circuit 91 determines the rotation or non-rotation of the rotor 21 based on the detection signal CS, and outputs the determination result CK.

Now, the rotation and non-rotation of the rotor 21 are described. FIG. 26 are diagrams for illustrating the rotation and non-rotation of the rotor 21 of the stepper motor 20. FIG. 26(a) is an illustration of a case of the non-rotation of the rotor 21, that is, a case in which the rotor 21 fails to be rotated without being rotated by a desired angle even when the drive pulse is applied. In this case, the drive pulse is output to temporarily rotate the rotor 21 in the counterclockwise direction, but due to an insufficient drive force, the rotor 21 is returned to the initial position of 0° by being reversely rotated in the clockwise direction by a holding torque. In this case, the rotor 21 finally fails to be rotated, which is referred to as "non-rotation". In FIG. 26(a), the rotation of the rotor 21 during a period in which the drive pulse is being output is indicated by the broken line.

FIG. 26(b) is an illustration of a case of the rotation of the rotor 21, that is, a case in which the rotor 21 is successfully rotated by a desired angle due to the applied drive pulse. In this case, the drive pulse is output to rotate the rotor 21 in the counterclockwise direction by an angle equal to or larger than a given angle. Thus, the rotor 21 is further rotated in the counterclockwise direction by a holding torque even after the drive pulse stops being output, and rotated to reach the position of 180° being a target position of the rotation per step. In this case, the rotor 21 is rotated to finally reach the target position of the rotation per step, which is referred to as "rotation".

In this manner, the rotor 21 differs in behavior of the rotor 21 after the output of the drive pulse between the case of the rotation and the case of the non-rotation, and hence the waveforms of the induced currents generated in the coil A and the coil B differ from each other. The different waveforms are extracted as the detection signals CS based on the detection pulse CP, and the rotation detection determination circuit 91 determines the rotation or non-rotation of the rotor.

Figure 27:
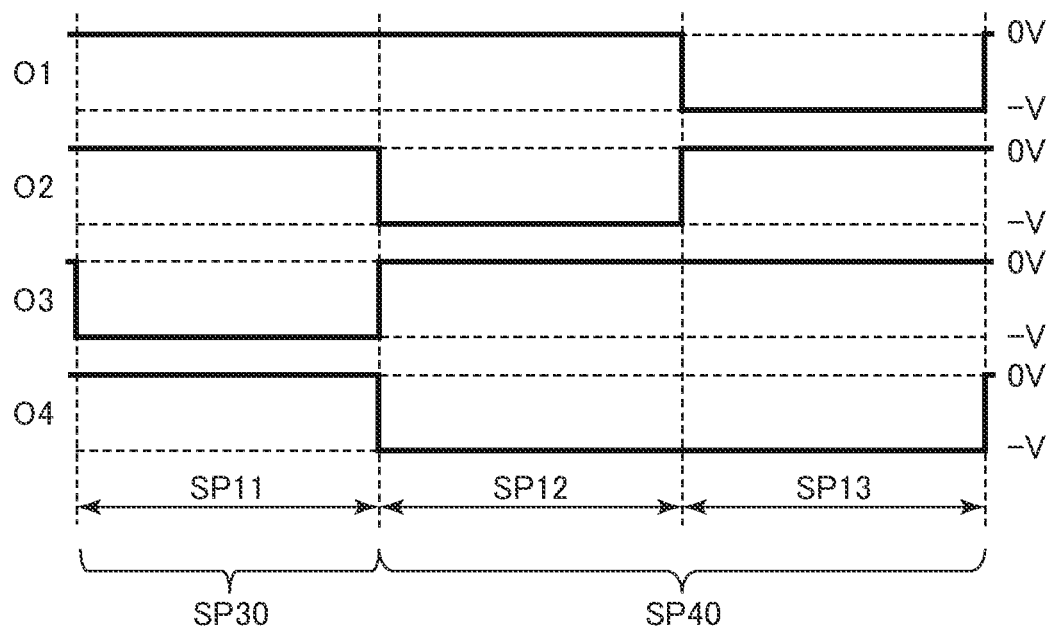
FIG. 27 is a waveform diagram of a high-speed drive pulse train in the sixth embodiment of the present invention.

[Description of Generation of Drive Pulse and Drive Waveform in Sixth Embodiment: FIG. 27]

With reference to FIG. 27, description is given of an example of the drive waveform of a high-speed drive pulse for rotationally driving the stepper motor in the sixth embodiment in increments of 360° per step. The drive waveform itself described here is the same as that described in the first embodiment with reference to FIG. 6.

However, in the sixth embodiment, the high-speed drive pulse train is handled by being divided into the variable drive pulse SP30 being the first half and the fixed drive pulse SP40 being the second half. The entire high-speed drive pulse train illustrated in FIG. 27 is the same as that illustrated and shown in FIG. 6, and the three drive pulses SP11, SP12, and SP13 that form the high-speed drive pulse train are the same as those of the first embodiment and are denoted by the same reference symbols.

In this case, the variable drive pulse SP30 corresponds to the drive pulse 11. As described later, the variable drive pulse SP30 has the length (period) changed depending on a condition. Meanwhile, the fixed drive pulse SP40 corresponds to the drive pulse 12 and the drive pulse SP13. The length of the fixed drive pulse SP40 is fixed and determined in advance.

The operation of each of the transistors of the driver circuit 80 configured to output the drive pulses SP11 to 13, which form the variable drive pulse SP30 and the fixed drive pulse SP40, is the same as that described in the first embodiment with reference to FIG. 6, and hence duplicate description is omitted here.

Figure 28:
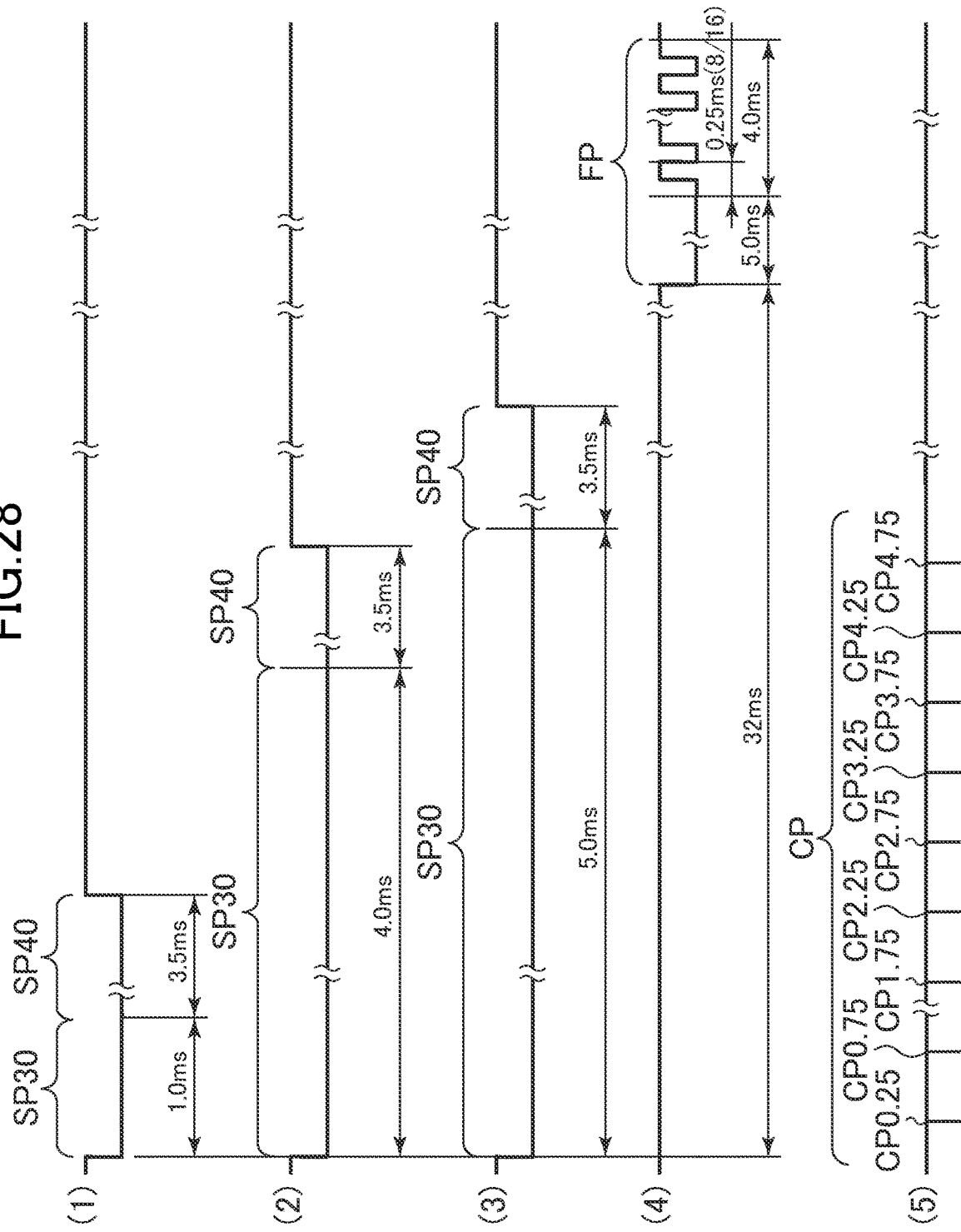
FIG. 28 is a diagram for illustrating pulse waveforms in the sixth embodiment of the present invention.

[Description of Pulse Waveforms in Sixth Embodiment: FIG. 28]

FIG. 28 is an illustration of the pulse waveforms in the sixth embodiment. In FIG. 28, waveforms (1) to (3) are illustrated as examples of drive pulses to be applied to the stepper motor 20 when the rotation of the rotor 2l is determined, that is, examples of the variable drive pulse SP30 and the fixed drive pulse SP40. Which of pulse waveforms including the waveforms (1) to (3) is to be selected varies depending on the result of the rotation detection. Further, a waveform (4) indicates the correction pulse FP to be applied to the stepper motor 20 when the non-rotation of the rotor 21 is determined. A waveform (5) indicates a timing to apply the detection pulse CP for performing the rotation detection.

In the sixth embodiment, the length of the variable drive pulse SP30 can be selected from among the five lengths of from 1 ms to 5 ms in units of 1 ms, and the fixed drive pulse SP40 is output for 3.5 ms immediately after the variable drive pulse SP30. The rotation detection is performed, and it is determined based on a result of the detection which of the lengths of the variable drive pulse is to be selected. This is described later in more detail, but the basic idea is that the variable drive pulse SP30 is kept being output until the rotation is determined.

When the rotation cannot be determined even after the variable drive pulse SP30 having the maximum length (5 ms) is output, the correction pulse FP indicated by the waveform (4) is output to reliably rotate the rotor 21. The correction pulse FP is output to reliably rotate the rotor 21 when the non-rotation of the rotor 21 is determined, and has the waveform set so as to have a strong drive force. In this case, the waveform is set to be continuously output for 5 ms and then continue the pulse output for 4 ms every 0.25 ms with a duty cycle of 8/16.

The detection pulse CP is set as a pulse having a width of 16 μs, which is output every 0.5 ms after an elapse of 0.25 ms from the start of the output of the variable drive pulse SP30 until an elapse of 4.75 ms.

The lengths and shapes of the variable drive pulse SP30, the fixed drive pulse SP40, and the correction pulse FP, the output timing of the detection pulse CP, and the like in the above description are merely examples, and may be changed depending on different kinds of configurations including the shape and size of the stepper motor 20 and additions mounted to the stepper motor 20.

Figure 29:
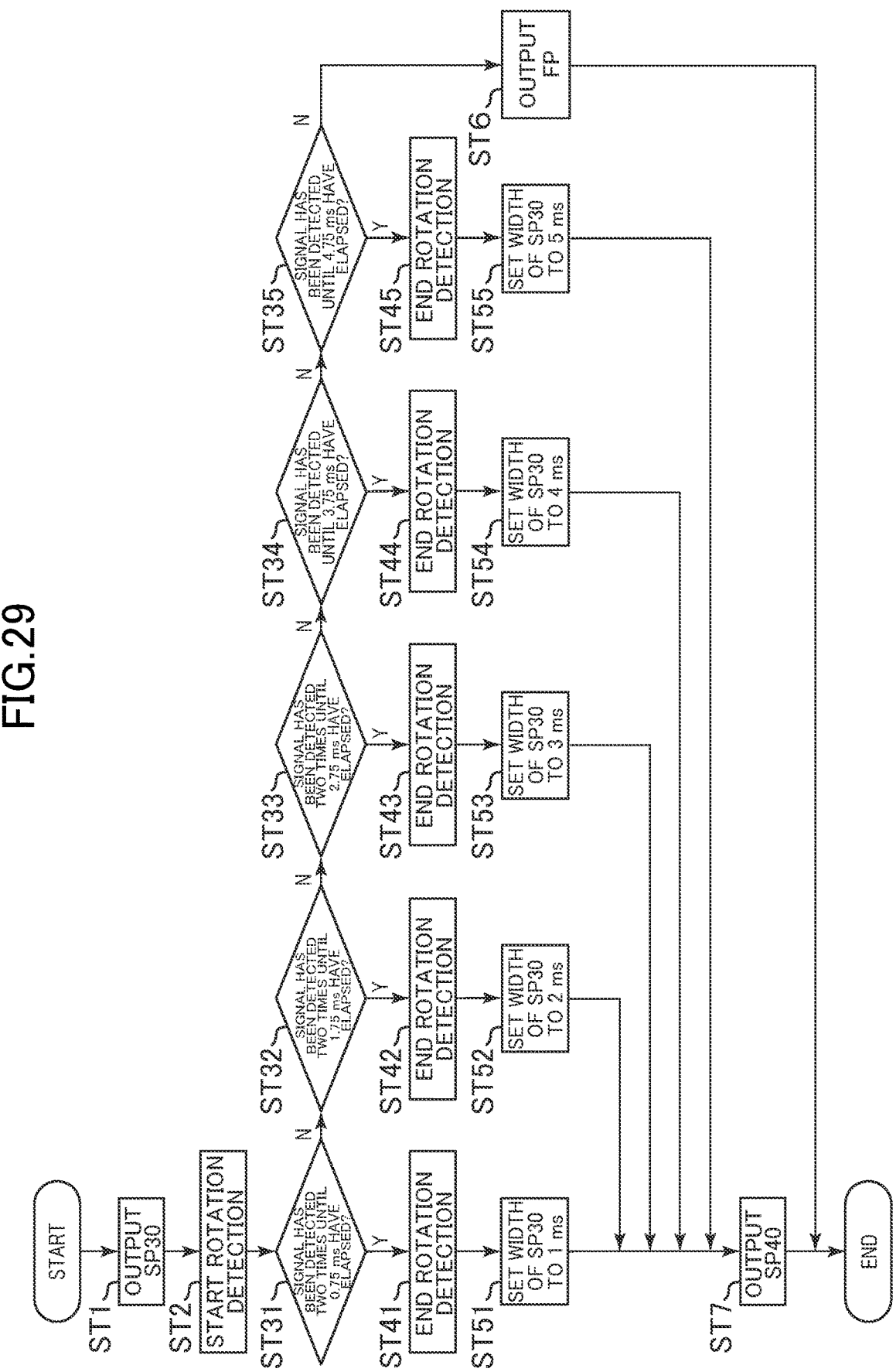
FIG. 29 is a flow chart for illustrating an operation for high-speed drive pulse train output in the sixth embodiment of the present invention.

[Description of Flow of High-Speed Drive Pulse Train Output in Sixth Embodiment: FIG. 29]

FIG. 29 is a flow chart for illustrating an operation for high-speed drive pulse train output in the sixth embodiment. Now, with reference to this flow chart, description is given of the operation of the electronic watch 90 according to the sixth embodiment, which is controlled by the control circuit 93.

First, at the timing of hand movement, the variable drive pulse SP30 output by the high-speed drive pulse generation circuit (variable portion) is selected by the pulse selection circuit 16 to be output to the driver circuit 100 (Step ST1). With this, the rotor 21 of the stepper motor 20 starts the rotation. Then, the detection pulse CP, which is output from a detection pulse generation circuit every 5 ms after an elapse of 0.25 ms, is selected by the pulse selection circuit 16 to be output to the driver circuit 100, and the rotation detection is started (Step ST2). The rotation detection determination circuit 91 outputs the determination result CK based on the detection signal CS obtained as a result of the detection.

In this case, the determination of the rotation or non-rotation performed by the rotation detection determination circuit 91 is described with reference to FIG. 30. FIG. 30 is a diagram for illustrating waveforms of induced currents generated in the coil A and the coil B when the variable drive pulse SP30 is applied and illustrating pulses applied to the coil terminals O1 to O4 and detection signals.

The variable drive pulse SP30 has been applied to the coil terminal O3 since the time 0 ms, and a voltage is applied between the coil terminals O3 and O4 of the coil B to excite the coil B. This causes the rotor 21 to start the rotation to generate a positive-direction induced current between the coils A and B.

The detection pulse CP is applied to the coil A being a coil different from the coil to which the variable drive pulse SP30 is applied. Specifically, the detection pulse CP is applied to the coil terminal O1 every 0.5 ms after 0.25 ms from the start, to thereby obtain the detection signal CS corresponding to each detection pulse CP.

As apparent from the waveform of the induced current generated in the coil A of FIG. 30, at the beginning of the rotation of the rotor 21, the induced current generated in the coil A has a value that has a positive sign and is not so large. Depending on the condition, in the example illustrated here, the sign of the induced current is reversed at a time point at which about 2.5 ms have elapsed from the start of the rotation to become a negative sign, which generates a trough of a waveform indicating a value having a magnitude equal to or larger than a fixed magnitude.

This trough of the waveform having a negative value indicates that the rotor 21 has overcome the peak of potential to be rotated toward the statically stable point being a target, and it is possible to detect the rotation by detecting this trough of the waveform having a negative sign, which is indicated by the hatched portion in FIG. 30.

The detection signal CS detected from the coil terminal O1 is compared with a predetermined negative threshold value th. Then, as illustrated in FIG. 30, in this example, the detection signal CS does not fall below the threshold value th and is thus not obtained until CP2.75 after an elapse of 2.75 ms from the start of the rotation, but the detection signal CS that falls below the threshold value th is obtained based on the detection pulse CP3.25 after an elapse of 3.25 ms.

Then, in the sixth embodiment, the rotation is determined when two consecutive detection signals CS are obtained, and hence the rotation detection determination circuit 91 is configured to determine the rotation when the detection signal CS based on the detection pulse CP3.75 after an elapse of 3.75 ms from the start of the rotation is further detected, and to output the determination result CK. Meanwhile, when two consecutive detection signals CS are not obtained even after 4.75 ms have elapsed from the start of the rotation, the rotation detection determination circuit 91 determines the non-rotation and outputs the determination result CK.

A timing at which consecutive detection signals CS are obtained differs depending on different kinds of conditions including the power supply voltage, the magnitude of the load, and the attitude of the electronic watch 90. Further, the condition for the determination is not limited to the two consecutive signals, and the condition may be freely set. For example, the rotation may be determined based on one signal or three or more signals, or the rotation may be determined based on consecutive signals or a number obtained by adding the numbers of signals obtained within a predetermined period.

Referring back to FIG. 29, after the rotation detection is started, the timing at which the rotation determination is made is monitored. That is, first, it is determined whether or not the detection signal CS has been obtained two times until 0.75 ms have elapsed since the rotation was started (Step ST31). When the detection signal CS has been obtained two times (Step ST31: Y), the rotation detection is ended (Step ST41) to stop outputting the detection pulse CP, and sets the width of the variable drive pulse SP30 to 1 ms (Step ST51). With this, the variable drive pulse SP30 stops being output in 1 ms, and the fixed drive pulse SP40 is subsequently output (Step ST7), which brings the rotation per step of the rotor 21 to an end.

When the detection signal CS has not been obtained two times until 0.75 ms have elapsed since the rotation was started (Step ST31: N), it is subsequently determined whether or not the detection signal CS has been obtained two times until 1.75 ms have elapsed (Step ST32). When the detection signal CS has been obtained two times (Step ST32: Y), the rotation detection is ended (Step ST42), and the width of the variable drive pulse SP30 is set to 2 ms (Step ST53). After the variable drive pulse SP30 stops being output, the fixed drive pulse SP40 is subsequently output (Step ST7).

Similarly, when the detection signal CS has not been obtained two times until 1.75 ms have elapsed since the rotation was started (Step ST32: N), it is subsequently determined whether or not the detection signal CS has been obtained two times until 2.75 ms have elapsed (Step ST33). When the detection signal CS has been obtained two times (Step ST33: Y), the rotation detection is ended (Step ST43), and the width of the variable drive pulse SP30 is set to 3 ms (Step ST53). After the variable drive pulse SP30 stops being output, the fixed drive pulse SP40 is subsequently output (Step ST7).

Similarly, when the detection signal CS has not been obtained two times until 2.75 ms have elapsed since the rotation was started (Step ST33: N), it is subsequently determined whether or not the detection signal CS has been obtained two times until 3.75 ms have elapsed (Step ST34). When the detection signal CS has been obtained two times (Step ST34: Y), the rotation detection is ended (Step ST44), and the width of the variable drive pulse SP30 is set to 4 ms (Step ST54). After the variable drive pulse SP30 stops being output, the fixed drive pulse SP40 is subsequently output (Step ST7).

Similarly, when the detection signal CS has not been obtained two times until 3.75 ms have elapsed since the rotation was started (Step ST34: N), it is subsequently determined whether or not the detection signal CS has been obtained two times until 4.75 ms have elapsed (Step ST35). When the detection signal CS has been obtained two times (Step ST35: Y), the rotation detection is ended (Step ST45), and the width of the variable drive pulse SP30 is set to 5 ms (Step ST55). After the variable drive pulse SP30 stops being output, the fixed drive pulse SP40 is subsequently output (Step ST7).

Then, the non-rotation is determined when the detection signal CS has not been obtained two times until 4.75 ms have elapsed since the rotation was started (Step ST54: N), and hence the correction pulse FP is output (Step ST6) to reliably rotate the rotor 21.

In this example, the width of the variable drive pulse SP30 is set in five steps ranging from 1 ms to 5 ms in units of 1 ms, but may be set more finely (or roughly), or the output of the variable drive pulse SP30 may be stopped immediately after the rotation determination is made to output the fixed drive pulse SP40. Further, the variable drive pulse SP30 may be output again immediately after the fixed drive pulse SP40 is output or after a given period (for example, 1 ms) have elapsed since the fixed drive pulse SP40 was output, to thereby eliminate a dead time to rotate the rotor 21 at high speed.

In this manner, with the electronic watch according to the sixth embodiment, the rotation or non-rotation of the rotor 21 can be detected in the case of performing the rotational drive by 360° in one step, and it is possible to reliably rotate the rotor 21 by outputting the correction pulse FP in the case of the non-rotation. Further, the length of the high-speed drive pulse train to be output is only required to be a length required for rotating the rotor 21. Therefore, the power consumption is reduced, and a dead time is eliminated to enable the high-speed drive.

Figure 31:
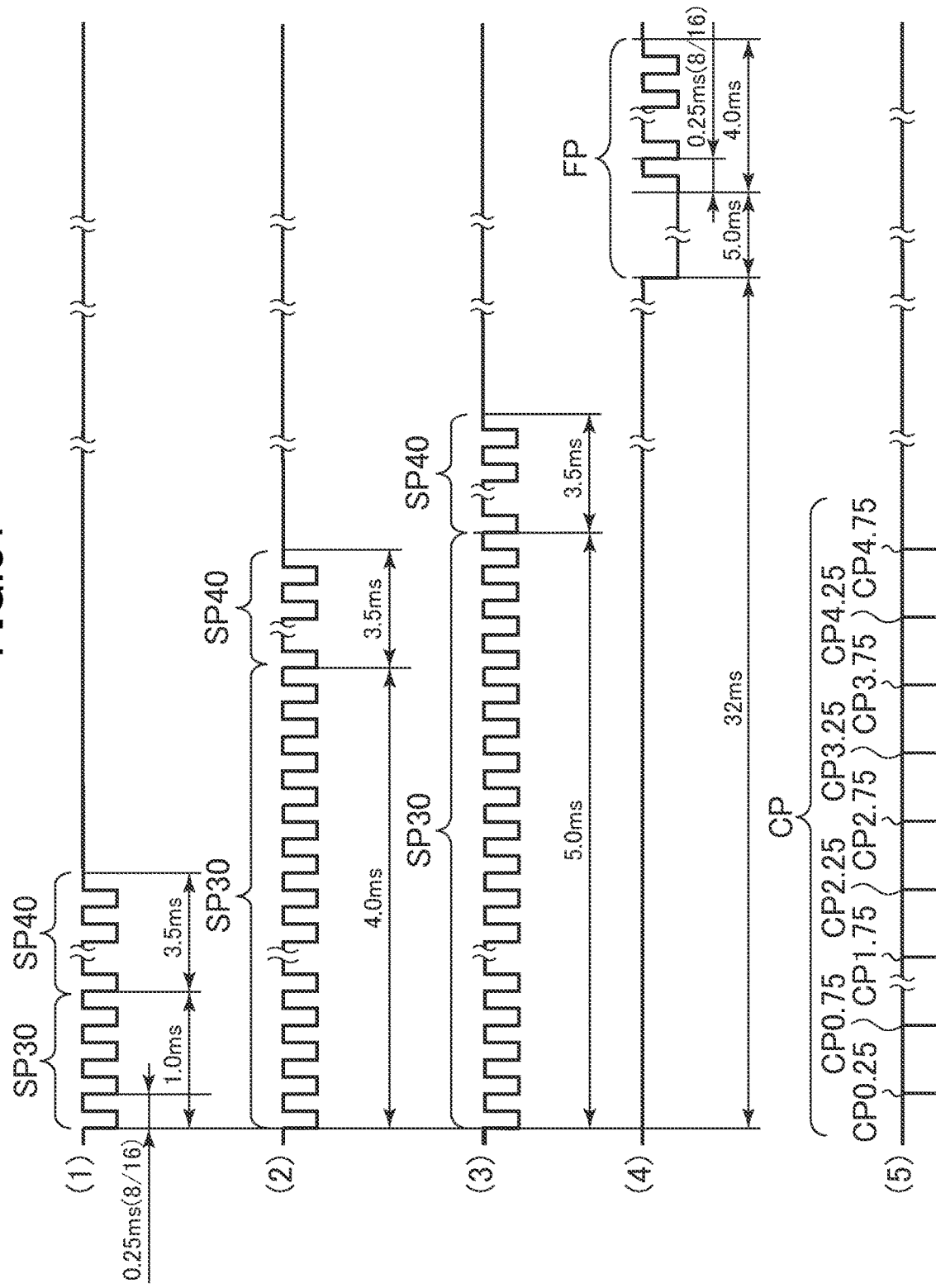
FIG. 31 is a diagram for illustrating pulse waveforms in Modification Example 1 of the sixth embodiment of the present invention.

Modification Example 1 of Sixth Embodiment:
FIG. 31

In the sixth embodiment, the output waveforms of the variable drive pulse SP30 and the fixed drive pulse 40 are as illustrated in FIG. 28, but the pulse shapes of those waveforms may be further deformed based on the power supply voltage. FIG. 31 is an illustration of pulse waveforms after the deformation, in which the variable drive pulses SP30 and the fixed drive pulses 40 indicated by waveforms (1) to (3) are not continuously output pulses (full pulses) but are pulses whose on and off are switched over at a given cycle (chopper pulses). In the example illustrated in FIG. 31, the duty cycle of the chopper pulse is $8/16$ so that the on and off of the output are repeatedly switched over at a cycle of 0.25 ms.

The pulse waveform based on the chopper pulse has the power consumption reduced by an amount corresponding to the suppressed output. On the other hand, output is lowered, and hence the non-rotation is liable to occur. In view of this, the chopper pulses illustrated in FIG. 31 may be used to achieve reduction in power consumption due to a sufficient drive force when the power supply voltage is high, namely, has a value equal to or larger than a predetermined value (for example, is 2.5 V or higher), while the rotor 21 may be stably rotated through use of the full pulses illustrated in FIG. 28 when the power supply voltage has a value smaller than a predetermined value (for example, is lower than 2.5 V).

With this configuration, only by turning on or off the signal at a predetermined cycle in the final stage of outputting a pulse to the driver circuit, it is possible to apply a plurality of kinds of drive pulses different in power consumption and in output to the stepper motor 20, and hence it is not required to separately provide the variable drive pulse SP30 and the fixed drive pulse SP40. The duty cycle of the chopper pulse is freely set, and three or more kinds of pulse waveforms may be provided based on the power supply voltage. Further, the variable drive pulse SP30 and the fixed drive pulse SP40 may be set to have different duty cycles and different cycle periods.

The correction pulse FP is required to have a strong drive force in order to reliably rotate the rotor 21, and hence it is undesirable to limit the output by using a chopper pulse. However, when the rotor 21 is expected to be reliably rotated depending on a power supply voltage or other such condition, the chopper pulse may be used within that range in the same manner as in the cases of the variable drive pulse SP30 and the fixed drive pulse SP40.

Figure 32:
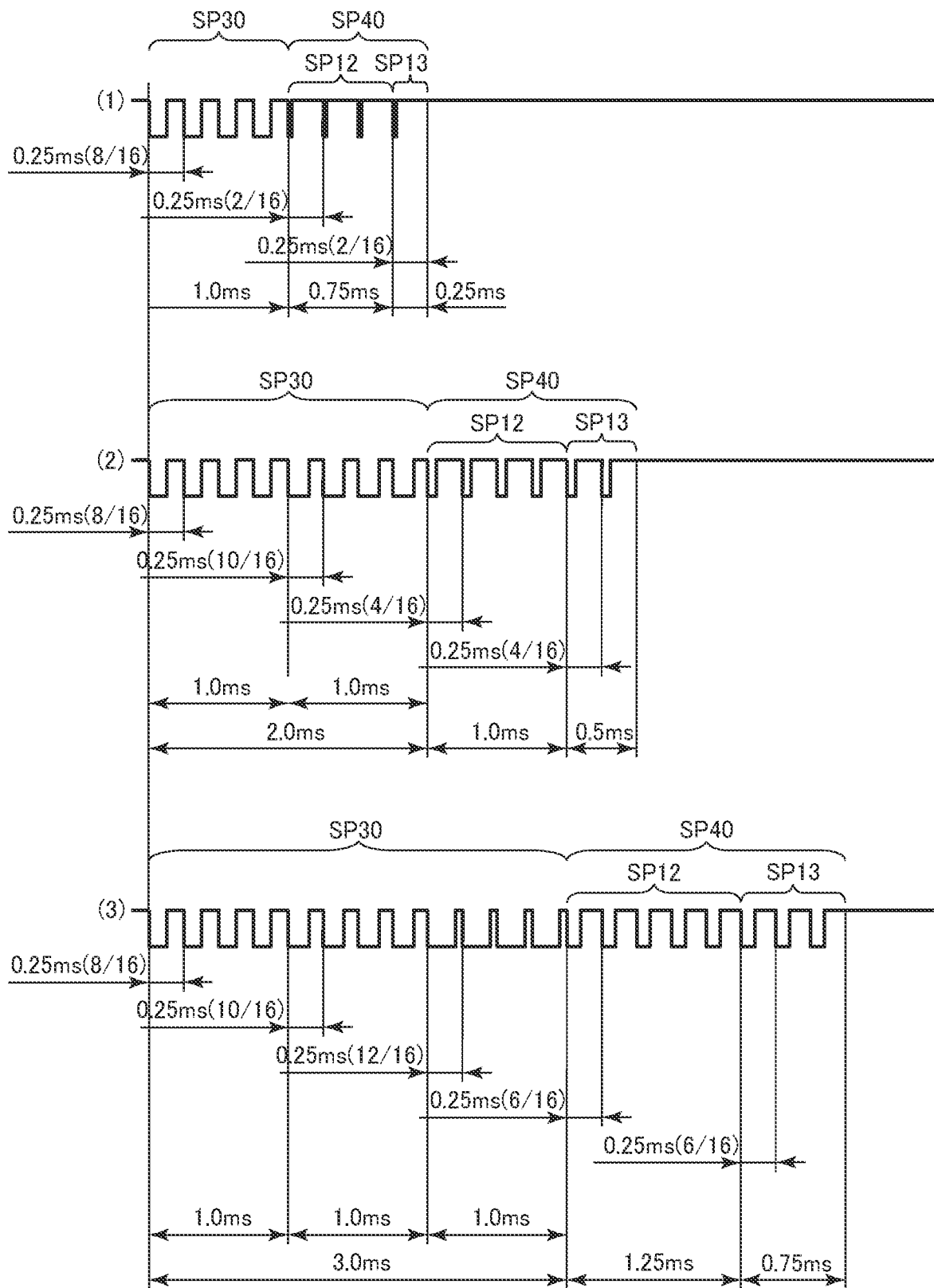
FIG. 32 is a diagram for illustrating pulse waveforms in Modification Example 2 of the sixth embodiment of the present invention.

Modification Example 2 of Sixth Embodiment:
FIG. 32

In Modification Example 1 of the sixth embodiment, the duty cycle of the chopper pulse having a pulse waveform deformed based on the power supply voltage may be further changed with an elapse of time. FIG. 32 is an illustration of a part of the pulse waveform in Modification Example 2 of the sixth embodiment, in which a waveform (1) includes the variable drive pulse SP30 having a length of 1 ms, a waveform (2) includes the variable drive pulse SP30 having a length of 2 ms, and a waveform (3) includes the variable drive pulse SP30 having a length of 3 ms. The illustrations of waveforms including the variable drive pulses SP30 having lengths of 4 ms and 5 ms are omitted.

The basic idea employed here is that a drive pulse for generating a stronger drive force is supplied as the time taken until the rotation determination is made becomes longer. That is, it is conceivable that the rotation determination can be made at an early timing when the power supply voltage is high and the drive force is sufficient, and that the duty cycle may be lowered for the reduction in power consumption in order to avoid unnecessary power consumption. Meanwhile, it is conceivable that the time taken until the rotation determination is made becomes longer as the power supply voltage is lowered with a less sufficient drive force, and that it is required to supply a drive pulse having a sufficient drive force in order to avoid the non-rotation.

In view of this, in Modification Example 2 of the sixth embodiment, the variable drive pulse SP30 based on a chopper pulse having a low duty cycle of $8/16$ is first applied to the stepper motor 20 during the first period of 1 ms from the start of the rotation. When the rotation determination is made through this operation, the waveform (1) is obtained, and it turns out that the drive force is sufficient, which causes the fixed drive pulse SP40 to have as low a duty cycle as $2/16$. Further, the period itself of the fixed drive pulse SP40 may be set as short as a total of 1 ms including 0.75 ms for the second drive pulse 12 and 0.25 ms for the third drive pulse.

Unless the rotation determination is made in 1 ms from the start of the rotation, the duty cycle of the variable drive pulse SP30 is increased to raise the drive force. Specifically, the duty cycle of the chopper pulse is set to $10/16$. When the rotation determination is made through this operation, the waveform (2) is obtained. In this case, the drive force is taken into consideration to set the duty cycle of the fixed drive pulse SP40 to $4/16$, which is stronger than in the case of the waveform (1). Further, the period of the fixed drive pulse SP40 may be set to a total of 1.5 ms including 1 ms for the second drive pulse 12 and 0.5 ms for the third drive pulse, which is longer than in the case of the waveform (1).

Further, unless the rotation determination is made in 2 ms from the start of the rotation, the duty cycle of the variable drive pulse SP30 is further increased to raise the drive force. Specifically, the duty cycle of the chopper pulse is set to $12/16$.

When the rotation determination is made through this operation, the waveform (3) is obtained. Then, the drive force is taken into consideration to set the duty cycle of the fixed drive pulse SP40 to 6/16, which is stronger than in the case of the waveform (2). Further, the period of the fixed drive pulse SP40 may be set to a total of 2 ms including 1.25 ms for the second drive pulse 12 and 0.75 ms for the third drive pulse, which is longer than in the case of the waveform (2).

Subsequently, in the same manner, each time one of 3 ms and 4 ms have elapsed since the rotation was started, the duty cycle of the variable drive pulse SP30 is increased, and the duty cycle of the fixed drive pulse SP40 is also increased simultaneously. At this time, the length of the fixed drive pulse SP40 may also be increased simultaneously. With this operation, when the drive force is sufficient, useless power consumption is reduced. Meanwhile, as the drive force becomes less sufficient with a decrease in power supply voltage, a more time is required from the start of the rotation until the rotation determination is made, and hence the duty cycle of the drive pulse to be applied is increased with an elapse of time from the start of the rotation, to thereby reduce the risk of causing the non-rotation. That is, it is possible to prevent such a situation that a failure in rotation due to reduction in drive force ascribable to the change to the chopper pulse causes the correction pulse FP to be frequently output to rather increase the power consumption. With this, it is possible to achieve reduction in the power consumption and stable rotation of the rotor 21 with a satisfactory balance.

In the example illustrated in FIG. 32, both the duty cycle and the length of the fixed drive pulse SP40 are changed, but anyone thereof may be changed. For example, only the duty cycle may be changed with the length being fixed, or only the length may be changed with the duty cycle being fixed.

Seventh Embodiment

An electronic watch according to a seventh embodiment of the present invention basically has the same structure and control as those of the electronic watch 1 according to the first embodiment. Therefore, the matters described with reference to FIG. 1 to FIG. 7 also apply to the electronic watch according to the seventh embodiment.

In the seventh embodiment, the drive pulse at the time of the drive by 360° per step is switched based on the power supply voltage and the temperature of the electronic watch. That is, referring to FIG. 7, in the high-speed drive by 360° per step, both the coil A and the coil B are excited in the state of FIG. 7(b). In this case, about twice the current is required compared with the case of exciting the coil A or the coil B independently.

Meanwhile, as illustrated and shown in FIG. 4 and FIG. 5, the coil A and the coil B are not simultaneously excited in the normal drive by 180° per step.

In this case, when a large amount of electricity is instantaneously consumed, temporary reduction in power supply voltage is caused. There is no problem when the condition is satisfactory with the power supply voltage being satisfactorily sufficient. However, when the power storage amount decreases to lower the power supply voltage itself or under a condition that the power supply voltage is liable to be temporarily lowered with the temperature being low, there is a possibility that the temporary reduction in power supply voltage at the time of the high-speed drive by 360° per step, which is illustrated in FIG. 7, may become a problem.

In view of this, in the seventh embodiment, as the waveform at the time of the high-speed drive by 360° per step, two kinds of waveforms, namely, that illustrated in FIG. 7 and a drive waveform for a low current, which is to be used when there is a fear of the temporary reduction in power supply voltage, for example, when the power supply voltage has a value equal to or smaller than a given value or when the temperature of the electronic watch is equal to or lower than a given level, are provided, and are switched over based on the power supply voltage or the temperature of the electronic watch.

Figure 33:
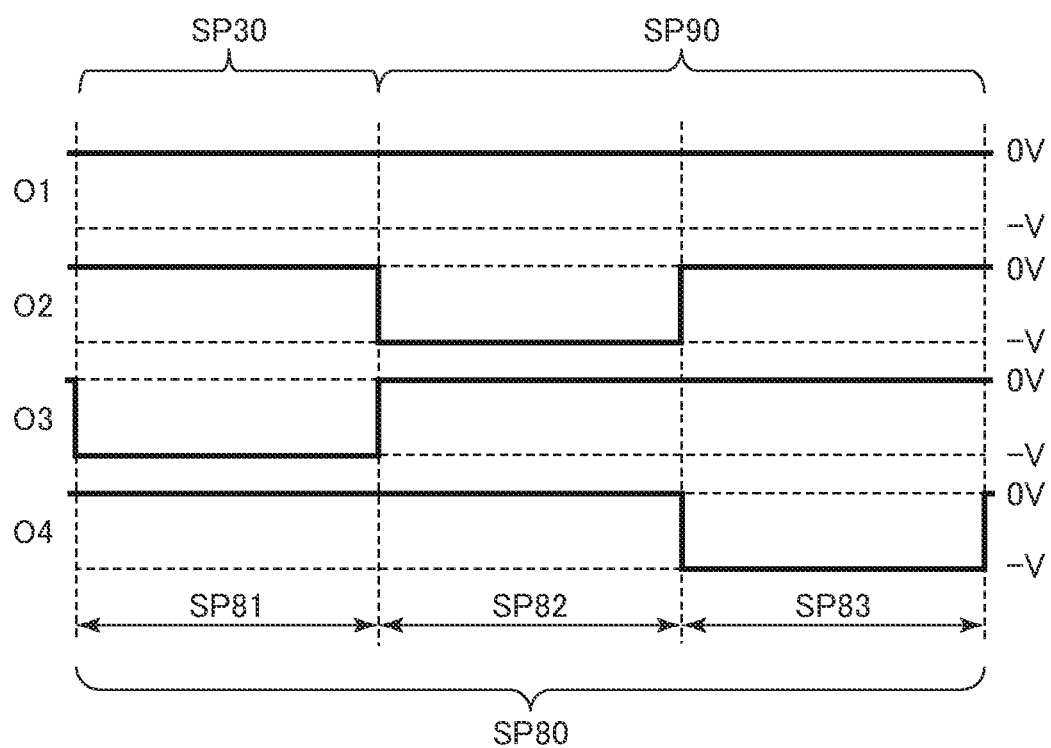
FIG. 33 is a waveform diagram of a high-speed drive pulse train in a seventh embodiment of the present invention.

[Description of Drive Waveform for Low Current of Drive Pulse in Seventh Embodiment: FIG. 33]

FIG. 33 is a diagram for illustrating a high-speed drive pulse train SP80 being an example of the drive waveform of the drive pulse in the seventh embodiment. First, the high-speed drive pulse train SP80 is used for rotationally driving the rotor of the stepper motor 20 of FIG. 2 from the stationary position of 0° in the forward rotation direction (counterclockwise) in increments of 360°. FIG. 33 is an illustration of a drive waveform based on the high-speed drive pulse SP80 and the four drive waveforms O1, O2, O3, and O4 to be output from the driver circuit 10.

In FIG. 33, the high-speed drive pulse train SP80 to be output from the high-speed drive pulse generation circuit 4 is, in this example, a pulse train composed of 3 bits, namely, SP81 to SP83 and formed of the three drive pulses, namely, the first drive pulse SP81, the second drive pulse SP82, and the third drive pulse SP83 in time series, which includes a logical "1" or a logical "0" in order to turn on/off each of the transistors of the driver circuit 80.

In the first drive pulse SP81, the drive waveform O3 has a voltage of less than 0 V, and the other drive waveforms O1 to O3 have a voltage of 0 V. With this, a drive current flows into the coil B of the stepper motor 20 connected to the coil terminals O3 and O4 to excite the coil B.

Further, in the second drive pulse SP82, the drive waveform O2 has a voltage of less than 0 V, and the drive waveforms O1, O3, and O4 have a voltage of 0 V. With this, a drive current flows into the coil A of the stepper motor 20 connected to the coil terminals O1 and O2 to excite the coil A.

Further, in the third drive pulse SP83, the drive waveform O4 has a voltage of less than 0 V, and the other drive waveforms O1 to O3 have a voltage of 0 V. With this, a drive current flows into the coil B of the stepper motor 20 connected to the coil terminals O3 and O4 to excite the coil B.

[Description of Rotational Drive by 360° Per Step Based on Drive Waveform for Low Current in Seventh Embodiment: FIGS. 34]

With reference to FIG. 34, description is given of the high-speed rotational drive in increments of 360° per step based on the drive waveform for a low current, which is performed by the stepper motor 20 in the seventh embodiment. First, FIG. 34(a) is an illustration of a state in which the first drive pulse SP81 of the high-speed drive pulse train SP80 is supplied to the stepper motor 20. The coil B is excited in the direction indicated by the arrow, and hence the second magnetic-pole portion 22b is magnetized to the N-pole, while the third magnetic-pole portion 22c is magnetized to the S-pole. Meanwhile, the coil A is not magnetized, and hence the first magnetic-pole portion 22a has the S-pole in the same manner as the third magnetic-pole portion 22c. Therefore, the rotor 21 is rotated in the counterclockwise direction, and the N-pole of the rotor 21 is rotated in the counterclockwise direction from the stationary position of 0° to reach the position of about 135°.

Next, as illustrated in FIG. 34(b), when the second drive pulse SP62 is supplied, both the coil A is excited in the direction indicated by the arrow. Thus, the first magnetic-pole portion 22a is magnetized to the N-pole, and the second magnetic-pole portion 22b and the third magnetic-pole portion 22c are magnetized to the S-pole. As a result, the rotor 21 is further rotated in the counterclockwise direction, and the N-pole of the rotor 21 is rotated to reach the position of about 225°.

Further, as illustrated in FIG. 34(c), when the third drive pulse SP83 is supplied, the coil B is excited in the direction indicated by the arrow. Thus, the second magnetic-pole portion 22b is magnetized to the S-pole, and the first magnetic-pole portion 22a and the third magnetic-pole portion 22c are magnetized to the N-pole. As a result, the rotor 21 is further rotated in the counterclockwise direction without stopping, and the N-pole of the rotor 21 is rotated to reach the position of about 315°.

After that, as illustrated in FIG. 34(d), when the supply of the high-speed drive pulse train SP80 is ended, the coil terminals O1 to O4 all have a voltage of 0 V. Thus, the coil A and the coil B stop being excited, which cancels the magnetization of the first to third magnetic-pole portions, but the rotor 21 continues to rotate until reaching the statically stable point of 360° (0°) without stopping, and is held at that position. In this manner, the stepper motor 20 can be rotationally driven by 360° through one-step drive based on the high-speed drive pulse train 80 formed of the three drive pulses SP81 to SP83.

In the drive based on the high-speed drive pulse train SP80 being the drive waveform for a low current in the seventh embodiment, it is required to rotate the rotor 21 by 90° from the position of 225° in FIG. 34(b) to the position of 315° in FIG. 34(c), but this rotation is performed by exciting a single coil, and hence the drive force is slightly inferior to that of the high-speed drive pulse train SP10 for the high-speed drive, which is illustrated and shown in FIG. 6. Therefore, it tends to take a slightly more time to rotate the rotor 21 based on the high-speed drive pulse train SP80.

Meanwhile, as apparent from FIG. 34, in the high-speed drive pulse train SP80 being the drive waveform for a low current, two coils are not simultaneously excited, and hence the maximum value of the current is about ½ of the high-speed drive pulse train SP10 illustrated and shown in FIG. 6. Therefore, in the high-speed drive under the condition that there is a fear of the temporary reduction in voltage due to large current consumption, the high-speed drive pulse train SP80 being the drive waveform for a low current is used, and otherwise, the high-speed drive pulse train SP10 illustrated and shown in FIG. 6 may be used.

The high-speed drive pulse train SP80 may be applied not only to the first embodiment but also to the third embodiment. In that case, for example, the high-speed drive pulse train SP20 illustrated in FIG. 14 may be switched by the high-speed drive pulse train SP80 being the drive waveform for a low current in the seventh embodiment depending on the condition.

Eighth Embodiment

An electronic watch according to an eighth embodiment of the present invention is an example obtained by combining the sixth embodiment and the seventh embodiment, in which low power consumption and the stability of rotation under a poor power source condition, for example, a reduced power supply voltage or a low temperature are achieved simultaneously with higher reliability.

When the high-speed drive pulse train SP in the sixth embodiment, which is illustrated in FIG. 27, and the high-speed drive pulse train SP80 based on the drive waveform for a low current in the seventh embodiment, which is illustrated in FIG. 33, are compared with each other, the first drive pulses SP11 and SP81 are used in common. That is, when the high-speed drive pulse train SP80 based on the drive waveform for a low current in the seventh embodiment is divided into the variable drive pulse SP30 formed of the first drive pulse SP81 and a fixed drive pulse SP90 formed of the second and third drive pulses SP82 and SP83, the variable drive pulse SP30 is used in common in the sixth embodiment and the seventh embodiment.

Meanwhile, the fixed drive pulse SP40 in the sixth embodiment and the fixed drive pulse SP90 in the seventh embodiment are different drive pulses.

In view of this, in the eighth embodiment, as in the sixth embodiment, the length of the variable drive pulse SP30 is changed based on the time taken until the rotation determination is made, and the fixed drive pulse is switched to the fixed drive pulse SP90 based on the drive waveform for a low current when it is determined that the time taken until the rotation determination is made is long with the power source condition being poor.

Figure 35:
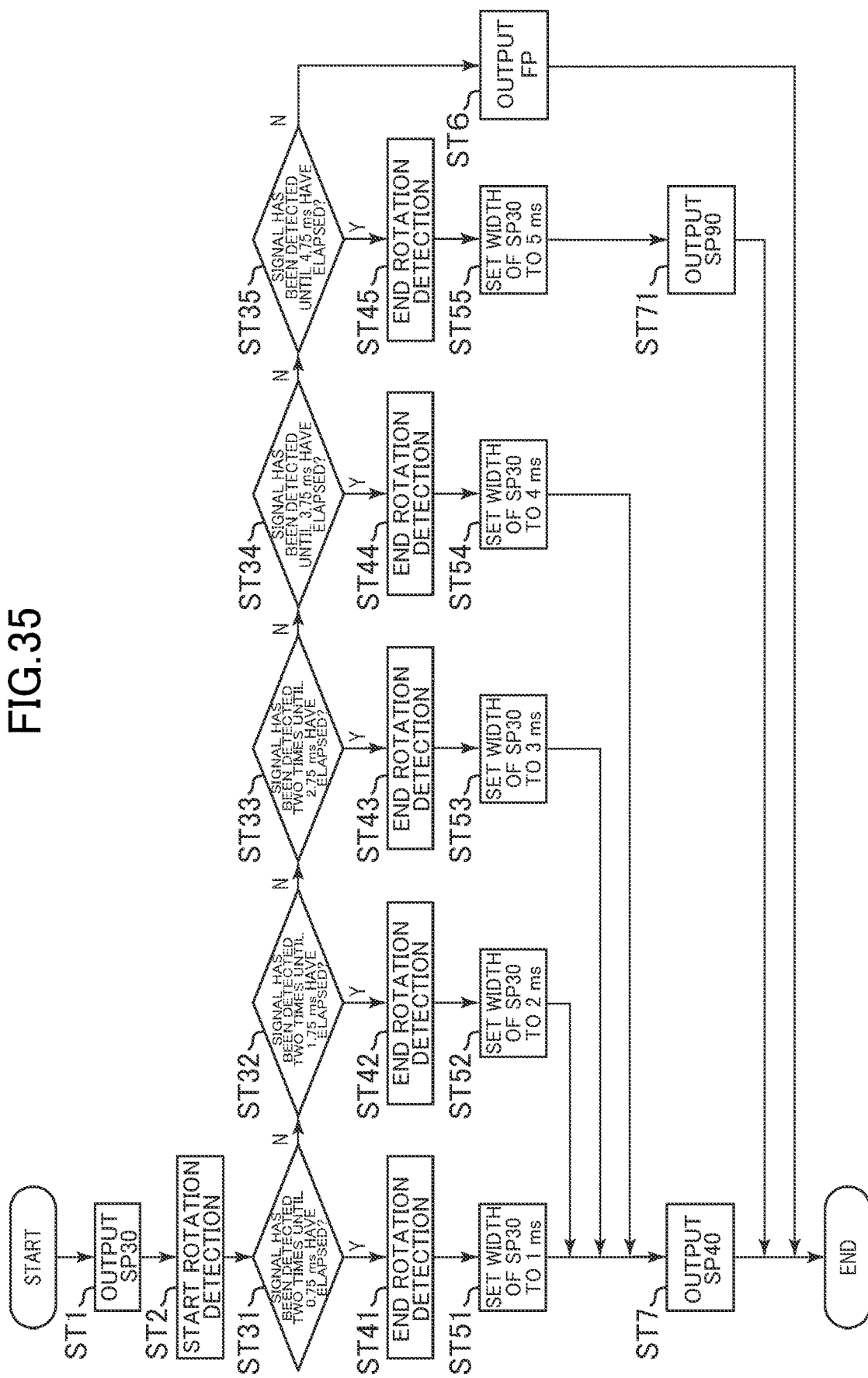
FIG. 35 is a flow chart for illustrating an operation for high-speed drive pulse train output in an eighth embodiment of the present invention.

[Description of Flow of High-Speed Drive Pulse Train Output in Eighth Embodiment: FIG. 35]

FIG. 35 is a flow chart for illustrating an operation for high-speed drive pulse train output in the eighth embodiment. Now, with reference to this flow chart, description is given of the operation of the electronic watch according to the eighth embodiment, which is controlled by the control circuit.

In this operation flow, the operations performed in Step ST1, Step ST2, Step ST31 to Step ST35, Step ST41 to Step ST45, Step ST51 to Step ST55, Step ST6, and Step ST7 are the same as those of the flow in the sixth embodiment illustrated in FIG. 29. This operation flow is different from the flow illustrated in FIG. 29 only in that Step ST55 is followed by Step ST71 instead of Step ST7.

That is, at the timing of hand movement, the variable drive pulse SP30 is output to the driver circuit 100 (Step ST1) to start the rotation of the rotor 21 of the stepper motor 20, and then the rotation detection is started (Step ST2). When the rotation determination is made in Step ST31 to Step ST35, the rotation detection is ended in Step ST41 to Step ST45, and in Step ST51 to Step ST55, the length of the variable drive pulse SP30 is set based on the time taken until the rotation determination is made. After the execution of Step ST51 to Step ST54, the fixed drive pulse SP40 is output in Step ST7. Meanwhile, when the non-rotation is determined in Step ST35 (Step ST35: N), the correction pulse FP is output in Step ST6, to thereby achieve the rotational drive by 360° per step.

In this case, when the rotation determination is made before 4.75 ms have elapsed from the start of the rotation in Step ST35, it is estimated that the drive force is in a low condition for some reason, for example, due to a low power supply voltage. Under such condition, there is a fear that a certain problem may be caused by the temporary reduction in power supply voltage due to the large current consumption.

In view of this, after the variable drive pulse SP30 set to have a length of 5 ms is output in Step ST55, the processing proceeds to Step ST71, and the fixed drive pulse SP90 based on the drive waveform for a low current, which is illustrated in FIG. 33, is output after being switched from the variable drive pulse SP30. In the drive based on the fixed drive pulse SP90, two coils are not simultaneously excited, and the temporary reduction in voltage hardly occurs.

Figure 36:
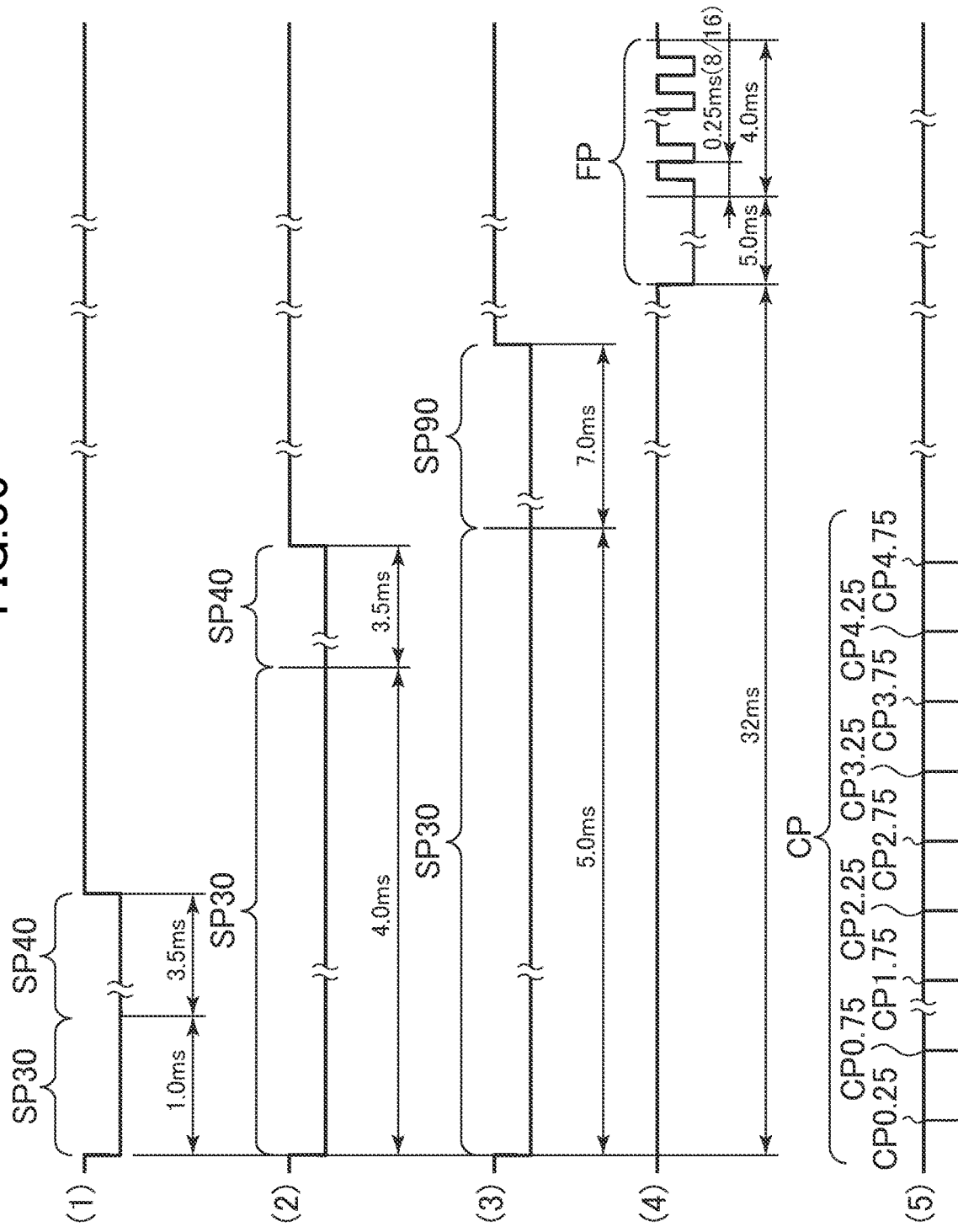
FIG. 36 is a diagram for illustrating pulse waveforms in the eighth embodiment of the present invention.

[Description of Pulse Waveforms in Eighth Embodiment: FIG. 36]

FIG. 36 is an illustration of the pulse waveforms in the eighth embodiment. In FIG. 36, waveforms (1) to (3) are illustrated as examples of drive pulses to be applied to the stepper motor 20 when the rotation of the rotor 21 is determined. Further, a waveform (4) indicates a timing to apply the correction pulse FP, and a waveform (5) indicates a timing to apply the detection pulse CP.

In this case, as indicated by the waveforms (1) and (2), when the rotation determination is made before an elapse of 3.75 ms from the start of the rotation with the length of the variable drive pulse SP30 being 4 ms or less, the fixed drive pulse SP40 is output immediately after the variable drive pulse SP30 is output, and two coils are simultaneously excited, to thereby perform the drive by 360° per step.

In contrast, as indicated by the waveform (3), when the rotation determination is made after an elapse of 3.75 ms from the start of the rotation with the length of the variable drive pulse SP30 being as long as 5 ms, the fixed drive pulse to be output after the variable drive pulse SP30 is the fixed drive pulse SP90 based on the drive waveform for a low current, and the drive by 360° per step is performed without the simultaneous excitation of two coils. In this case, the length of the fixed drive pulse SP40 indicated by the waveforms (1) and (2) is 3.5 ms, while the length of the fixed drive pulse SP90 indicated by the waveform (3) is as long as 7.0 ms so that the rotor 21 can be reliably rotated even with a low current.

With this configuration, only by detecting the timing for the rotation detection without directly detecting the value of the power supply voltage and the temperature of the electronic watch, it is possible to determine the condition in which temporary reduction in power supply voltage becomes a problem, to thereby avoid the problem of the temporary reduction in power supply voltage due to the large current consumption, while it is possible to achieve a stable high-speed rotation by 360° per step. With this, it is possible to achieve miniaturization and reduction in cost by reducing the circuit scales of, for example, a detection circuit for a power supply voltage and a determination circuit for a temperature.

The condition for using the fixed drive pulse SP90 based on the drive waveform for a low current by switching the fixed drive pulse from the fixed drive pulse SP40 is not limited to the above-mentioned case in which the rotation determination cannot be made before an elapse of 3.75 ms from the start of the rotation, and may be changed as appropriate. For example, when the rotation determination cannot be made before an elapse of 2.75 ms from the start of the rotation (Step ST34 in FIG. 35: Y), the processing may proceed to Step ST71 to use the fixed drive pulse SP90.

Modification Example of Eighth Embodiment: FIG. 36

In the eighth embodiment described above, when it is estimated that the condition in which the temporary reduction in power supply voltage becomes a problem has been satisfied, the fixed drive pulse SP90 based on the drive waveform for a low current is used, but a variable drive pulse SP30' to be applied to a reversed terminal may be output instead.

Figure 37:
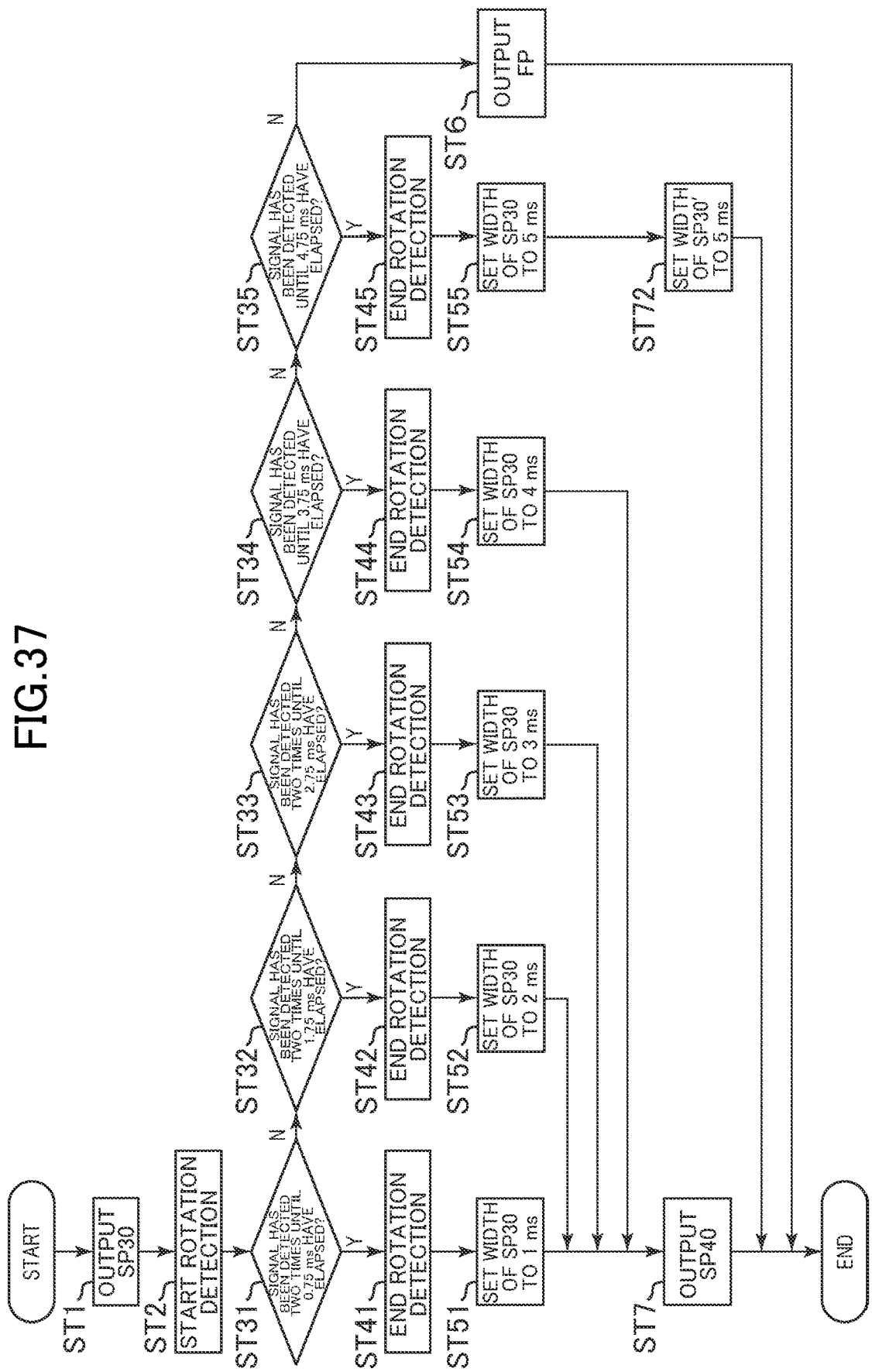
FIG. 37 is a flow chart for illustrating an operation for high-speed drive pulse train output in a modification example of the eighth embodiment of the present invention.

[Description of Flow of High-Speed Drive Pulse Train Output in Modification Example of Eighth Embodiment: FIG. 37]

FIG. 37 is a flow chart for illustrating a flow of high-speed drive pulse train output in a modification example of the eighth embodiment. This flow is different from that of the eighth embodiment, which is illustrated in FIG. 35, only in that Step ST72 is used in place of Step ST71, and the other points are the same.

That is, when the rotation determination is made before 4.75 ms have elapsed from the start of the rotation in Step ST35 (Step ST35: Y), the rotation detection is ended (Step ST45), the width of a variable drive pulse SP is set to 5 ms, the variable drive pulse SP is output, and then the variable drive pulse SP30' to be applied to the switched coil is output.

In this case, a normal variable drive pulse is applied to any one of the coil A and the coil B (in this case, coil B), and hence the "variable drive pulse SP30' to be applied to the switched coil" refers to the variable drive pulse SP30' to be applied to a coil that has been changed so that the variable drive pulse SP30' is to be applied to the other coil (in this case, coil A).

More specifically, the variable drive pulse SP30' is obtained by replacing the drive waveforms O1 and O2 of the variable drive pulse SP30 by the drive waveforms O3 and O4, respectively, and replacing the drive waveforms O3 and 4 of the variable drive pulse SP30 by the drive waveforms O1 and O2, respectively. In addition, the variable drive pulse SP30' is a drive pulse for rotating, when the rotor 21 is located at the position of the 180°, the rotor 21 further by 180° in the counterclockwise direction to reach the position 360° (0°).

That is, the rotor 21 has been rotated up to 135° under a state in which the normal variable drive pulse SP30 having a width of 5 ms is output in Step ST55, and is expected to be then rotated to reach the position of 180° being the statically stable point by a holding torque. Thus, by further applying the variable drive pulse SP30' from that state, it is possible to rotate the rotor 21 up to the position of 315° and then rotate the rotor 21 to reach the position of 360° (0°) being the statically stable point by a holding torque.

[Description of Pulse Waveforms in Modification Example of Eighth Embodiment: FIG. 38]

FIG. 38 is a diagram for illustrating pulse waveforms in the modification example of the eighth embodiment. This flow is different from that of the eighth embodiment, which is illustrated in FIG. 37, only in the waveform (3), and the other points are the same.

That is, when the rotation determination is made after an elapse of 3.75 ms from the start of the rotation, which is indicated by the waveform (3), the variable drive pulse SP30 having a width of 5 ms is followed by a period of 8 ms during which the pulse is not applied, which is provided as a period until the rotor 21 reaches a statically stable position, and then the variable drive pulse SP30' is output. The variable drive pulse SP30 and the variable drive pulse SP30' are not used for simultaneously exciting two coils, and hence in the modification example of the eighth embodiment, in the same manner as in the case described above in the eighth embodiment, only by detecting the timing for the rotation detection without directly detecting the value of the power supply voltage and the temperature of the electronic watch, it is possible to determine the condition in which temporary reduction in power supply voltage becomes a problem, to thereby avoid the problem of the temporary reduction in power supply voltage due to the large current consumption, while it is possible to achieve a stable high-speed rotation by 360° per step.

The configuration diagram, the circuit diagram, the waveform diagram, and the like represented in each embodiment of the present invention are not limited to those described above, and can be changed as appropriate as long as the gist of the present invention is satisfied.

The invention claimed is:

1. An electronic watch, comprising:
   a two-coil stepper motor including:
      a rotor magnetized into two poles or more in a radial direction of the rotor;
      a stator including:
         a first stator magnetic-pole portion and a second stator magnetic-pole portion, which are formed so as to oppose to each other through the rotor; and
         a third stator magnetic-pole portion, which is formed between the first stator magnetic-pole portion and the second stator magnetic-pole portion so as to face the rotor;
      a first coil to be magnetically coupled to the first stator magnetic-pole portion and the third stator magnetic-pole portion; and
      a second coil to be magnetically coupled to the second stator magnetic-pole portion and the third stator magnetic-pole portion; and
   a drive pulse generation circuit configured to output a drive pulse for driving the rotor to the first coil or the second coil,
   wherein the drive pulse includes a plurality of drive pulses,
   wherein the rotor is to be rotationally driven in increments of 360° due to a drive pulse train formed of the plurality of drive pulses, and
   wherein the electronic watch is configured to switch between a high-speed drive, in which the rotor is to be rotationally driven in increments of 360°, and a normal drive, in which the rotor is to be rotationally driven in increments of 180°, and
   wherein the rotor is to be driven in the high-speed drive at a frequency higher than in the normal drive.

2. The electronic watch according to claim 1, wherein the drive pulse train is formed of three drive pulses of the plurality of drive pulses.

3. The electronic watch according to claim 1, further comprising:
   a first two-coil stepper motor to be subjected to the high-speed drive; and
   a second two-coil stepper motor to be subjected to the normal drive,
   wherein a drive frequency of the second two-coil stepper motor is lower than a drive frequency of the first two-coil stepper motor.

4. The electronic watch according to claim 1, wherein the electronic watch is configured to select a high-speed drive pulse train or a normal drive pulse by switching a timing to select a specific drive pulse from the drive pulse train.

5. The electronic watch according to claim 1, wherein one terminal of the first coil and one terminal of the second coil are short-circuited.

6. The electronic watch according to claim 5, wherein at least one of the plurality of drive pulses included in the drive pulse train is formed of a pulse for exciting the first coil and a pulse for exciting the second coil so as to be alternately repeated.

7. The electronic watch according to claim 1, further comprising:
   a detection pulse generation circuit configured to generate a detection pulse for detecting rotation of the rotor; and
   a rotation detection determination circuit configured to determine rotation or non-rotation of the rotor based on a detection signal detected by applying the detection pulse to the first coil or the second coil,
   wherein the electronic watch has a variable drive pulse formed of a part of the plurality of drive pulses included in the drive pulse train, and the variable drive pulse has a length changed depending on a result of determining the rotation or non-rotation of the rotor by the rotation detection determination circuit.

8. The electronic watch according to claim 1, wherein the drive pulse train has a duty cycle to be switched based on at least any one of a power supply voltage or a temperature.

9. The electronic watch according to claim 8, wherein the drive pulse train has the duty cycle to be further changed based on an elapsed time from a start of the rotation.

10. The electronic watch according to claim 1,
    wherein the electronic watch has a first drive pulse train for simultaneously exciting the first coil and the second coil and a second drive pulse train for avoiding simultaneously exciting the first coil and the second coil, and
    wherein the electronic watch is configured to select which one of the first drive pulse train and the second drive pulse train is to be used as the drive pulse train based on at least any one of a power supply voltage or a temperature.

11. The electronic watch according to claim 7,
    wherein the variable drive pulse includes the drive pulse train for avoiding simultaneously exciting the first coil and the second coil,
    wherein the electronic watch has, as fixed drive pulses formed of remaining drive pulses of the plurality of drive pulses included in the drive pulse train, a first fixed drive pulse for simultaneously exciting the first coil and the second coil and a second fixed drive pulse for avoiding simultaneously exciting the first coil and the second coil, and
    wherein the variable drive pulse is to be used irrespective of a condition, and which one of the first fixed drive pulse and the second fixed drive pulse is to be used as the fixed drive pulse is selected based on an elapsed time from a start of the rotation.

12. The electronic watch according to claim 7,
    wherein the variable drive pulse includes the drive pulse train for avoiding simultaneously exciting the first coil and the second coil,
    wherein the electronic watch has: a fixed drive pulse formed of a remaining drive pulse of the plurality of drive pulses included in the drive pulse train; and a second variable drive pulse to be applied to a coil different from a coil to which the variable drive pulse is to be applied, and
    wherein the variable drive pulse is to be used irrespective of a condition, and which one of the fixed drive pulse and the second variable drive pulse is to be used is selected based on an elapsed time from a start of the rotation.

* * * * *